United States Patent
Vanderberg et al.

(10) Patent No.: US 9,211,902 B2
(45) Date of Patent: *Dec. 15, 2015

(54) COOLER HAVING REMOVABLE WHEEL ASSEMBLY

(71) Applicant: M & C Innovations, LLC, Charlotte, NC (US)

(72) Inventors: Matthew Alexander Vanderberg, Charlotte, NC (US); Daniel Lee Bizzell, Charlotte, NC (US)

(73) Assignee: M & C INNOVATIONS, LLC, Charlotte, NC (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/831,831

(22) Filed: Mar. 15, 2013

(65) Prior Publication Data

US 2013/0200581 A1 Aug. 8, 2013

Related U.S. Application Data

(63) Continuation-in-part of application No. 13/526,485, filed on Jun. 18, 2012, now Pat. No. 9,022,395, and a continuation-in-part of application No. 12/940,940, filed on Nov. 5, 2010, now Pat. No. 8,448,813, which (Continued)

(51) Int. Cl.
*B62B 7/02* (2006.01)
*B62B 1/12* (2006.01)
(Continued)

(52) U.S. Cl.
CPC ............... *B62B 5/0083* (2013.01); *B65D 9/22* (2013.01)

(58) Field of Classification Search
CPC ............ B62B 1/006; B62B 1/10; B62B 1/12; B62B 1/125; B62B 2204/06; B62B 2205/10; B62B 2205/104; B62B 2205/52; A45C 5/14; A45C 5/143; A45C 5/146; A45C 7/004; F25D 23/06; F25D 23/062; F25D 23/064; F25D 2400/38
USPC ............ 280/47.17, 47.24, 47.26, 47.34, 638, 280/35, 655.1, 47.131, 47.18, 47.371, 280/79.11, 79.2
See application file for complete search history.

(56) References Cited

U.S. PATENT DOCUMENTS 3,842,953 A 10/1974 Royet
3,960,252 A 6/1976 Cassimally
(Continued)

FOREIGN PATENT DOCUMENTS

WO 2007063330 A2 6/2007

*Primary Examiner* — Joseph Rocca
*Assistant Examiner* — Travis Coolman
(74) *Attorney, Agent, or Firm* — Tillman Wright, PLLC; Chad D. Tillman; Jeremy C. Doerre

(57) ABSTRACT

A cooler includes a main body which includes a base, an upper rim, and one or more cooler walls extending therebetween. The cooler in some embodiments further includes a removable wheel assembly which includes two coaxial wheels, and an axle. The two coaxial wheels are removably securable to the axle. The cooler still further comprises a wheel fastening system configured to secure the removable wheel assembly to the base of the main body which includes a mount, a clip hingedly connected to the mount, and a locking clasp configured to lock the clip into a closed position to secure the wheel assembly. The cooler yet further comprises a lid including two wheel storage recesses, each being sized and dimensioned to receive and retain one of the coaxial wheel of the wheel assembly, and an axle storage recess sized and dimensioned to receive and retain the axle of the wheel assembly.

12 Claims, 53 Drawing Sheets

Related U.S. Application Data is a continuation of application No. 12/636,225, filed on Dec. 11, 2009, now Pat. No. 8,317,046.

(60) Provisional application No. 61/498,310, filed on Jun. 17, 2011, provisional application No. 61/121,904, filed on Dec. 11, 2008.

(51) Int. Cl.
  *B62B 5/00* (2006.01)
  *B65D 6/26* (2006.01)

(56) References Cited

U.S. PATENT DOCUMENTS

| | | |
|---|---|---|
| D284,620 S | 7/1986 | Calton |
| 4,673,117 A | 6/1987 | Calton |
| 4,988,216 A | 1/1991 | Lyman |
| 5,115,947 A | 5/1992 | McDonnell et al. |
| D340,351 S | 10/1993 | Wrath |
| 5,529,220 A | 6/1996 | Credle et al. |
| D371,942 S | 7/1996 | Lippincott et al. |
| D375,403 S | 11/1996 | Melk |
| 5,913,448 A * | 6/1999 | Mann et al. .................. 220/666 |
| 5,957,354 A | 9/1999 | Mentken |
| 5,964,384 A | 10/1999 | Young |
| 6,015,072 A | 1/2000 | Young |
| 6,053,382 A | 4/2000 | Wyant |
| 6,336,577 B1 | 1/2002 | Harris et al. |
| 6,364,329 B1 | 4/2002 | Holub et al. |
| 6,427,886 B1 | 8/2002 | Essex |
| 6,536,637 B1 | 3/2003 | McLaughlin |
| 6,892,915 B2 | 5/2005 | Mares |
| 7,165,705 B2 | 1/2007 | Haro |
| 7,290,775 B2 | 11/2007 | Parker et al. |
| D588,874 S * | 3/2009 | Huang ............................ D7/629 |
| 7,730,739 B2 | 6/2010 | Fuchs |
| 8,403,162 B2 | 3/2013 | Vanderberg et al. |
| 8,424,699 B2 | 4/2013 | Vanderberg et al. |
| 8,424,708 B2 | 4/2013 | Vanderberg et al. |
| 8,424,901 B2 | 4/2013 | Vanderberg et al. |
| 8,430,265 B2 | 4/2013 | Vanderberg et al. |
| 8,448,813 B2 | 5/2013 | Vanderberg et al. |
| 8,544,872 B2 | 10/2013 | Vanderberg et al. |
| 8,695,839 B1 | 4/2014 | Vanderberg |
| 2002/0095947 A1 | 7/2002 | Treppedi et al. |
| 2004/0238570 A1 | 12/2004 | Skillern |
| 2005/0127073 A1 * | 6/2005 | Kusuma et al. .................... 220/6 |
| 2005/0279123 A1 | 12/2005 | Maldonado et al. |
| 2008/0099476 A1 | 5/2008 | Fung |
| 2008/0128422 A1 | 6/2008 | Adler et al. |
| 2008/0149676 A1 | 6/2008 | Bartel |
| 2009/0184143 A1 | 7/2009 | Witt et al. |
| 2009/0241584 A1 | 10/2009 | Hayes et al. |
| 2009/0274398 A1 | 11/2009 | Men |
| 2010/0025934 A1 | 2/2010 | Hassman et al. |
| 2010/0212351 A1 | 8/2010 | Chapin et al. |
| 2013/0193657 A1 | 8/2013 | Vanderberg et al. |
| 2013/0193673 A1 | 8/2013 | Vanderberg et al. |
| 2013/0200581 A1 | 8/2013 | Vanderberg et al. |
| 2013/0207359 A1 | 8/2013 | Vanderberg et al. |
| 2013/0207360 A1 | 8/2013 | Vanderberg et al. |
| 2013/0214501 A1 | 8/2013 | Vanderberg et al. |

* cited by examiner

10

10

10

110

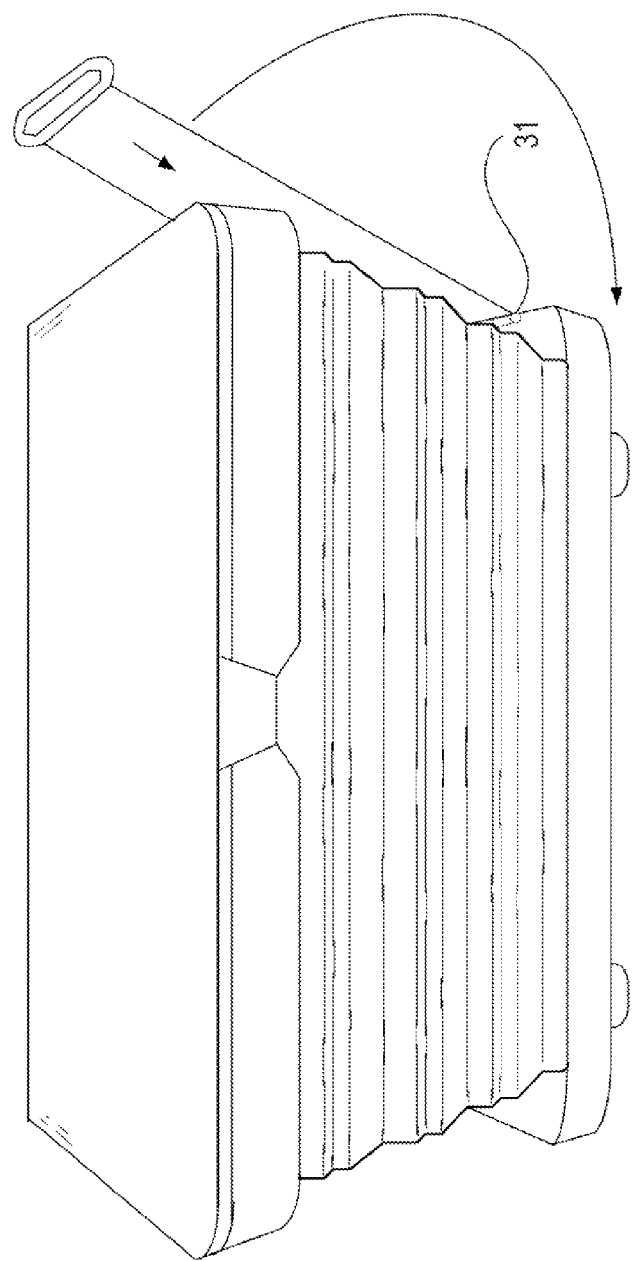

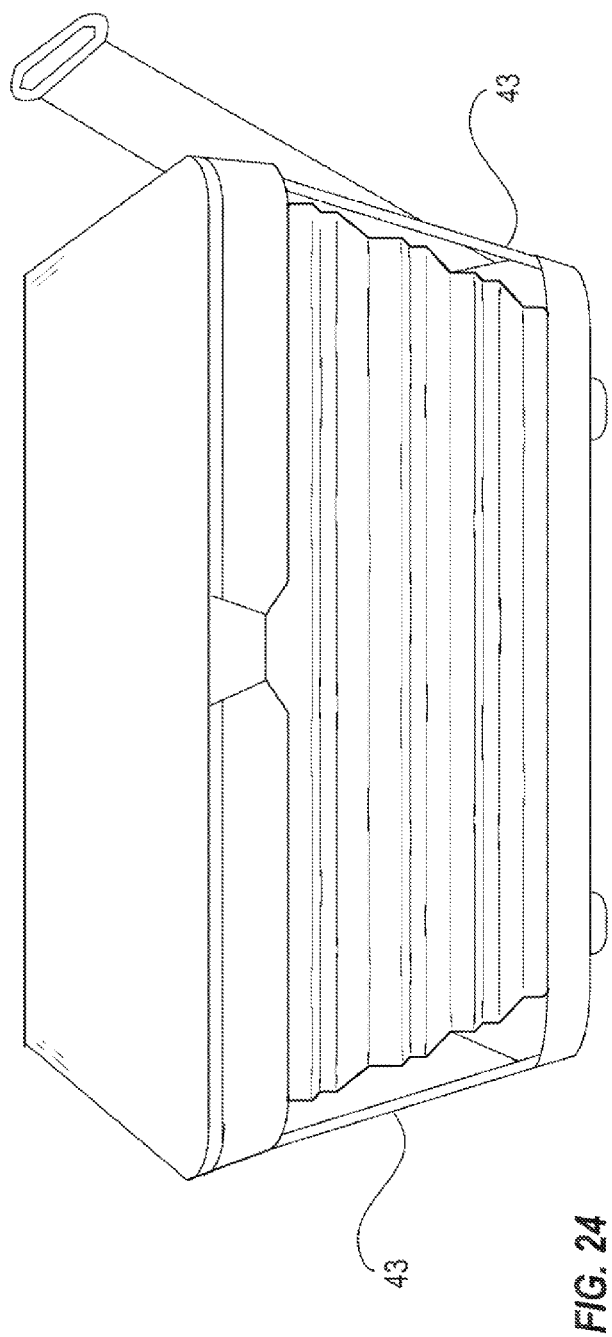

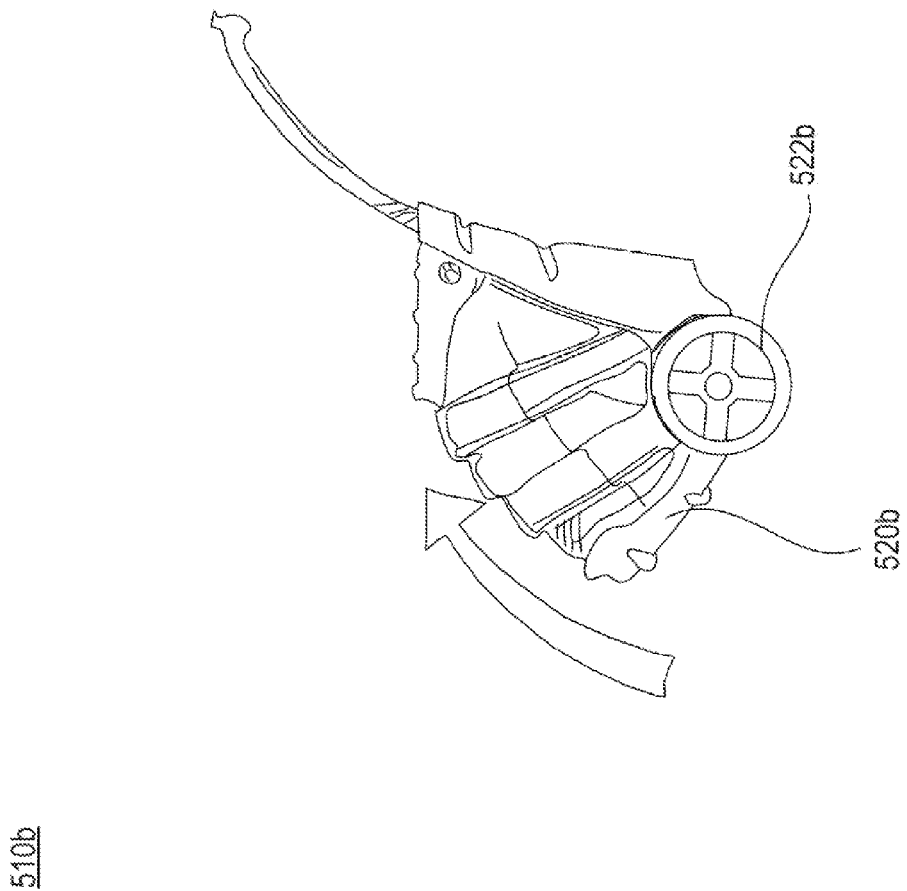

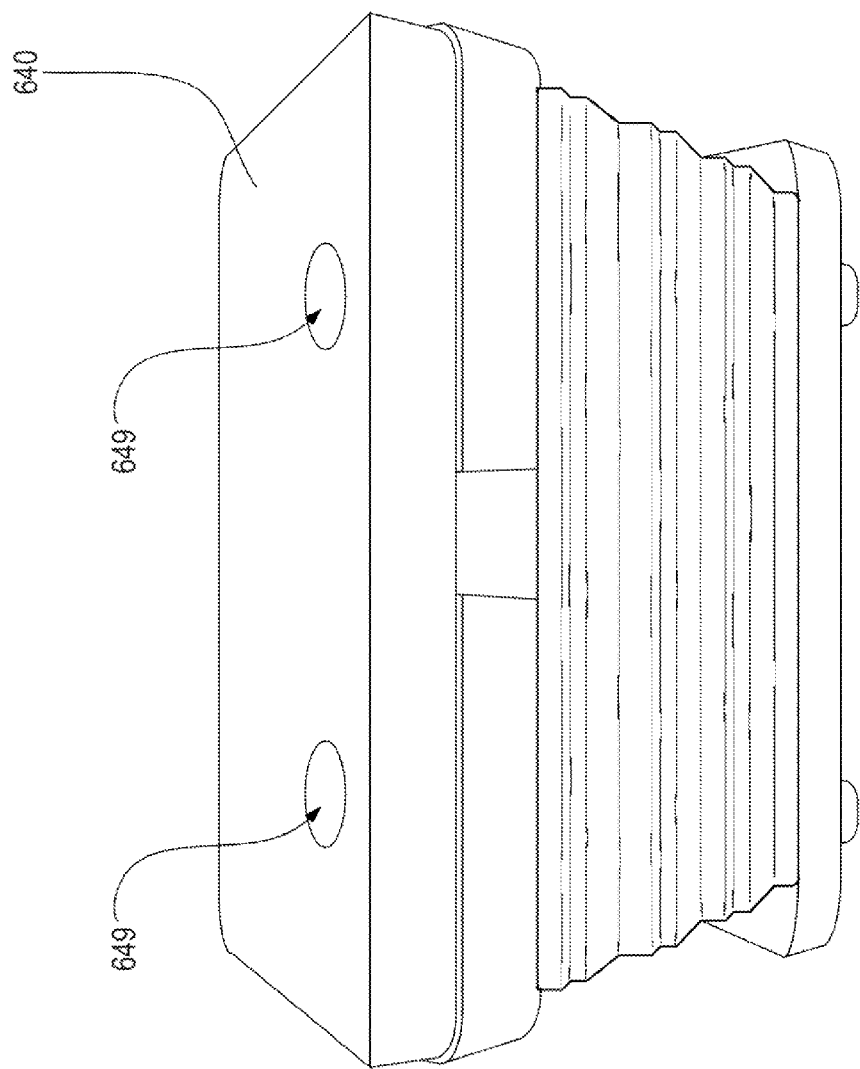

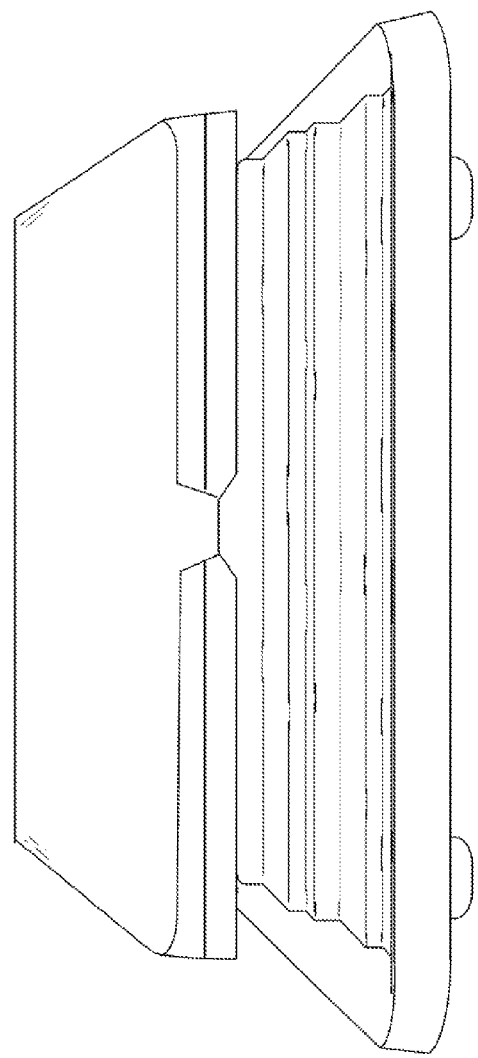

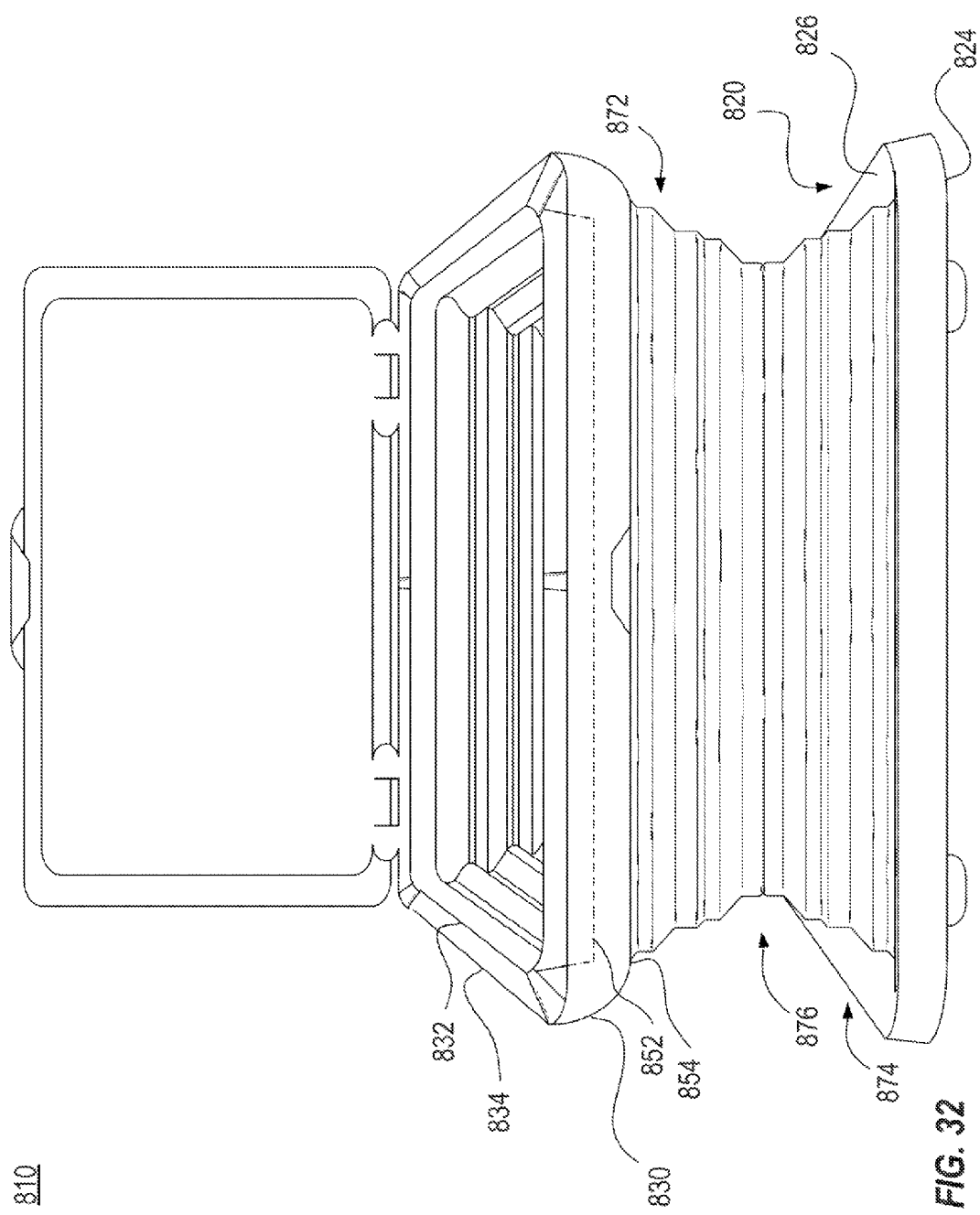

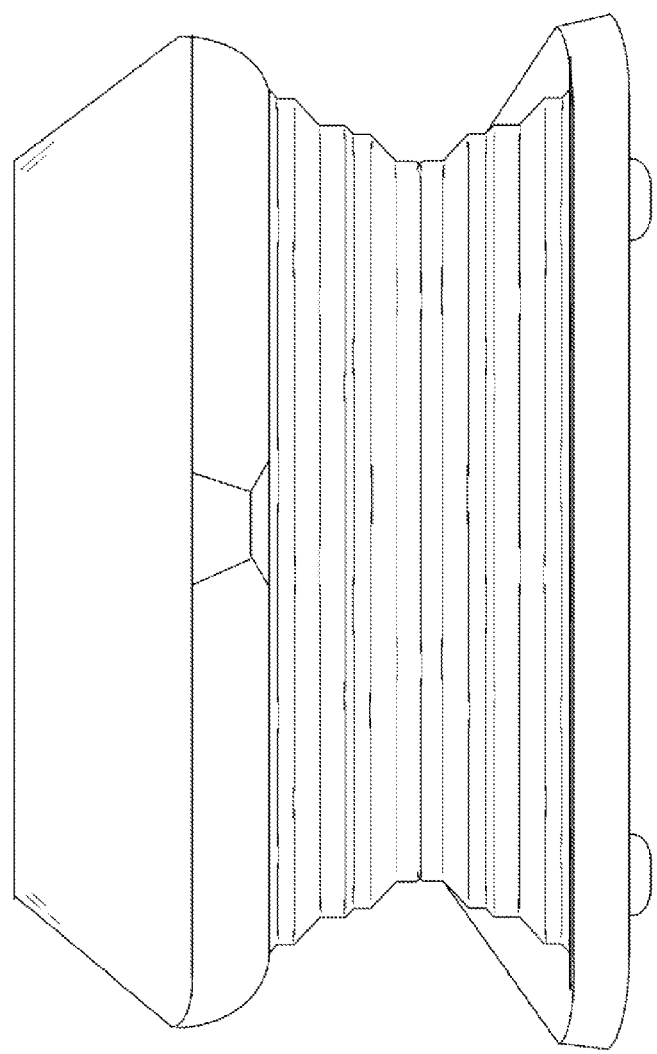

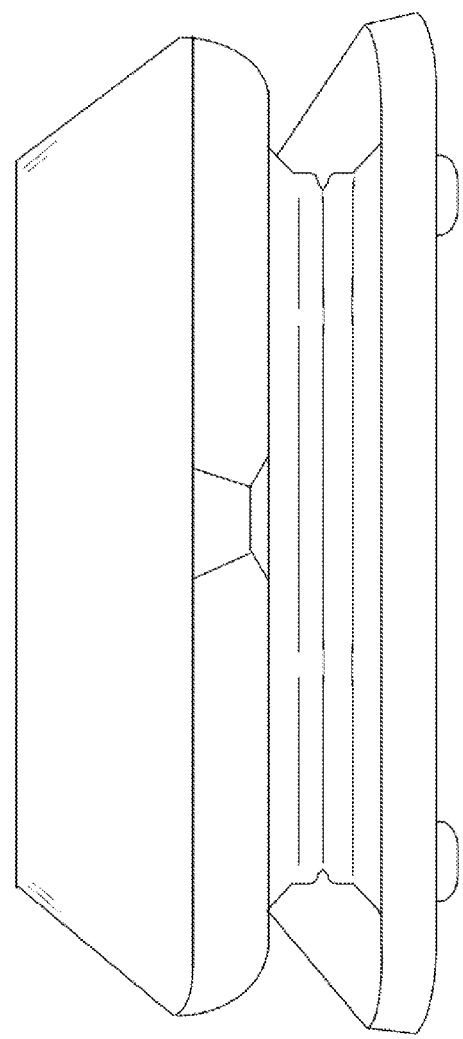

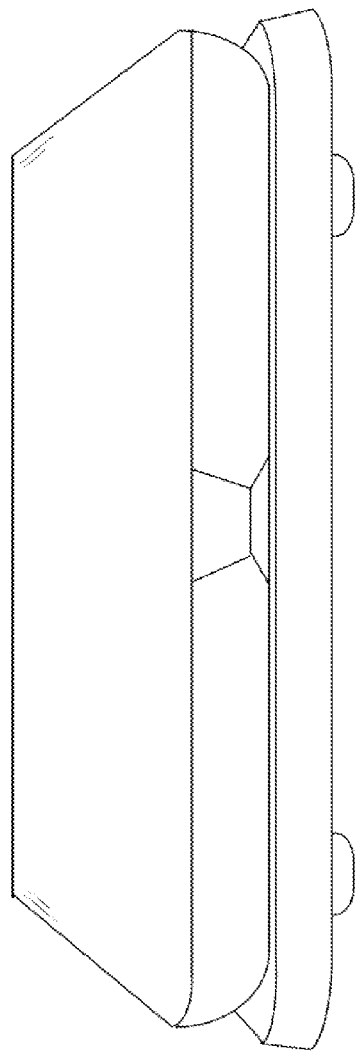

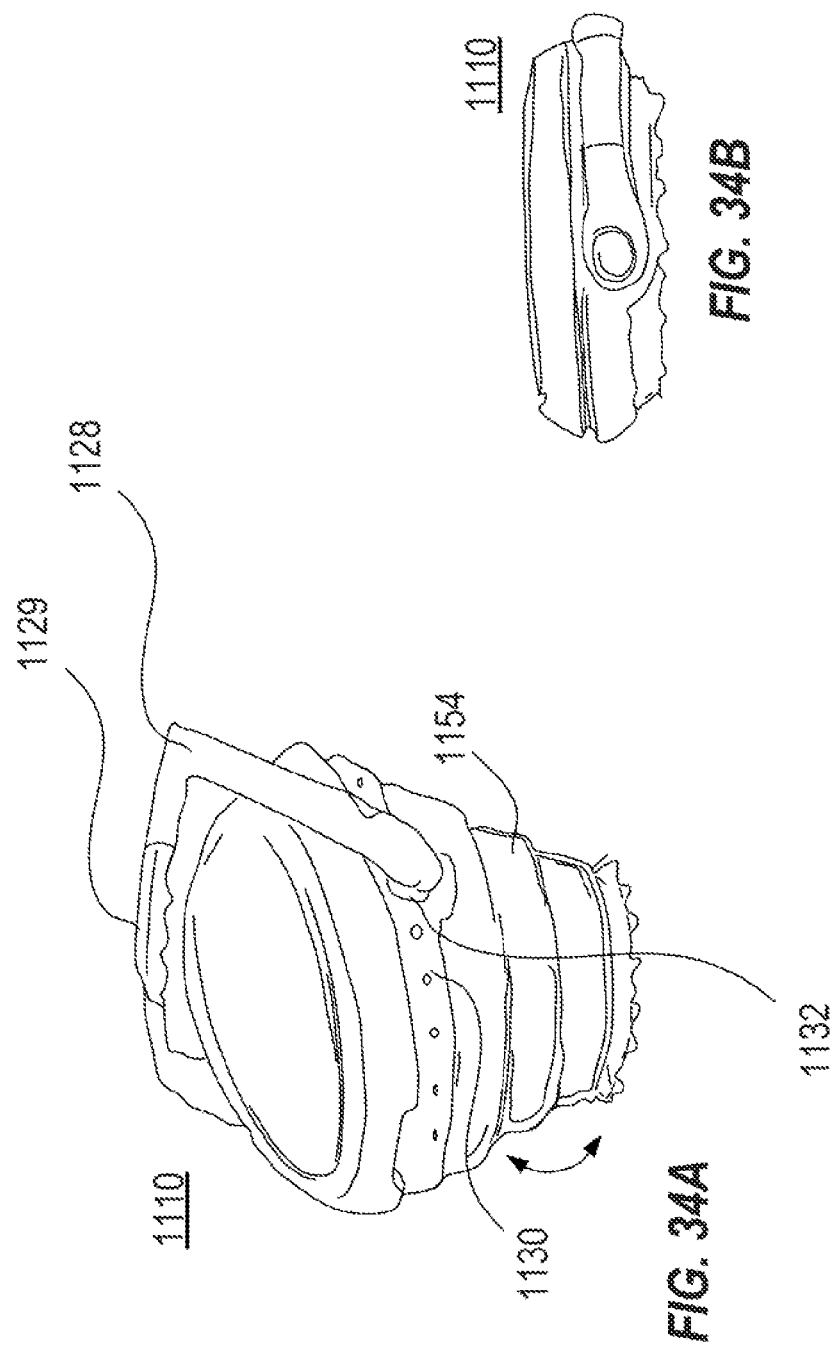

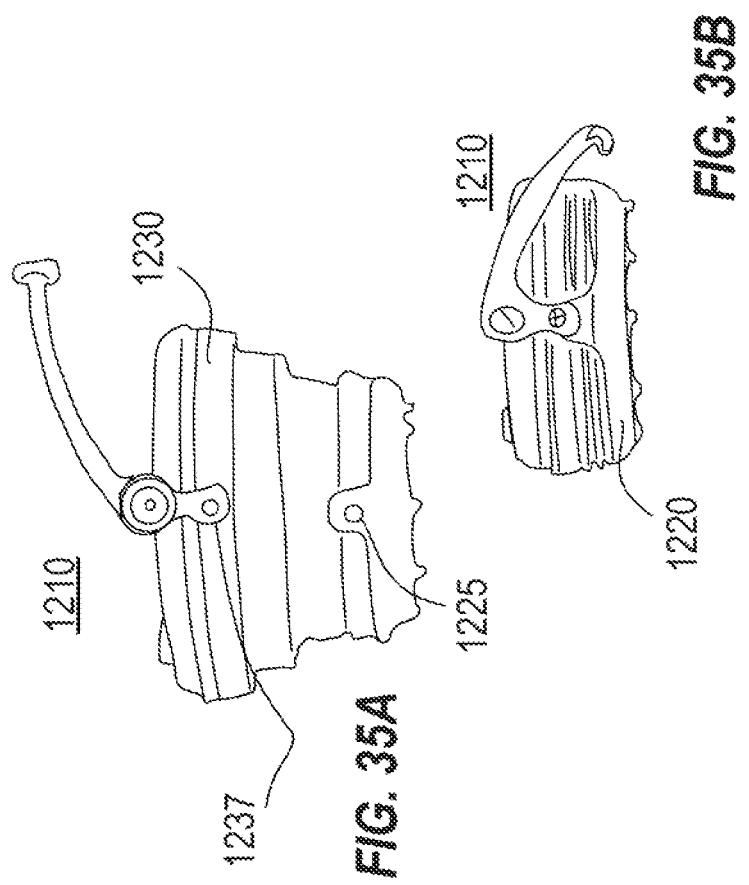

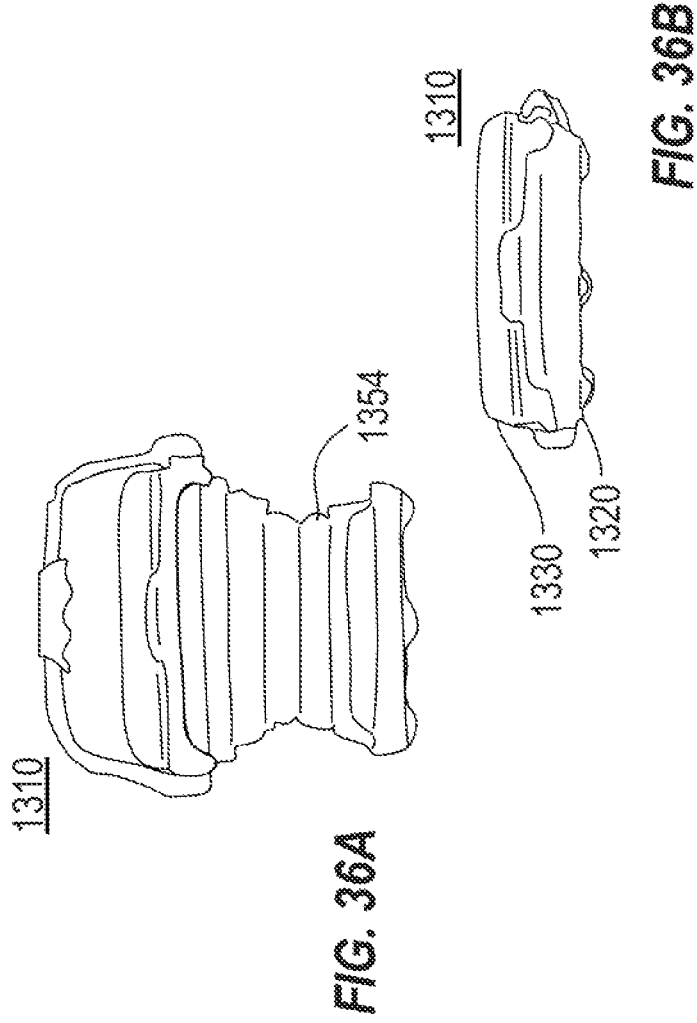

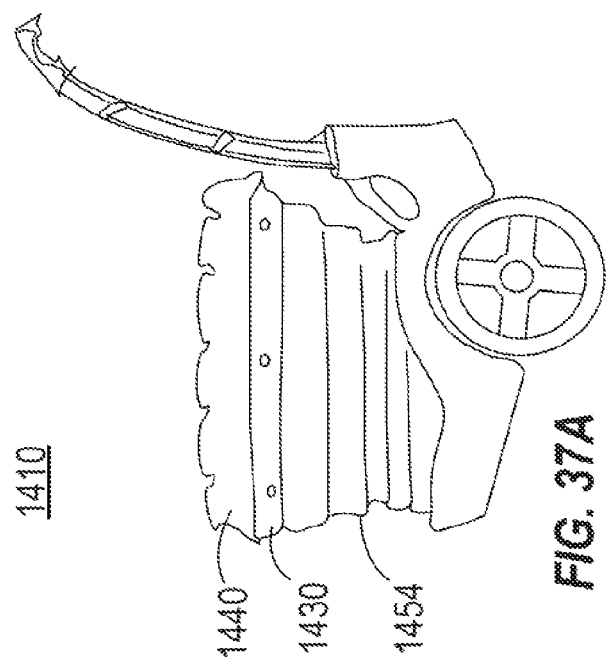
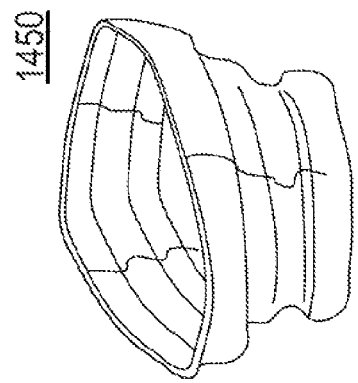
FIG. 37A
FIG. 37B

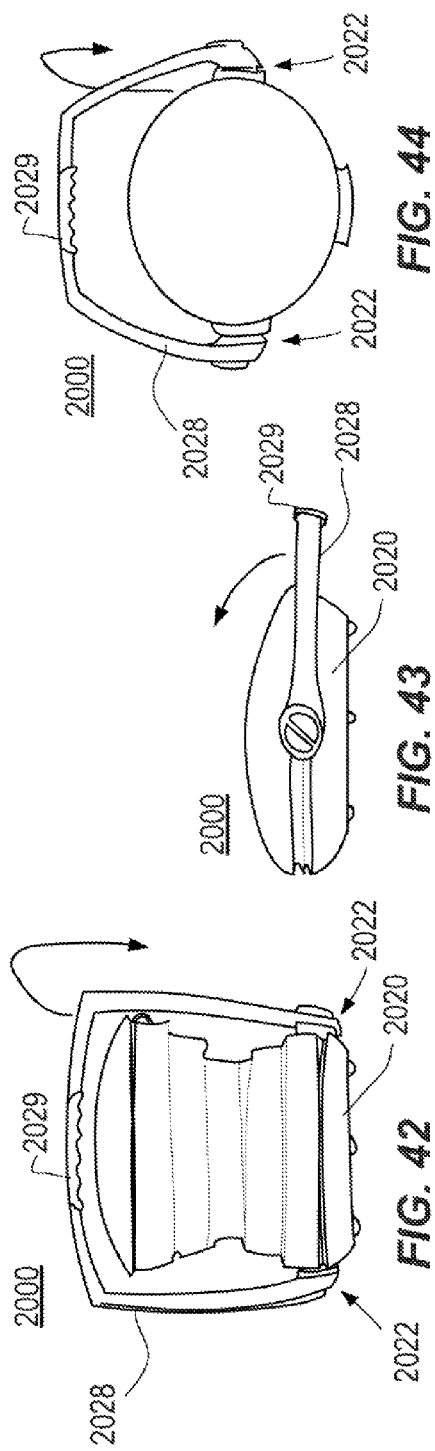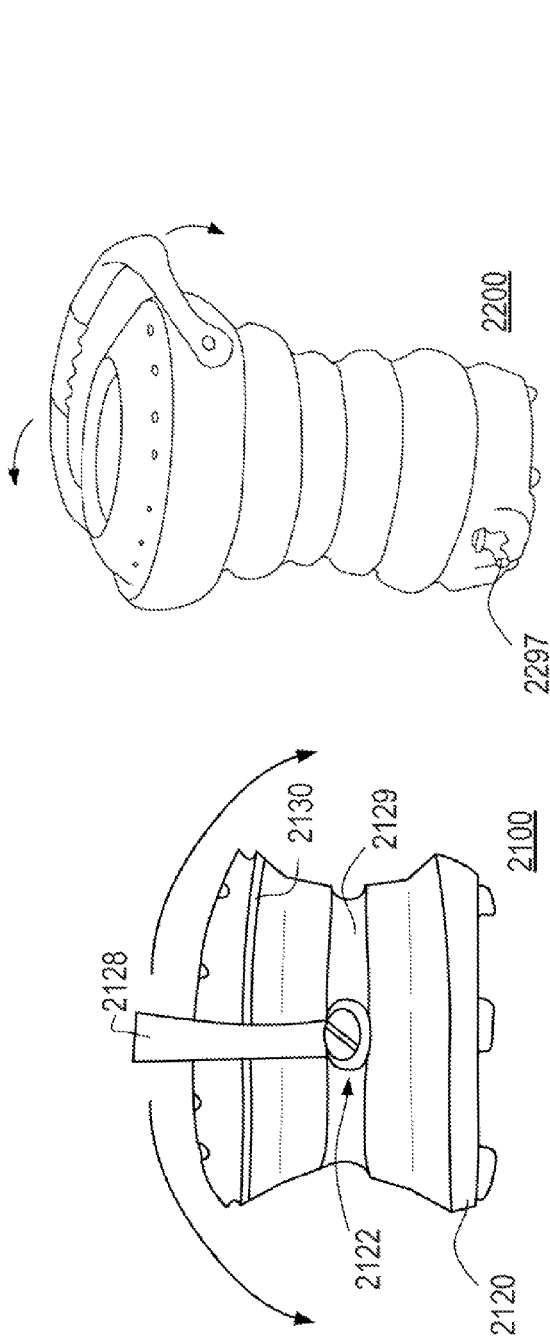

COOLER HAVING REMOVABLE WHEEL ASSEMBLY

CROSS-REFERENCE TO RELATED APPLICATION

The present application is a continuation-in-part of, and claims priority under 35 U.S.C. §120 to, U.S. nonprovisional patent application Ser. No. 13/526,485, filed Jun. 18, 2012, incorporated herein by reference, which '485 application is a nonprovisional of, and claims priority under 35 U.S.C. §119(e) to, U.S. provisional patent application Ser. No. 61/498,310, filed Jun. 17, 2011, incorporated herein by reference; and the present application is a continuation-in-part of, and claims priority under 35 U.S.C. §120 to U.S. nonprovisional patent application Ser. No. 12/940,940, filed Nov. 5, 2010, which '940 application is a continuation of, and claims priority under 35 U.S.C. §120 to, U.S. nonprovisional patent application Ser. No. 12/636,225, filed on Dec. 11, 2009, now U.S. Pat. No. 8,317,046, incorporated herein by reference, which '225 application is a nonprovisional of, and claims priority under 35 U.S.C. §119(e) to, U.S. provisional patent application Ser. No. 61/121,904, filed Dec. 11, 2008, incorporated herein by reference.

Additionally, the present application hereby incorporates by reference each of the following U.S. patents and U.S. patent application publications: U.S. Pat. No. 7,677,580; U.S. Pat. No. 7,387,305; U.S. Pat. No. 7,559,559; U.S. Pat. No. 7,543,828; U.S. Pat. No. 7,549,653; U.S. Pat. No. 7,458,589; U.S. Pat. No. 7,458,590; U.S. Pat. No. 7,458,591; U.S. Pat. No. 7,513,510; U.S. Pat. No. 7,677,581; US 2006/0237923 A1; US 2006/0237924 A1; US 2006/0237925 A1; US 2006/0237926 A1; US 2006/0237927 A1; US 2006/0237928 A1; US 2008/0223071 A1; US 2008/0223862 A1; US 2008/0223072 A1; US 2009/0019882 A1; US 2010/0154464 A1; US 2010/0147015; US 2011/0042390 A1; US 2011/0042391 A1; US 2011/0042392 A1; US 2011/0042393 A1; US 2011/0042394 A1; US 2011/0042395 A1; US 2011/0042396 A1; US 2011/0042397 A1; and US 2011/0042398 A1.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to portable coolers. Portable coolers are commonly used to transport chilled items, or to keep items chilled at a location. However, portable coolers, when loaded, can be very heavy, and thus difficult to transport. Some known portable coolers utilize wheels to facilitate transport.

Further, the present invention generally relates to an improved collapsible cooler. A drawback to many conventional coolers is that such coolers generally require a large amount of storage space when not used. Such coolers are typically stored in a garage, storage shed or closet when not in use because of their size. Further, such coolers take up relatively large amounts of space whenever they are transported for use. This is particularly disadvantageous when the coolers are packed into the family car when going on the family vacation at the beach. Because they are so large and bulky, they tend to consume a large portion of the available space in the car, thereby limiting the other items that can be taken on the vacation. In addition to being disadvantageous for consumers, such devices also are less desirable to retailers, who have limited shelf space on which to display goods for sale.

Collapsible insulated containers also are known which may be utilized for storage of perishable items and that have a storage configuration that is smaller in volume than their use configuration. Nonetheless, a need exists for improvement in wheeled and collapsible portable coolers. This, and other needs, are addressed by one or more aspects of the present invention.

SUMMARY OF THE INVENTION

The present invention includes many aspects and features. Moreover, while many aspects and features relate to, and are described in, certain contexts, the present invention is not limited to use only in such contexts, as will become apparent from the following summaries and detailed descriptions of aspects, features, and one or more embodiments of the present invention.

Accordingly, one aspect of the present invention relates to a cooler. The cooler includes a main body, a removable wheel assembly, and a wheel fastening system configured to secure the removable wheel assembly to a base of the main body.

In a feature of this aspect, the cooler further includes a lid, and the lid is configured to receive and retain the removable wheel assembly for storage when it is not secured to a base of the main body.

Another aspect of the present invention relates to a cooler. The cooler includes a main body including a base, an upper rim, and one or more cooler walls extending therebetween; a removable wheel assembly; and a wheel fastening system configured to secure the removable wheel assembly to the base of the main body.

In a feature of this aspect, the removable wheel assembly includes two coaxial wheels, and an axle. In some implementations, the axle includes two recessed portions adapted to align with a clip of the wheel fastening system when the removable wheel assembly is secured to the main body by the wheel fastening system. In some implementations, the base includes a u-shaped channel sized and dimensioned to correspond to an axle of the removable wheel assembly.

In a feature of this aspect, the wheel fastening system includes a mount, a clip hingedly connected to the mount, and a locking clasp configured to lock the clip into a closed position to secure the wheel assembly.

In a feature of this aspect, wherein the cooler further includes a lid. In some implementations, the lid includes one or more recesses configured to receive components of the wheel assembly. In some implementations, the lid includes one or more recesses configured to receive and retain components of the wheel assembly. In some implementations, the lid includes two wheel storage recesses, each being configured to receive and retain a wheel of the wheel assembly, and an axle storage recess configured to receive and retain an axle of the wheel assembly.

In another feature of this aspect, the cooler includes a handle. In some implementations, the handle is telescoping. In some implementations, the handle is removably attachable to the base. In at least one variation, the cooler includes a lid having a handle storage recess for storage of the handle. In some implementations, the handle is telescoping and removably attachable to the base.

Another aspect of the present invention relates to a cooler. The cooler includes a main body including a base, an upper rim, and one or more cooler walls extending therebetween; a removable wheel assembly which includes two coaxial wheels, and an axle. The two coaxial wheels are removably securable to the axle. The cooler further includes a wheel fastening system configured to secure the removable wheel assembly to the base of the main body, the wheel fastening system including a mount, a clip hingedly connected to the mount, and a locking clasp configured to lock the clip into a closed position to secure the wheel assembly. The cooler still further comprises a lid which includes two wheel storage recesses, each being sized and dimensioned to receive and retain one of the coaxial wheel of the wheel assembly, and an axle storage recess sized and dimensioned to receive and retain the axle of the wheel assembly.

Another aspect of the present invention relates to a cooler as disclosed.

Another aspect of the present invention relates to a method of removing wheels from a cooler as disclosed.

Another aspect of the present invention relates to a method of securing wheels to a cooler as disclosed.

Another aspect of the present invention relates to a method of removing wheels from a cooler and storing them using recesses in a lid of the cooler as disclosed.

Another aspect of the present invention relates to a method as disclosed.

Another aspect of the present invention relates to a system as disclosed.

Another aspect of the present invention relates to an apparatus as disclosed.

Accordingly, another aspect of the present invention relates to a cooler. The cooler includes a base; an upper rim; and inner and outer collapsible walls extending between said base end said upper rim, each of said inner and outer collapsible walls comprising a tapered, flexible membrane configured to be collapsible.

In a feature of this aspect of the invention, each said membrane includes a plurality of hinge lines, the membrane being configured to bend at each hinge line.

In a feature of this aspect of the invention, each said membrane includes a plurality of hinge lines, the membrane being configured to bend at each hinge line; and each hinge line of the plurality of hinge lines is generally less thick than another portion of the membrane.

In a feature of this aspect of the invention, each said membrane includes a plurality of hinge lines, the membrane being configured to bend at each hinge line; and each hinge line has upper and lower hinge faces associated therewith.

In a feature of this aspect of the invention, each said membrane includes a plurality of hinge lines, the membrane being configured to bend at each hinge line; each hinge line has upper and lower hinge faces associated therewith, and the upper and lower hinge faces associated with a particular hinge line are configured to generally abut one another when the membrane is folded about the particular hinge line.

In a feature of this aspect of the invention, each said membrane includes a plurality of hinge lines, the membrane being configured to bend at each hinge line; each hinge line has upper and lower hinge faces associated therewith; and (i) each membrane includes inner and outer surfaces, each surface including upper and lower hinge faces, and (ii) each hinge line has a complementary hinge line, such that when its membrane is folded at a first hinge line associated with upper and lower hinge faces of one of the inner and outer surfaces. Its membrane is also folded at a second, complementary hinge line associated with upper and lower hinge faces of the other of the inner and outer surfaces.

In a feature of this aspect of the invention, each said membrane includes a plurality of hinge lines, the membrane being configured to bend at each hinge line; and each membrane is folded at each of the hinge lines.

In a feature of this aspect of the invention, each said membrane includes a plurality of hinge lines, the membrane being configured to bend at each hinge line; and each membrane is folded at some, but not all, of the hinge lines.

In a feature of this aspect of the invention, each said membrane includes a plurality of hinge lines, the membrane being configured to bend at each hinge line; and each membrane is not folded at any of the hinge lines.

In a feature of this aspect of the invention, each membrane is stable.

In a feature of this aspect of the invention, each membrane includes a stiffening portion.

In a feature of this aspect of the invention, each membrane is formed of silicone rubber.

In a feature of this aspect of the invention, each membrane is formed of silicone rubber; and the silicone rubber has a softness of about 25 on the Shore A scale.

In a feature of this aspect of the invention, each of the inner and outer collapsible walls is attached to the base.

In a feature of this aspect of the invention, the cooler further comprises an interior space defined by the inner collapsible wall.

In a feature of this aspect of the invention, the cooler further comprises a void or intermediate space defined between the inner and outer collapsible walls.

In a feature of this aspect of the invention, the cooler has a volume of between approximately 16 quarts and 120 quarts.

In a feature of this aspect of the invention, the cooler is a water cooler.

In a feature of this aspect of the invention, the water cooler is configured to hold between approximately five gallons and approximately ten gallons.

In a feature of this aspect, of the invention, the water cooler has a generally circular perimeter.

In a feature of this aspect of the invention, each of the inner and outer collapsible walls is attached to the upper rim.

In a feature of this aspect of the invention, the upper rim comprises inner and outer rim walls.

In a feature of this aspect of the invention, the upper rim comprises inner and outer rim walls; and the inner and outer rim walls are rigid.

In a feature of this aspect of the invention, the upper rim comprises inner and outer rim walls; and a peripheral opening is defined between the inner and outer rim walls.

In a feature of this aspect of the invention, the upper rim comprises inner and outer rim walls; a peripheral opening is defined between the inner and outer rim walls; and a plurality of connectors secure the inner rim wall to the outer rim wall in a spaced apart relation.

In a feature of this aspect of the invention, the upper rim comprises inner and outer rim walls; a peripheral opening is defined between the inner and outer rim walls; a plurality of connectors secure the inner rim wall to the outer rim wall in a spaced apart relation; and the connectors comprise spokes.

In a feature of this aspect of the invention, the upper rim comprises inner and outer rim walls; and an inner opening is defined by the inner rim wall.

In a feature of this aspect of the invention, the upper rim comprises inner and outer rim walls; a peripheral opening is defined between the inner and outer rim walls; and the cooler further comprises an intermediate space defined between the inner and outer collapsible walls, whereby the peripheral opening provides access to the intermediate space.

In a feature of this aspect of the invention, the cooler further comprises an interior space defined by the inner collapsible wall, and the inner opening provides access to the interior space.

In a feature of this aspect of the invention, the cooler further comprises a lid.

In a feature of this aspect of the invention, the cooler further comprises a lid; and the lid is attached to a first side of the upper rim.

In a feature of this aspect of the invention, the cooler further comprises a lid; and the lid is attached at hinges.

In a feature of this aspect of the invention, the cooler further comprises a lid; and the lid is configured to be transitioned between (i) a closed position in which the lid is disposed in covering relation to an inner opening and a peripheral opening, and (ii) an open position.

In a feature of this aspect of the invention, the cooler further comprises a lid; and the lid is in the closed position.

In a feature of this aspect of the invention, the cooler further comprises a lid; and the lid is in the open position.

In a feature of this aspect of the invention, the cooler further comprises a lid; and the lid includes a raised peripheral portion.

In a feature of this aspect of the invention, the cooler further comprises a lid; and the lid includes a fastening component.

In a feature of this aspect of the invention, the cooler further comprises a lid; the lid includes a fastening component; and the fastening component is a male fastening insert configured to mate with a female fastening slot of the upper rim.

In a feature of this aspect of the invention, each of the inner and outer collapsible walls is configured to transition between a fully expanded configuration, a fully collapsed configuration, and a plurality of partially collapsed configurations.

In a feature of this aspect of the invention, said inner and outer collapsible walls generally expand or collapse together.

In a feature of this aspect of the invention, said outer collapsible wall is attached to a top surface of said base, and said inner collapsible wall includes a bottom wall.

In a feature of this aspect of the invention, outer collapsible wall is attached to a top surface of said base, and said inner collapsible wall includes a bottom wall; and an intermediate space is defined between (i) the inner and outer collapsible walls, and (ii) the top surface of said base and the bottom wall of said inner collapsible wall.

In a feature of this aspect of the invention, said inner collapsible wall is collapsed to a greater degree than said outer collapsible wall.

In a feature of this aspect of the invention, said upper rim includes a closed top surface.

In a feature of this aspect of the invention, said cooler further comprises an intermediate space defined between said inner and outer collapsible walls.

In a feature of this aspect of the invention, the cooler further comprises a drain conduit.

In a feature of this aspect of the invention, the cooler further comprises a drain conduit; and the drain conduit is a cylindrical tube providing fluid communication between an exterior of the cooler and an interior space defined by said inner collapsible wall.

In a feature of this aspect of the invention, the cooler further comprises a drain conduit; and the drain conduit is a cylindrical tube providing fluid communication between an exterior of the cooler and an intermediate space defined between said inner and outer collapsible walls.

In a feature of this aspect of the invention, the cooler further comprises a drain conduit; and the cooler further comprises a second drain conduit.

In a feature of this aspect of the invention, the cooler further comprises a drain conduit; and the cooler further comprises a second drain conduit providing fluid communication between an exterior of the cooler and an intermediate space defined between said inner and outer collapsible walls.

In a feature of this aspect of the invention, the cooler further comprises a drain conduit; the cooler further comprises a second drain conduit; and the second drain conduit is a cylindrical tube.

In a feature of this aspect of the invention, the cooler further comprises a drain conduit; and the drain conduit comprises a plug.

In a feature of this aspect of the invention, the cooler further comprises a drain conduit; and the drain conduit comprises a spigot.

In a feature of this aspect of the invention, the cooler comprises two gripping handles.

In a feature of this aspect of the invention, the cooler comprises two gripping handles; and each gripping handle comprises a portion of said upper rim extending beyond a lid of the cooler when the lid is in a closed position.

In a feature of this aspect of the invention, the cooler comprises two gripping handles; and each gripping handle is defined by an aperture in said upper rim.

In a feature of this aspect of the invention, the cooler comprises a gripping handle.

In a feature of this aspect of the invention, the cooler comprises a gripping handle; and the gripping handle comprises a portion of said upper rim extending beyond a lid of the cooler when the lid is in a closed position.

In a feature of this aspect of the invention, the cooler comprises a gripping handle; and the gripping handle is defined by an aperture in said upper rim.

In a feature of this aspect of the invention, said base comprises two pairs of coaxial wheels.

In a feature of this aspect of the invention, said base comprises a pair of coaxial wheels.

In a feature of this aspect of the invention, said base comprises a pair of coaxial wheels; and each wheel of the pair of coaxial wheels is large enough to easily roll across sand.

In a feature of this aspect of the invention, said base comprises a pair of coaxial wheels; and each wheel of the pair of coaxial wheels has a height of about ten inches.

In a feature of this aspect of the invention, said base comprises a pair of coaxial wheels; and each wheel of the pair of coaxial wheels has a tread width of about three inches In a feature of this aspect of the invention, said upper rim comprises a lid, said lid including a cup holder.

In a feature of this aspect of the invention, said upper rim comprises a lid, said lid including a cup holder defined therein.

In a feature of this aspect of the invention, said upper rim has a greater diameter than a diameter of said base.

In a feature of this aspect of the invention, said base has a greater diameter than a diameter of said upper rim.

In a feature of this aspect of the invention, said upper rim has a diameter substantially equal to a diameter of said base.

In a feature of this aspect of the invention, each said membrane includes a top portion and a bottom portion, a diameter of the top portion being greater than a diameter of the bottom portion.

In a feature of this aspect of the invention, each said membrane includes a top portion and a bottom portion, a diameter of the bottom portion being greater than a diameter of the top portion.

In a feature of this aspect of the invention, each said membrane includes a top portion and a bottom portion, a diameter of the bottom portion being substantially equal to a diameter of the top portion.

In a feature of this aspect of the invention, said upper rim has a greater diameter than a peripheral profile of said base.

In a feature of this aspect of the invention, said base has a greater peripheral profile than a peripheral profile of said upper rim.

In a feature of this aspect of the invention, said upper rim has a peripheral profile substantially equal to a peripheral profile of said base.

In a feature of this aspect of the invention, each said membrane includes a top portion and a bottom portion, a peripheral profile of the top portion being greater than a peripheral profile of the bottom portion.

In a feature of this aspect of the invention, each said membrane includes a top portion and a bottom portion, a peripheral profile of the bottom portion being greater than a peripheral profile of the top portion.

In a feature of this aspect of the invention, each said membrane includes a top portion and a bottom portion, a peripheral profile of the bottom portion being substantially equal to a peripheral profile of the top portion.

In a feature of this aspect of the invention, said base includes four rotating wheels.

In a feature of this aspect of the invention, said base includes three rotating wheels.

In a feature of this aspect of the invention, said base comprises a handle attached thereto.

In a feature of this aspect of the invention, said upper rim comprises a handle attached thereto.

In a feature of this aspect of the invention, said upper rim comprises a handle attached thereto; and the handle is attached to the upper rim by a hinge.

In a feature of this aspect of the invention, the cooler further comprises a carrying handle rotatably attached to said upper rim.

In a feature of this aspect of the invention, the cooler further comprises a carrying handle rotatably attached to said upper rim; and the carrying handle is configured to swivel from a first side of the cooler to a second side of the cooler.

In a feature of this aspect of the invention, the cooler further comprises a carrying handle rotatably attached to said upper rim; and the carrying handle includes a grip portion.

In a feature of this aspect of the invention, when the cooler is in a fully collapsed configuration, each membrane is generally arranged in a common plane, and the carrying handle is configured to retain the cooler in the fully collapsed configuration.

In a feature of this aspect of the invention, said upper rim is configured to be secured to said base when the cooler is in a fully collapsed configuration.

In a feature of this aspect of the invention, said upper rim is configured to be secured to said base utilizing snap fasteners.

In a feature of this aspect of the invention, said outer collapsible wall is generally unexposed when the cooler is in a fully collapsed configuration.

In a feature of this aspect of the invention, said base is shaped and dimensioned to mate with said upper rim when the cooler is in a fully collapsed configuration.

In a feature of this aspect, of the invention, the cooler has a generally rectangular perimeter.

In a feature of this aspect of the invention, the cooler has a generally trapezoidal perimeter.

In a feature of this aspect of the invention, the cooler has a generally elliptical perimeter.

In a feature of this aspect of the invention, the cooler has a generally circular perimeter.

In a feature of this aspect of the invention, the cooler further comprises a lid, the lid being completely detachable from said upper rim.

In a feature of this aspect of the invention, each of said inner and outer collapsible walls comprises a plurality of membranes.

In a feature of this aspect of the invention, each of said inner and outer collapsible walls comprises a plurality or membranes; and each of said inner and outer collapsible walls further comprises a plurality of rigid portions, each rigid portion joining together two or more membranes of the plurality of membranes.

Another aspect of the present invention relates to a cooler. The cooler includes an upper rim; an inner collapsible wall extending between an inner bottom wall and said upper rim; and an outer collapsible wall extending between an outer bottom wall and said upper rim; wherein each of said inner and outer collapsible walls comprises a tapered, flexible membrane configured to collapse.

In a feature, each of said inner and outer collapsible walls comprises a tapered, flexible membrane configured to collapse between two stable configurations and at least one intermediate configuration such that the cooler has a collapsed configuration and two usable configurations, the two usable configurations having a different containment volume for receiving items within the cooler.

In a feature of this aspect of the invention, an intermediate space is defined (a) between said inner and outer collapsible walls, and (b) between the inner and outer bottom walls.

Another aspect of the present invention relates to a cooler. The cooler includes an upper rim; an inner collapsible wall extending between a bottom wall and said upper rim; and an outer collapsible wall extending between the bottom wall and said upper rim; wherein each of said inner and outer collapsible walls comprises a tapered, flexible membrane configured to be collapsible.

Another aspect of the present invention relates to a cooler. The cooler includes an upper rim; an inner collapsible wall extending between a bottom wall and said upper rim; and an outer collapsible wall extending between the bottom wall and said upper rim; wherein each of said inner and outer collapsible walls comprises a tapered, flexible membrane configured to collapse between two stable configurations and at least one intermediate configuration such that the cooler has a collapsed configuration and two usable configurations, the two usable configurations having a different containment volume for receiving items within the cooler.

Another aspect of the present invention relates to a cooler. The cooler includes an inner collapsible wall extending upwards from a bottom wall; and an outer collapsible wall extending upwards from a bottom wall; wherein each of said inner and outer collapsible walls comprises a tapered, flexible membrane configured to be collapsible.

Another aspect of the present invention relates to a cooler. The cooler includes an inner collapsible wall extending upwards from a bottom wall; and an outer collapsible wall extending upwards from a bottom wall; wherein each of said inner and outer collapsible walls comprises a tapered, flexible membrane configured to collapse between two stable configurations and at least one intermediate configuration such that the cooler has a collapsed configuration and two usable configurations, the two usable configurations having a different containment volume for receiving items within the cooler.

In a feature of this aspect of the invention, the cooler further includes a plurality of spokes joining together said inner and outer collapsible walls.

Another aspect of the present invention relates to a cooler. The cooler includes a base; and inner and outer collapsible walls extending upward from said base, each of said inner and outer collapsible walls comprising a tapered, flexible membrane configured to be collapsible. Still another aspect of the present invention relates to a cooler. The cooler includes a base; and inner and outer collapsible walls extending upward from said base, each of said inner and outer collapsible walls comprising a tapered, flexible membrane configured to collapse between two stable configurations and at least one intermediate configuration such that the cooler has a collapsed configuration and two usable configurations, the two usable configurations having a different containment volume for receiving items within the cooler.

Another aspect of the present invention relates to a cooler. The cooler includes a base; an upper rim; and a collapsible wall extending between said base and said upper rim, said collapsible wall comprising a tapered, flexible membrane configured to be collapsible. Still another aspect of the present invention relates to a cooler. The cooler includes a base; an upper rim; and a collapsible wall extending between said base and said upper rim, said collapsible wall comprising a tapered, flexible membrane configured to collapse between two stable configurations and at least one intermediate configuration such that the cooler has a collapsed configuration and two usable configurations, the two usable configurations having a different containment volume for receiving items within the cooler.

In another aspect, a cooler includes a base defining a bottom portion of the cooler; an upper rim defining an upper portion of the cooler; a collapsible cooler wall, extending between and attached to said base and said upper rim and surrounding an interior storage space of the cooler, and including a membrane having a plurality of hinge lines at which the membrane is configured to bend such that the membrane is transitional between a collapsed configuration and an expanded configuration, wherein the cooler is transitional between an expanded configuration for use of the cooler, and a collapsed configuration during nonuse of the cooler, by bending along the hinge lines, each of the configurations corresponding to a stable configuration of the cooler; and a handle for lifting of the cooler, wherein the handle is attached to the base and is configured for rotational movement relative to the base about a pivot axis. In independent features of this aspect, the handle is configured to swivel over a top of the cooler from one side to another when the cooler is in the fully expanded configuration; the handle is locatable laterally adjacent the flexible elastomeric membrane when fully collapsed; the collapsible cooler wall consists of a single collapsible wall formed from the flexible elastomeric membrane; and the collapsible cooler wall comprises a plurality of flexible elastomeric membranes.

In yet another aspect, an expandable and collapsible cooler includes: a base defining a bottom portion of the cooler; an upper rim defining an upper portion of the cooler; a collapsible cooler wall, the cooler wall comprising a plurality of flexible elastomeric membranes, each including a plurality of hinge lines at which the membrane is configured to bend such that the membrane is transitional between a collapsed configuration and an expanded configuration, wherein the cooler is transitional between an expanded configuration for use of the cooler, and a collapsed configuration during nonuse of the cooler, by bending along the hinge lines of the plurality of flexible elastomeric membranes, each of the configurations corresponding to a stable configuration of the cooler; an intermediate rigid portion located between the base and the rim, wherein at least one upper membrane extends between and is attached to said upper rim and said intermediate rigid portion, and wherein at least one lower membrane extends between and is attached to said base; and a handle for lifting of the cooler, wherein the handle is attached to the intermediate rigid portion and is configured for rotational movement relative to the intermediate rigid portion about a pivot axis. In independent features of this aspect, the handle is configured to swivel over a top of the cooler from one side to another when the cooler is in the fully expanded configuration; the handle is locatable laterally adjacent the flexible elastomeric membranes when fully collapsed; the cooler wall comprises an inner collapsible wall and an outer collapsible wall formed from the flexible elastomeric membranes; the cooler wall tapers inwardly from the rim toward the rigid intermediate portion; the cooler wall tapers inwardly from the base toward the rigid intermediate portion; and the upper member is expandable and collapsible independent of the expansion or contraction of the lower member;

Another aspect of the present invention relates to a transportable apparatus. The transportable apparatus includes a cooler and a wheeled platform.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals.

FIG. 23A is a perspective view of the cooler of FIG. 20 in a fully expanded configuration with the lid closed.

FIG. 24 is a perspective view of a variation of the cooler of FIG. 23A.

FIG. 29B is a side view of another cooler in accordance with the sixth preferred embodiment of the invention.

FIG. 30 is a perspective view of a cooler in accordance with a seventh preferred embodiment of the invention.

FIG. 31B is a perspective view of the cooler of FIG. 31A in a partially collapsed configuration.

FIG. 32 is a perspective view of a cooler in accordance with a ninth preferred embodiment of the invention.

FIG. 32A is a perspective view of the cooler of FIG. 31 in a fully expanded configuration with the lid closed.

FIG. 32B is a perspective view of the cooler of FIG. 31A in a partially collapsed configuration.

FIG. 32D is a perspective view of the cooler of FIG. 31A in a fully collapsed configuration.

FIG. 34A is a perspective view of a cooler in accordance with an eleventh preferred embodiment of the invention.

FIG. 34B is another perspective view of the cooler of FIG. 34A.

FIG. 35A is a perspective view of a cooler in accordance with a twelfth preferred embodiment of the invention.

FIG. 35B is another perspective view of the cooler of FIG. 35A.

FIG. 36A is a perspective view of a cooler in accordance with a thirteenth preferred embodiment of the invention.

FIG. 36B is another perspective view of the cooler of FIG. 36A.

FIG. 37A is a perspective view of a cooler in accordance with a fourteenth preferred embodiment of the invention.

FIG. 37B is a perspective view of the wall of the cooler of FIG. 37A.

FIG. 42 is a front elevational view of a cooler in accordance with a twentieth preferred embodiment of the invention, wherein the cooler is in an expanded configuration.

FIG. 43 is a side elevational view of the cooler of FIG. 42, wherein the cooler is in a collapsed configuration.

FIG. 44 is a top plan view of the cooler of FIG. 43.

FIG. 45 is a front elevational view of a cooler in accordance with a twenty-first preferred embodiment of the invention, wherein the cooler is in an expanded configuration.

FIG. 46 is a perspective view of a cooler in accordance with a twenty-second preferred embodiment of the invention, wherein the cooler is in an expanded configuration.

DETAILED DESCRIPTION

Figure 1:
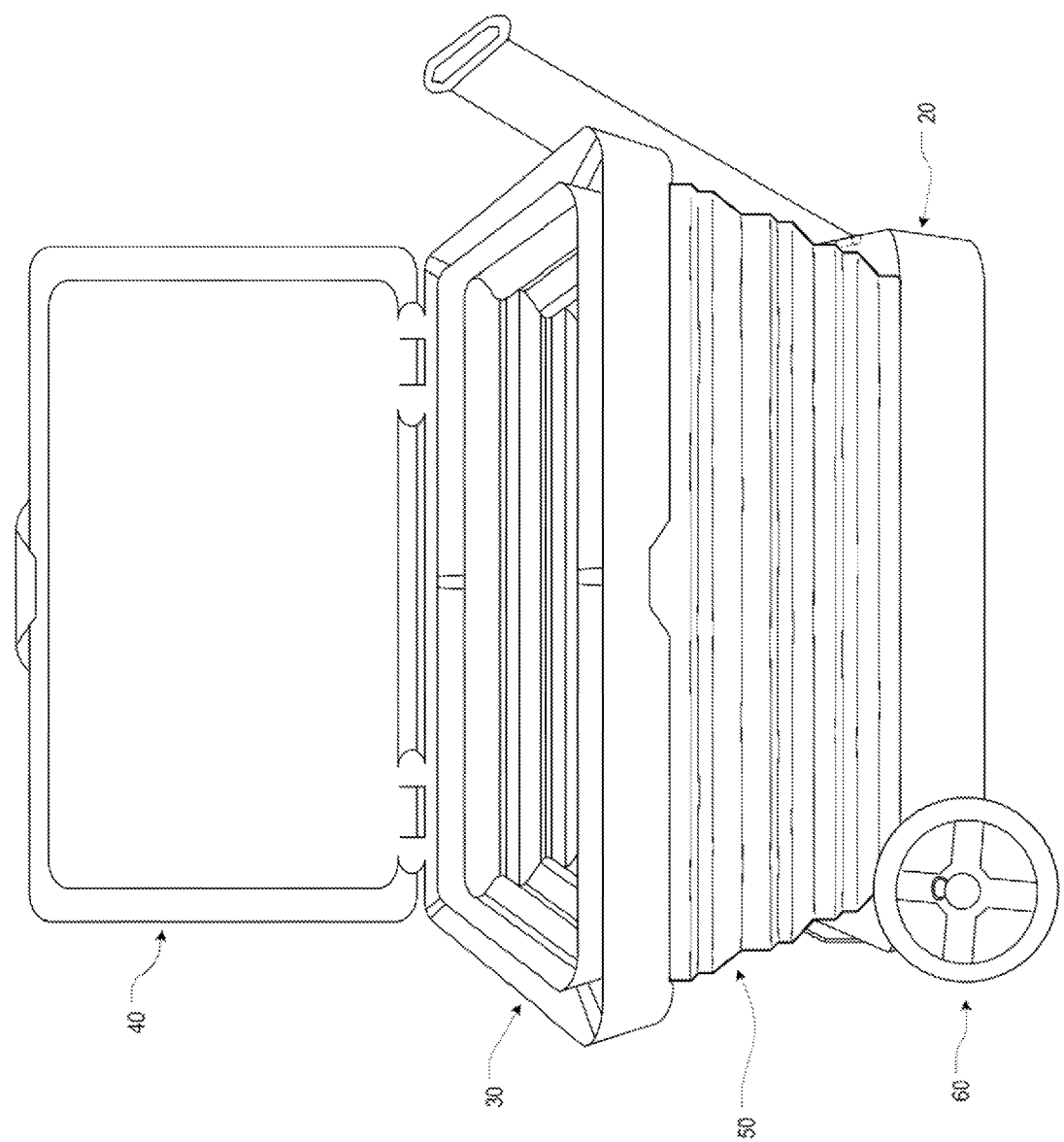
FIG. 1 is a perspective view of a preferred embodiment of a cooler having a removable wheel assembly in accordance with one or more aspects of the present invention.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers."Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

A First Preferred Embodiment

FIG. 1 is a perspective view of a preferred embodiment of a cooler 10 in accordance with one or more aspects of the present invention. The cooler 10 comprises a base 20, an upper rim 30, a lid 40, and a cooler wall 50 extending between the base 20 and the upper rim 30. The cooler further comprises a removable wheel assembly 60 attached to the base 20.

Figure 2A:
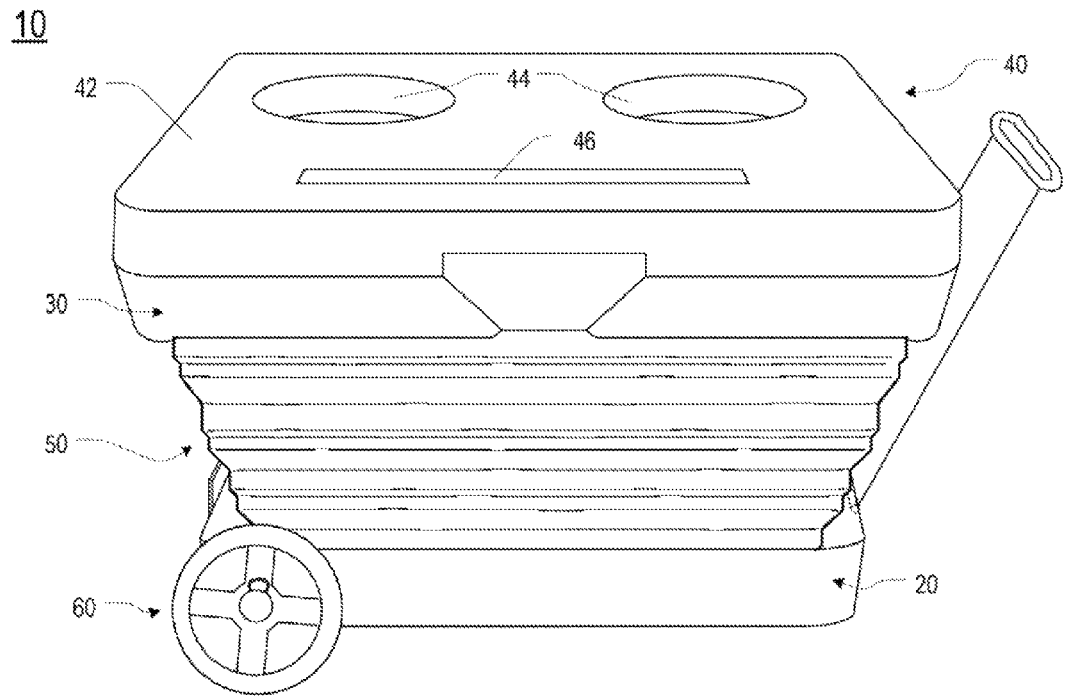
FIG. 2A is a perspective view of the cooler of FIG. 1 with the lid in a closed orientation.

FIG. 2A is a perspective view of the cooler 10 of FIG. 1 with the lid 40 in a closed orientation. The top surface 42 of the lid 40 includes a plurality of recesses including two wheel storage recesses 44 and an axle storage recess 46.

Figure 2B:
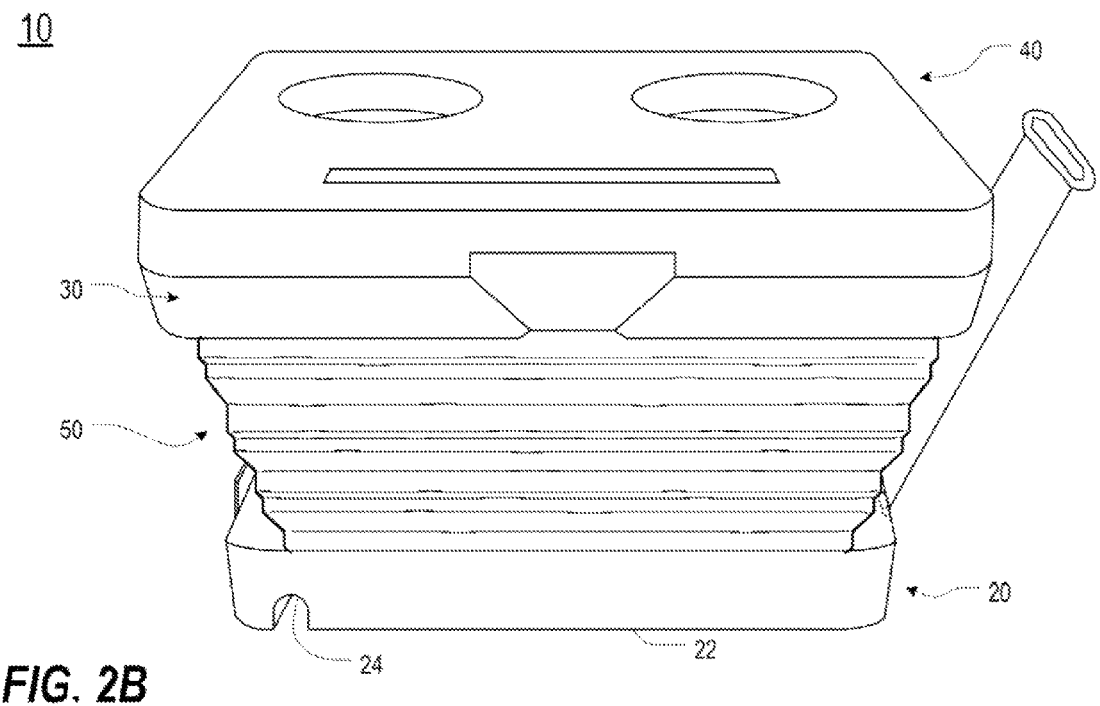
FIG. 2B is a perspective view of the cooler of FIG. 1 shown without the removable wheel assembly.

FIG. 2B is a perspective view of the cooler 10 of FIG. 1 with the removable wheel assembly 60 removed from the base 20. The base 20 has a generally rectangular perimeter and includes a bottom surface 22 having a U-shaped channel 24 adapted to receive the removable wheel assembly 60 therein.

Figure 3:
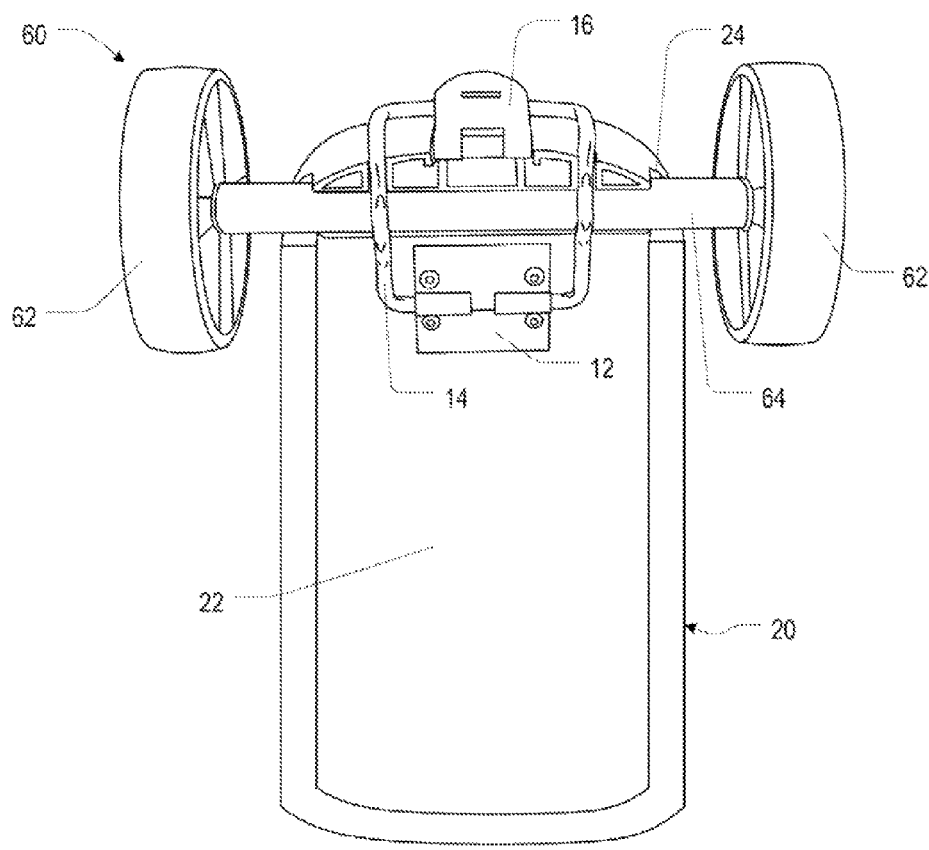
FIG. 3 is a bottom view of the cooler of FIG. 1.

FIG. 3 is a bottom view of the cooler 10 of FIG. 1 including the removable wheel assembly 60 disposed within the U-shaped channel 24. The removable wheel assembly comprises two coaxial wheels 62 and an axle 64. The removable wheels assembly 60 facilitates rolling motion of the cooler 10 from one location to another and is preferably constructed of a material capable of supporting the weight of the stems stored in and on the cooler 10. It is preferred that the removable wheel assembly 680 be able to support at least about ninety pounds. It is more preferred that the removable wheel assembly 60 be able to support at least about one hundred and ten pounds.

As further seen in FIG. 3, the bottom 22 of the base 20 includes a wheel fastening system, including a mount 12 affixed to the bottom 22 of the base 20, a clip 14 hingedly connected to the mount 12, and a locking clasp 16. The clip 14, when in an open position, allows for the insertion and removal of the removable wheel assembly 60 from the U-shaped channel 24. The clip 14, when in a closed position, holds the removable wheel assembly 60 within the U-shaped channel 24. The clip 14 is locked into the closed position with the locking clasp 16.

Figure 4:
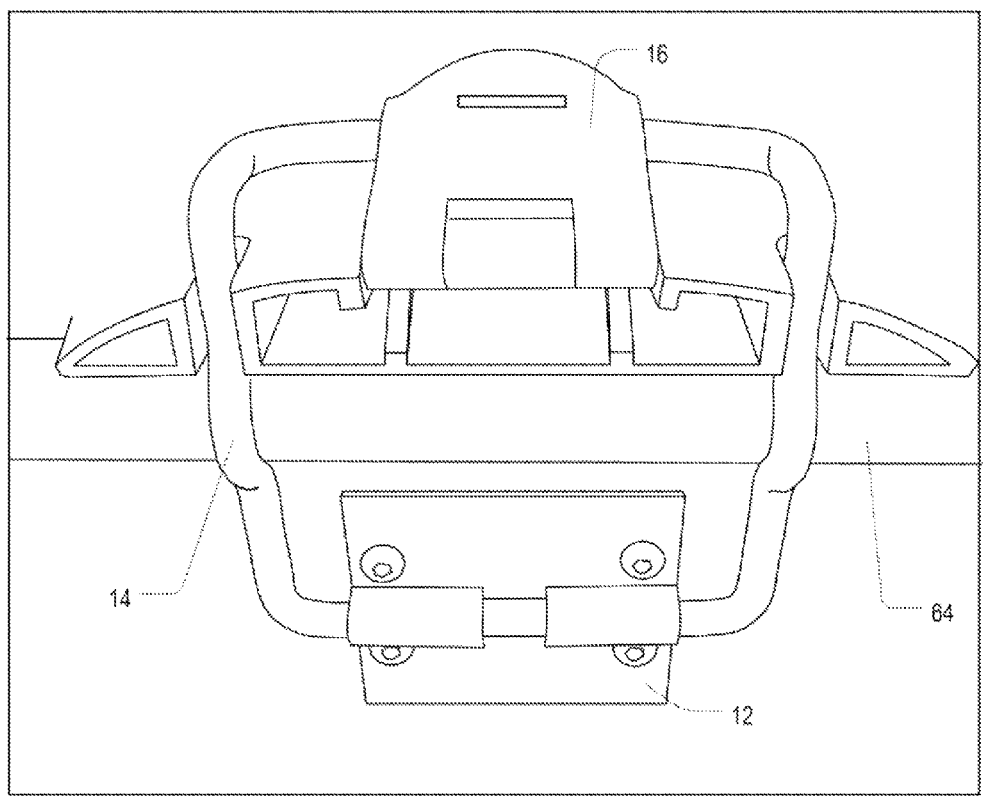
FIG. 4 is a detailed bottom view of the cooler of FIG. 1.

FIG. 4 is a detailed bottom view of the cooler 10 of FIG. 1, illustrating the wheel fastening system locked in the closed position.

Figure 5:
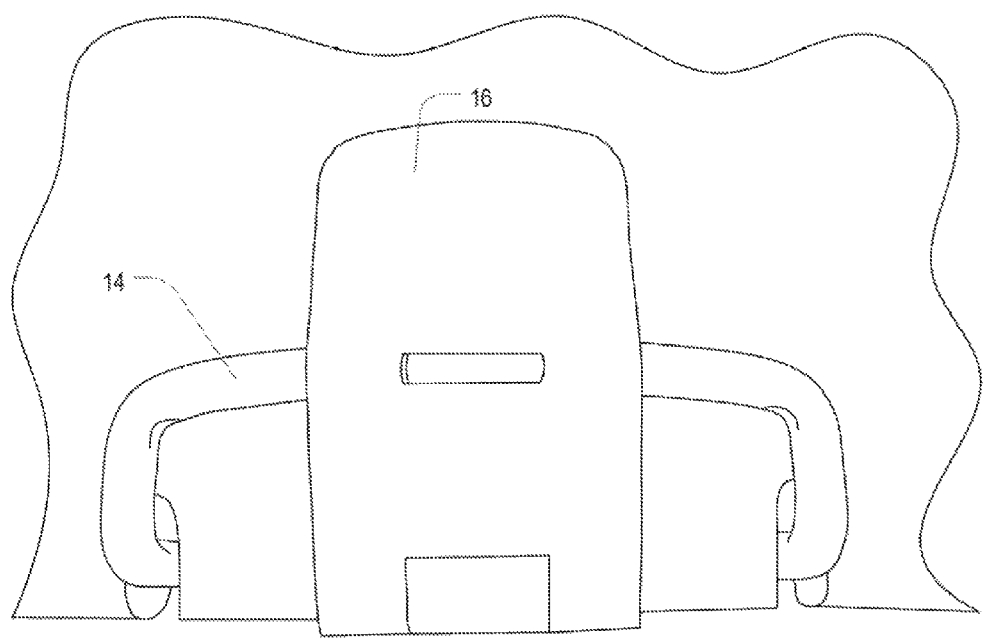
FIG. 5 is a detailed side view of the cooler of FIG. 1.

FIG. 5 is a detailed side view of the cooler 10 of FIG. 1, illustrating the wheel fastening system locked in the closed position.

Figure 6:
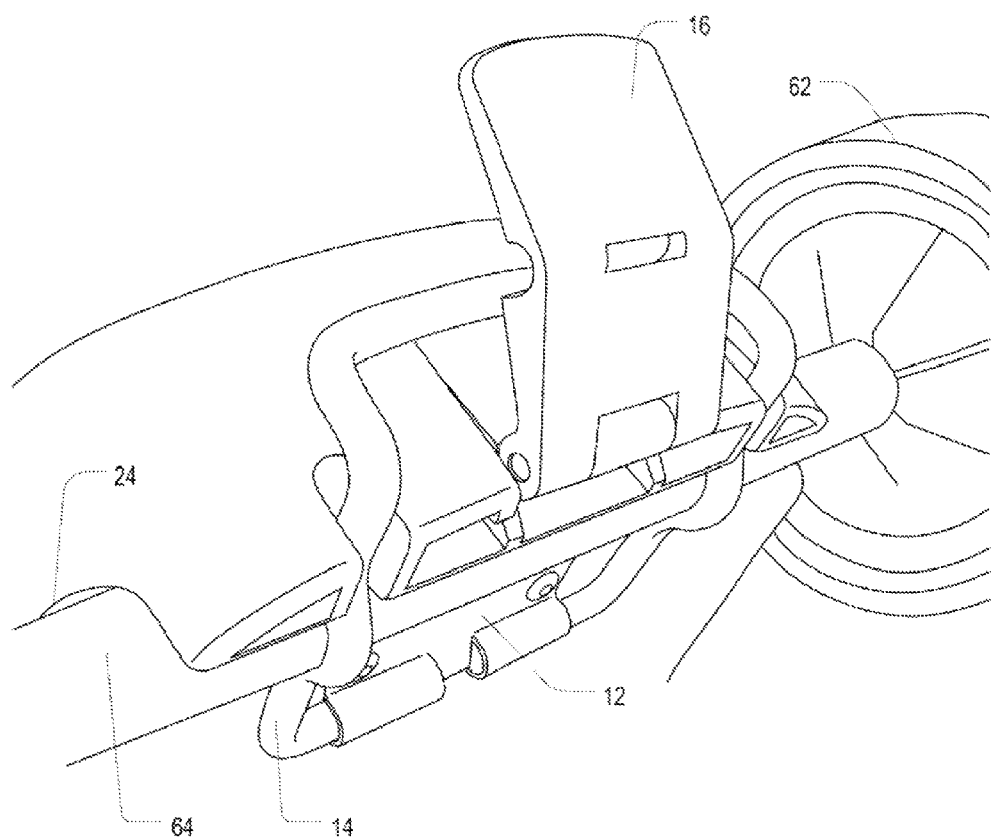
FIG. 6 is a perspective view of the cooler of FIG. 1.

FIG. 6 is a perspective view of the cooler 10 of FIG. 1, illustrating the wheel fastening system in the closed position with the locking clasp 16 disengaged from the clip 14.

Figure 7:
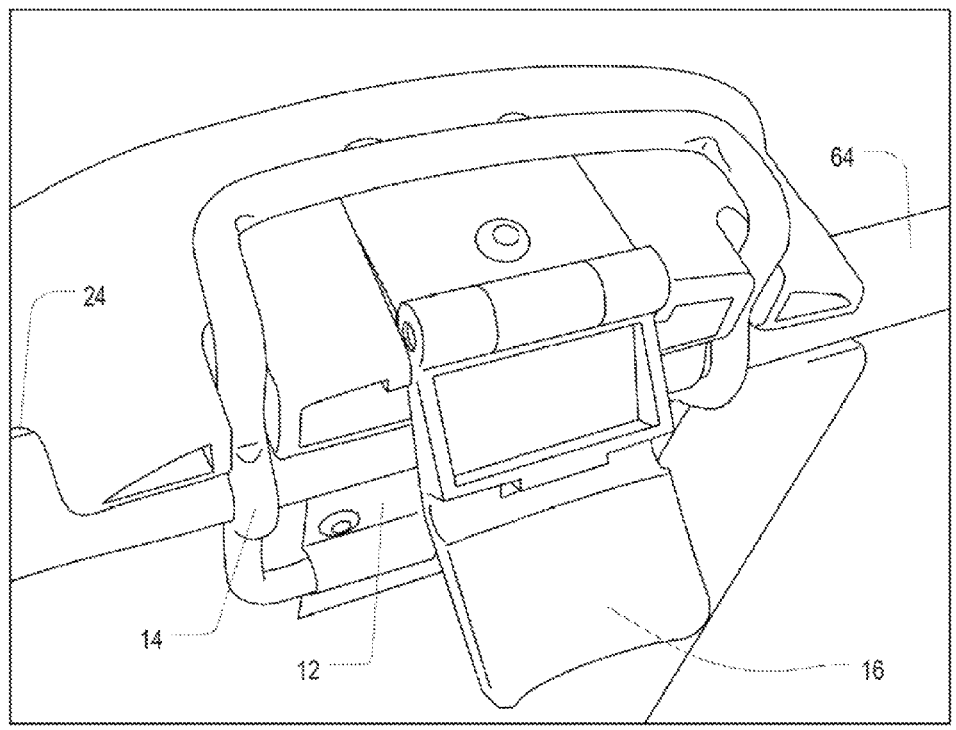
FIG. 7 is a perspective view of the cooler of FIG. 1.

FIG. 7 is a perspective view of the cooler 10 of FIG. 1, illustrating the wheel fastening system in the closed position with the locking clasp 16 disengaged from the clip 14.

Figure 8:
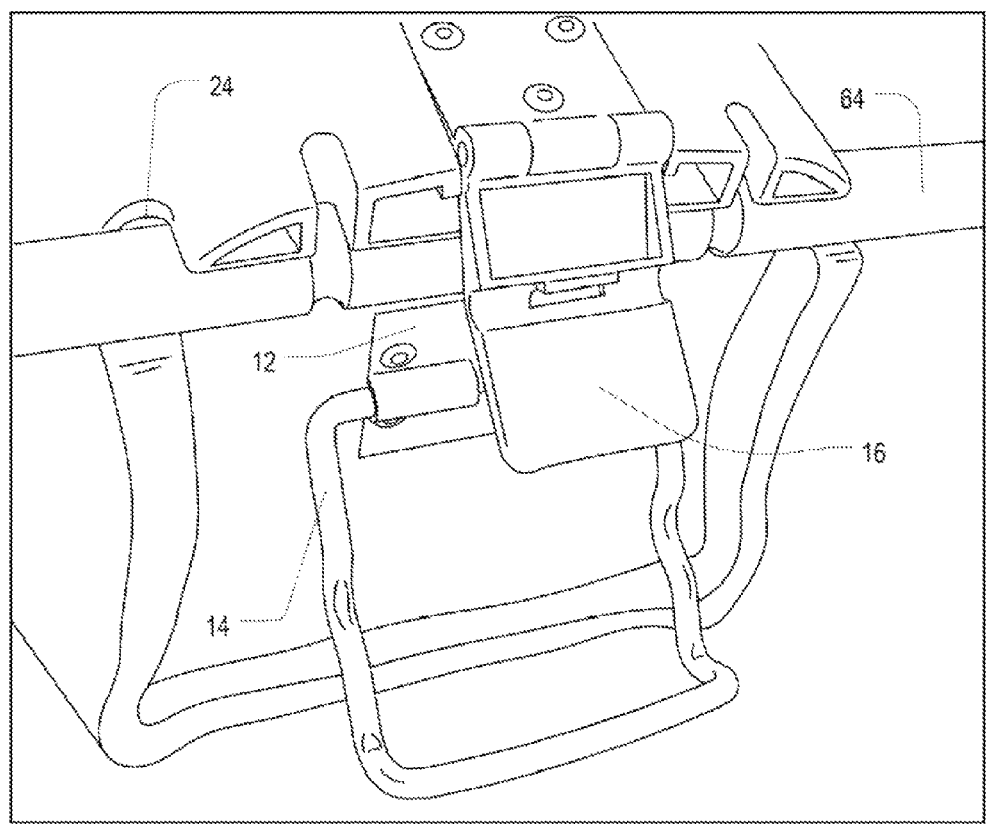
FIG. 8 is a perspective view of the cooler of FIG. 1.

FIG. 8 is a perspective view of the cooler 10 of FIG. 1, illustrating the wheel fastening system in the open position, permitting the removal of the removable wheel assembly 60 from the U-shaped channel 24.

Figure 9:
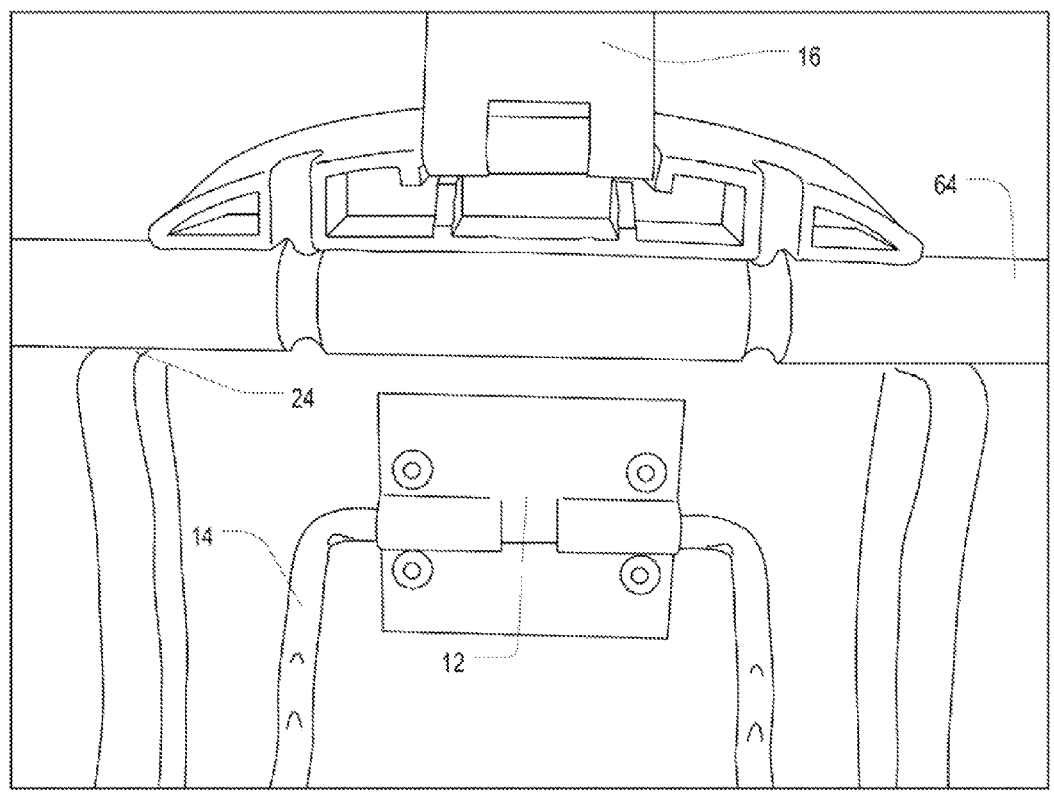
FIG. 9 is a bottom view of the cooler of FIG. 1.

FIG. 9 is a bottom view of the cooler 10 of FIG. 1, illustrating the wheel fastening system in the open position and the removable wheel assembly 60 disposed within the U-shaped channel 24.

Figure 10A:
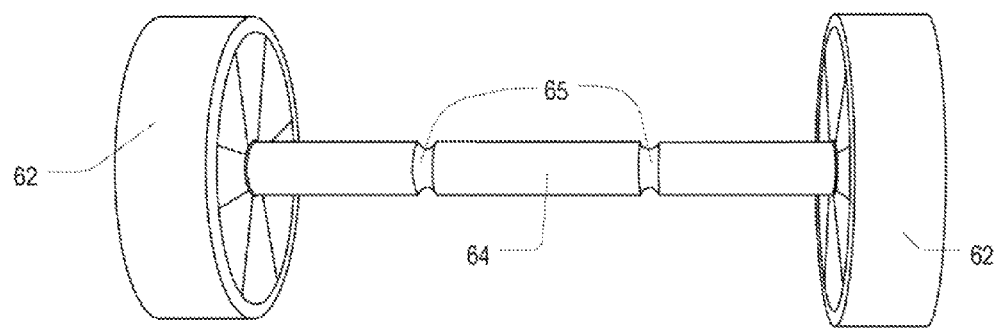
FIG. 10A is a front perspective view of the removable wheel assembly of the cooler of FIG. 1.
Figure 10B:
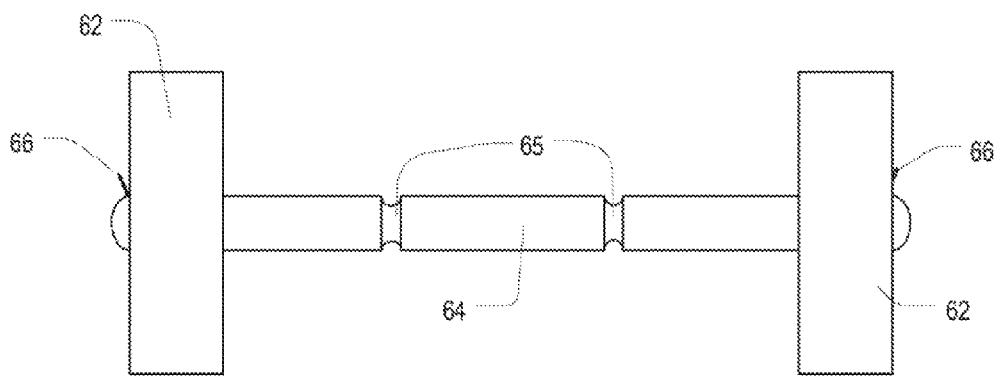
FIG. 10B is a front view of the removable wheel assembly of FIG. 10A.

FIG. 10A is a front perspective view of the removable wheel assembly 60 disengaged from the cooler 10 of FIG. 1. FIG. 10B is a front view of the removable wheel assembly 60 of FIG. 10A. The removable wheel assembly 60 includes a pair of removable wheels 62, an axle 64, and a pair of locking pins 68. The wheels 62 include a central aperture 68 adapted to receive an outer portion of the axle 64 therethrough. The axle 64 includes a central portion of a first diameter disposed between the removable wheels 62 and two outer portions each having a second diameter that is small than the first diameter. The outer portions of the axle 64 are adapted to penetrate a central aperture 68 of a wheel 62. The central portion of the axle 64 further includes two recessed portions 365 adapted to align with the clip 14 when the removable wheel assembly 60 is disposed within the U-shaped channel 24. Each outer portions of the axle 64 further includes a small opening 70 adapted for receipt of a locking pin 66. The locking pin 66 prevents the wheel 62 from sliding off the axle 64.

Figure 11A:
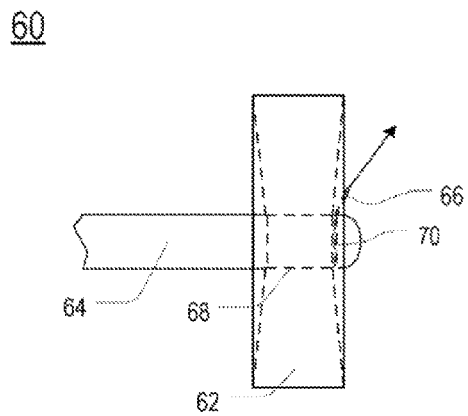
FIG. 11A is a front view of the removable wheel assembly of the cooler of FIG. 1.
Figure 11B:
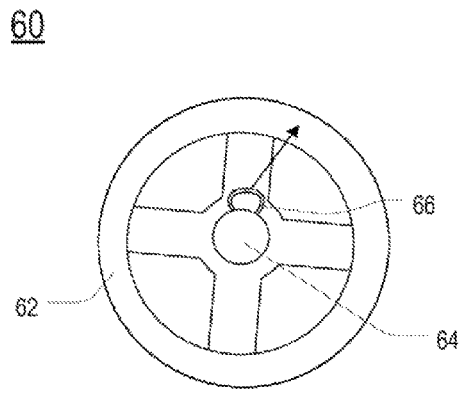
FIG. 11B is a side view of the removable wheel assembly of FIG. 11A.
Figure 11C:
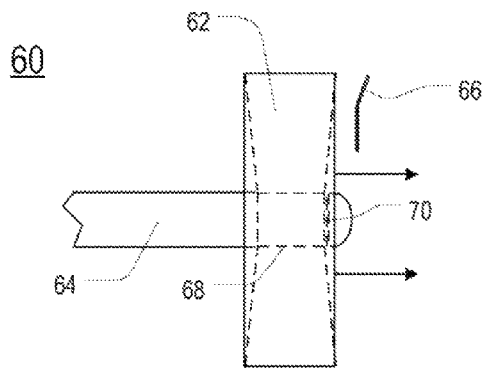
FIG. 11C is a front view of the removable wheel assembly of FIG. 11A.
Figure 11D:
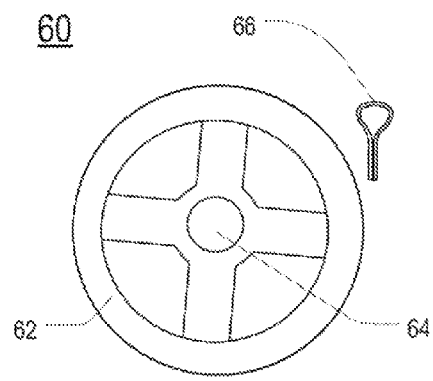
FIG. 11D is a side view of the removable wheel assembly of FIG. 11A.
Figure 11E:
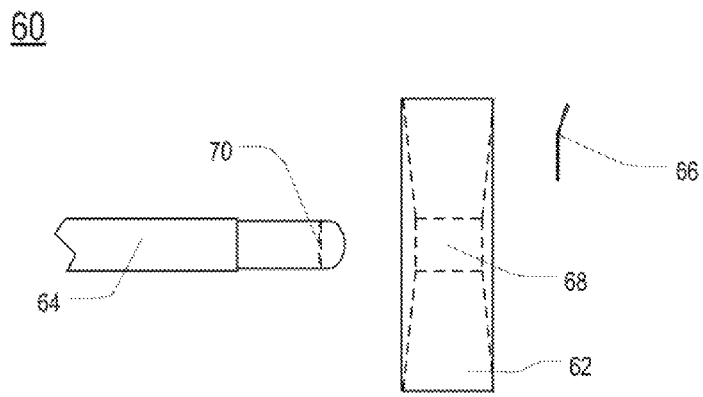
FIG. 11E is a front view of the removable wheel assembly of FIG. 11A.

FIG. 11A is a front view of a removable wheel assembly 60 of the cooler 10 of FIG. 1. FIG. 11B is a side view of the removable wheel assembly 60 of FIG. 11A. In FIGS. 11A and 11B, the wheel 62 is shown engaged with the outer portion of the axle 64, the outer portion of the axle 64 penetrating through the central aperture 68 of the wheel 62. The wheel 62 is locked in place with a locking pin 66 in the small opening 70 of the axle 64. FIG. 11C is a front view of the removable wheel assembly 60 of FIG. 11A. FIG. 11D is a side view of the removable wheel assembly 60 of FIG. 11A. In FIGS. 11C and 11D, the locking pin 66 has been removed from the small opening 70, thus permitting the wheel 62 to be slidably disengaged from the outer portion of the axle 64. FIG. 11E is a front view of the removable wheel assembly 60 of FIG. 11A, illustrating the wheel 62 removed from the outer portion of the axle 64.

Figure 12:
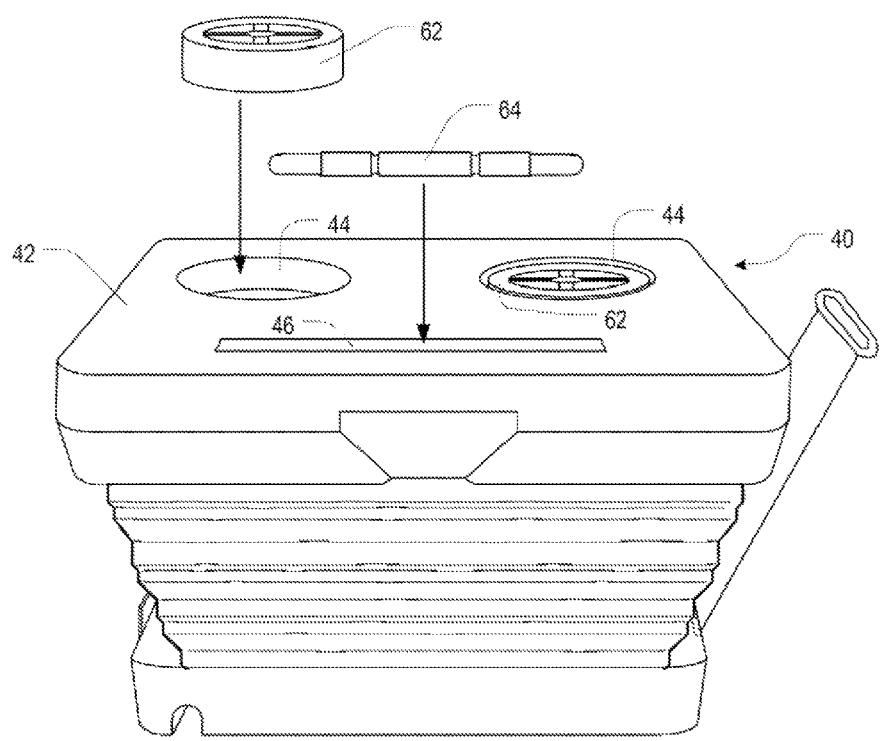
FIG. 12 is a perspective view of the cooler of FIG. 1.

FIG. 12 is a perspective view of the cooler 10 of FIG. 1 with the removable wheel assembly 60 removed from the bottom 22 of the base 20 of the cooler 10, disassembled, and stored within the plurality of recesses on the lid 40. As shown, the wheel storage recesses 44 on the lid 40 are adapted to receive and store the wheels 62, and the axle storage recess 48 on the lid 40 is adapted to receive and store the axle 64. The plurality of recesses on the lid 40 provide for convenient storage of the removable wheel assembly 60 while not in use. Although not shown in FIG. 12, it is contemplated that the locking pins 66 may be stored within either or both of the wheel storage recesses 44 or the axle storage recess 46.

A Second Preferred Embodiment

FIGS. 13-17 are perspective views of a preferred embodiment of a cooler 110 with a removable wheel assembly. The cooler 110 is generally identical in structure to the cooler 10 described hereinabove with respect to FIGS. 1-12, except with respect to any changes illustrated and those changes now described.

In particular, rather than having a permanently affixed and non-retractable handle, the cooler 110 includes a telescoping handle 180 that is removable from the base 120 of the cooler 110. It will be appreciated that in one or more embodiments, a cooler in accordance with one or more aspect of the present invention may include a handle that is removable and telescoping, removable and non-telescoping, or telescoping and non-removable.

Figure 13:
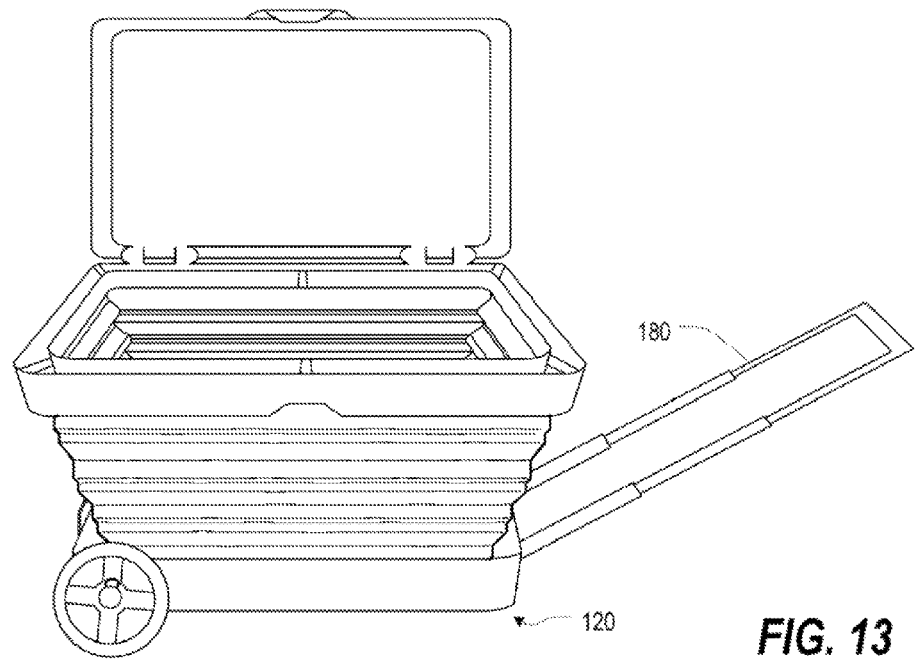
FIG. 13 is a perspective view of a preferred embodiment of a cooler having a removable wheel assembly and a removable telescoping handle assembly in accordance with one or more aspects of the present invention.
Figure 14:
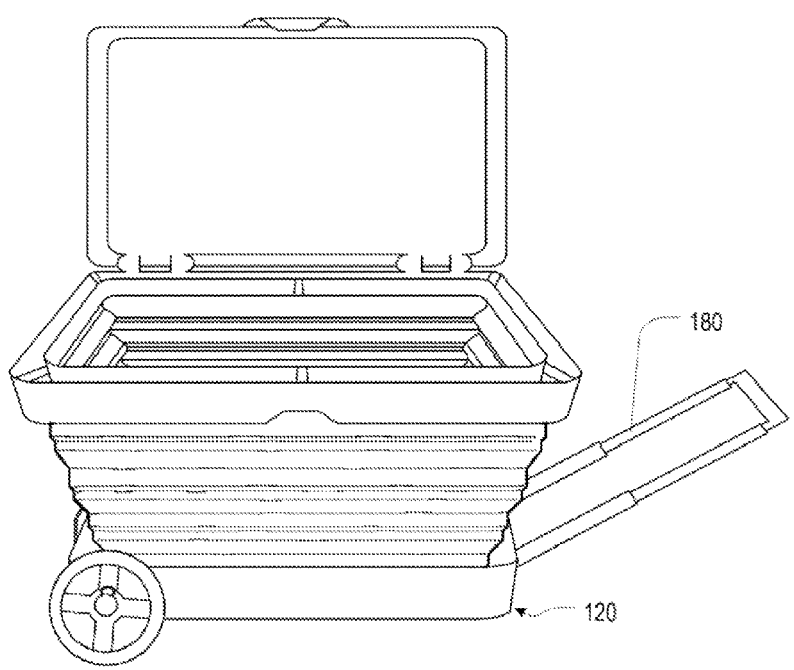
FIG. 14 is a perspective view of the cooler of FIG. 13.
Figure 15:
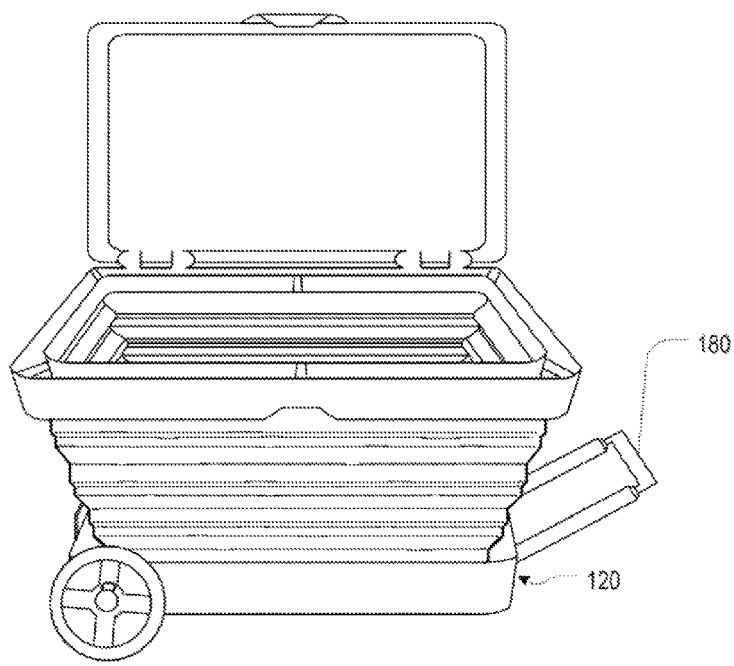
FIG. 15 is a perspective view of the cooler of FIG. 13.
Figure 16:
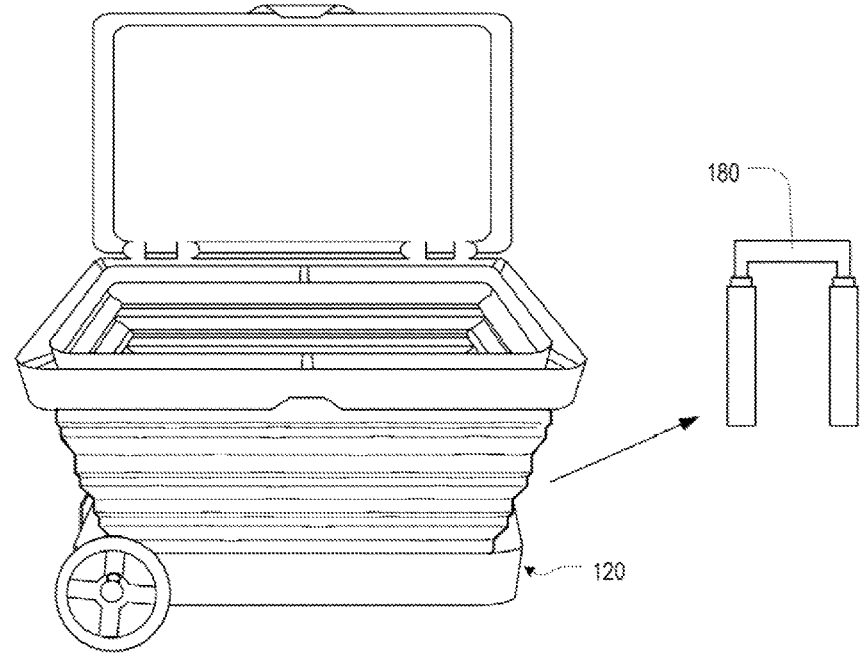
FIG. 16 is a perspective view of the cooler of FIG. 13.

FIG. 13 illustrates the cooler 110 with the handle 180 attached to the base 120 and fully extended. FIG. 14 illustrates the cooler 110 with the handle 180 attached to the base 120 and partially retracted. FIG. 15 illustrates the cooler 110 with the handle 180 attached to the base 120 and totally retracted. FIG. 16 illustrates the cooler 110 with the handle 180 completely retracted and detached from the base 120.

Figure 17:
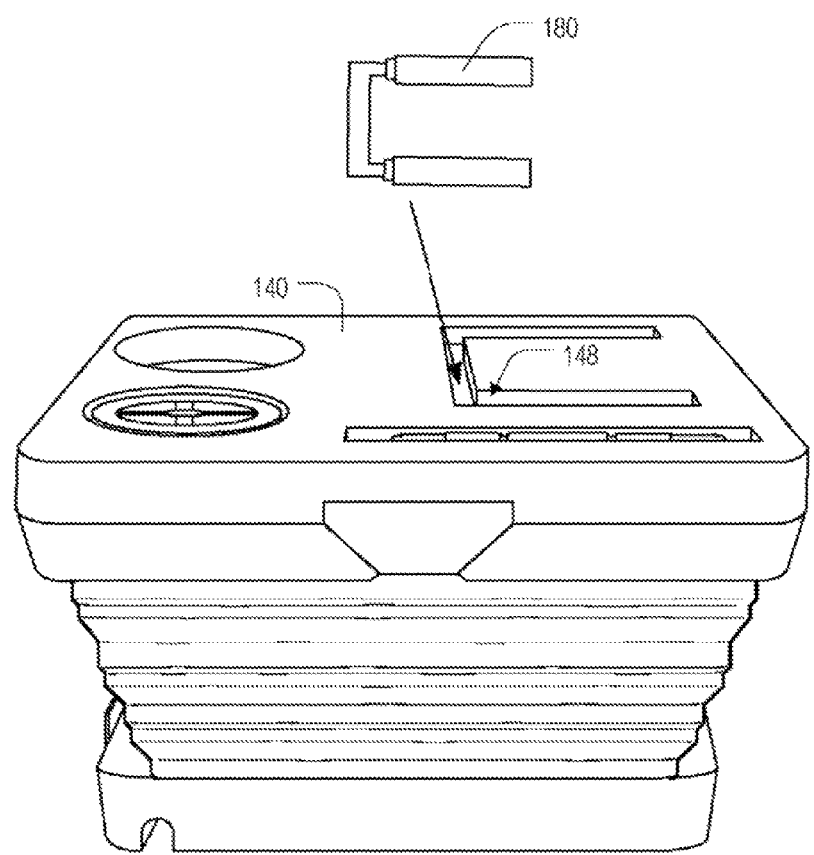
FIG. 17 is a perspective view of the cooler of FIG. 13.

FIG. 17 is a perspective view of the cooler 110 of FIG. 13 with the removable, telescoping handle 180 removed from the base 120. Furthermore, FIG. 17 illustrates the lid 140 of the cooler 110 having a plurality of recesses for storage. The lid 140 includes a handle storage recess 148 adapted to receive and store the handle 180. The handle storage recess 148 provides for convenient storage of the handle 180 while the handle 180 is not in use.

Although one or more telescoping handles have been illustrated, other telescoping handles that may telescope to varying degrees, i.e. that may collapse down to a smaller size, are also contemplated. Further, although one or more telescoping handles are illustrated as having a general u-shape, in at least some implementations a telescoping handle includes only a single bar, that single bar being configured to telescope. Further, in at least some implementations, a handle may be configured to collapse into a main body of a cooler.

In at least some implementations, a cooler includes a drain conduit, which may comprise a drain opening and a plug, or may comprise a spigot.

A Third Preferred Embodiment

Figure 18:
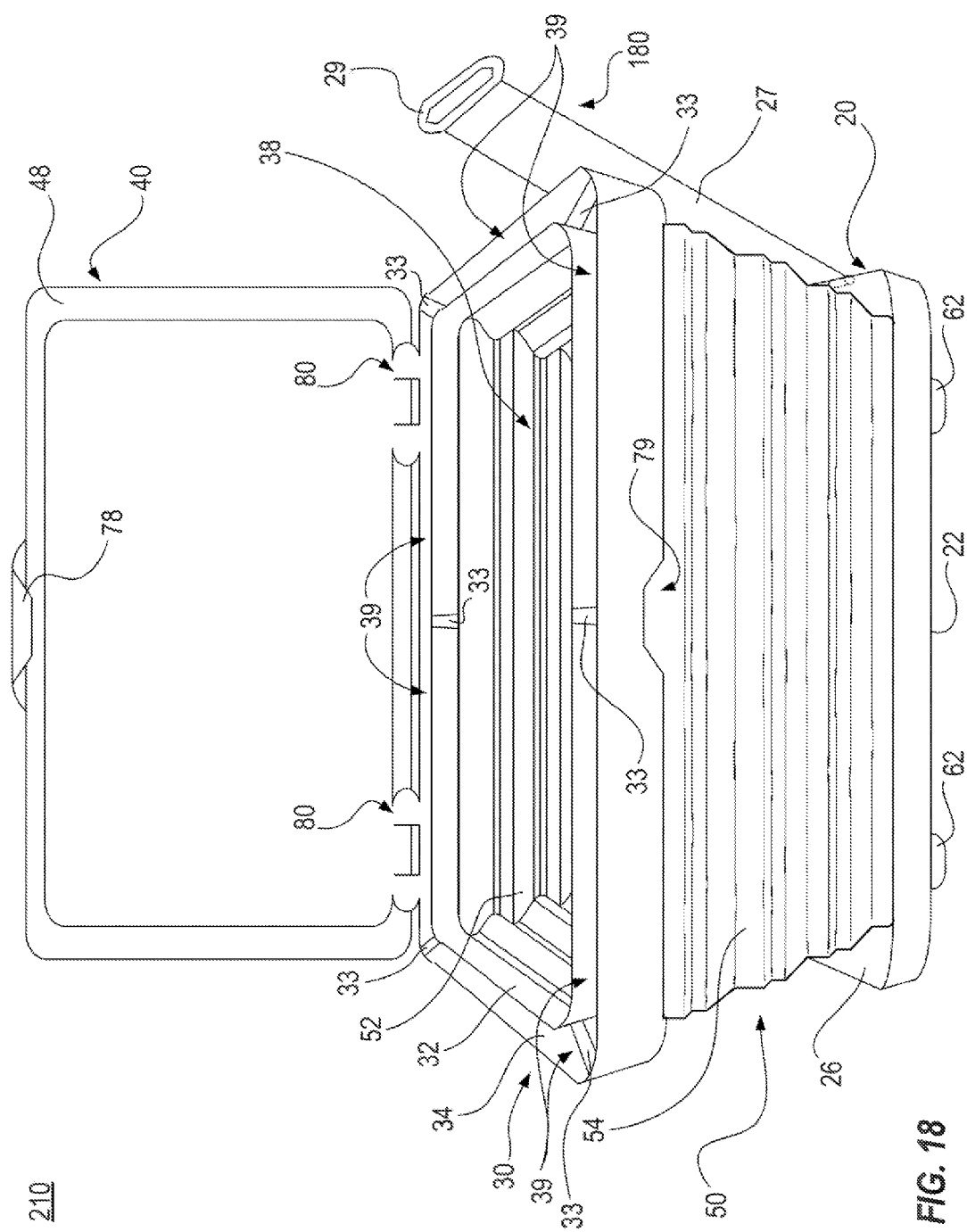
FIG. 18 is a perspective view of a cooler in an expanded configuration in accordance with one or more aspects of the present invention.

FIG. 18 is a perspective view of a cooler 210 in an expanded configuration in accordance with a first of many preferred embodiments of the present invention. The cooler 210 comprises a base 20, an upper rim 30, a lid 40, and a cooler wall 50 extending between the base 20 and the upper rim 30.

The base 20 includes two pairs of coaxial wheels 62, a bottom 22, and a top surface 26. The two pairs of coaxial wheels 62 are each connected to the base 20 with a conventional wheel axle. The wheels 62 facilitate rolling motion of the cooler 10 from one location to another and are preferably constructed of a material capable of supporting the weight of the items stored in and on the cooler 210. It is preferred that the wheels 62 be able to support at least about ninety pounds. It is more preferred that the wheels 62 be able to support at least about one hundred and ten pounds.

The base 20 has a generally rectangular perimeter. Additionally, the base 20 is tapered such that the top surface 26 of the base 20 has a greater perimeter than the bottom 22 of the base 20. In a variation, however, the base is not tapered and, instead, includes generally orthogonal side and lateral surfaces.

Preferably, a handle 180 is attached to the base 20 at a hinge such that it can be raised and lowered about the hinge. The handle 180 includes an elongate shaft portion 27 having a handle portion 29 affixed to its end, as can be seen in FIG. 18. The handle 180 may telescope and may be attachable to and readily unfastenable from the base 20. Moreover, the handle 180 may be storable under the base 20 in a similar manner as that disclosed in U.S. Patent Application Publication No. 2006/0237926, which is incorporated herein by reference.

The cooler wall 50 is attached to the top surface 26 of the base 20. The cooler wall 50 includes a collapsible inner wall 52 and a collapsible outer wall 54. Preferably, one or both collapsible walls 52,54 are bonded, adhered, or cold-molded to the base 20. Each collapsible wall 52,54 comprises a flexible, elastomeric membrane 360 (see, e.g., FIG. 2). In at least one embodiment, one or more collapsible walls consists of a flexible, elastomeric membrane and nothing further that would impede the collapsibility and nesting of sections of the walls.

A Fourth Preferred Embodiment

Figure 19:
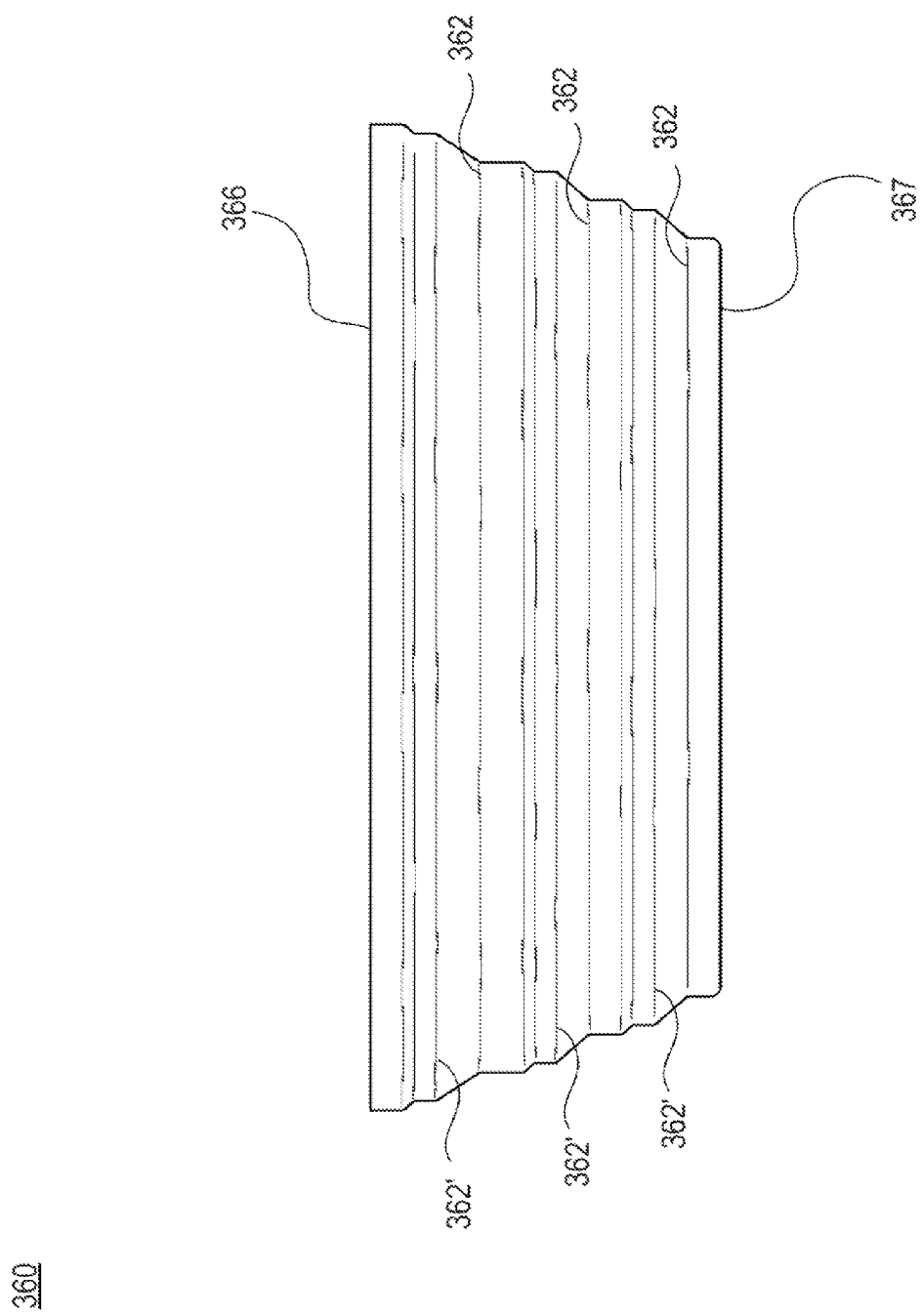
FIG. 19 is a side elevational view of a membrane representative of each of the inner and outer collapsible walls of the cooler of FIG. 18.

FIG. 19 illustrates such a membrane 360 having a top portion 366 and a bottom portion 367. The membrane 360 has a cross-sectional perimeter taken horizontally in FIG. 2 that is generally rectangular with rounded corners along its entire extent from the top portion 366 to the bottom portion 367, but the membrane is tapered such that the top portion 366 has a greater perimeter than the perimeter of the bottom portion 367.

Figure 20:
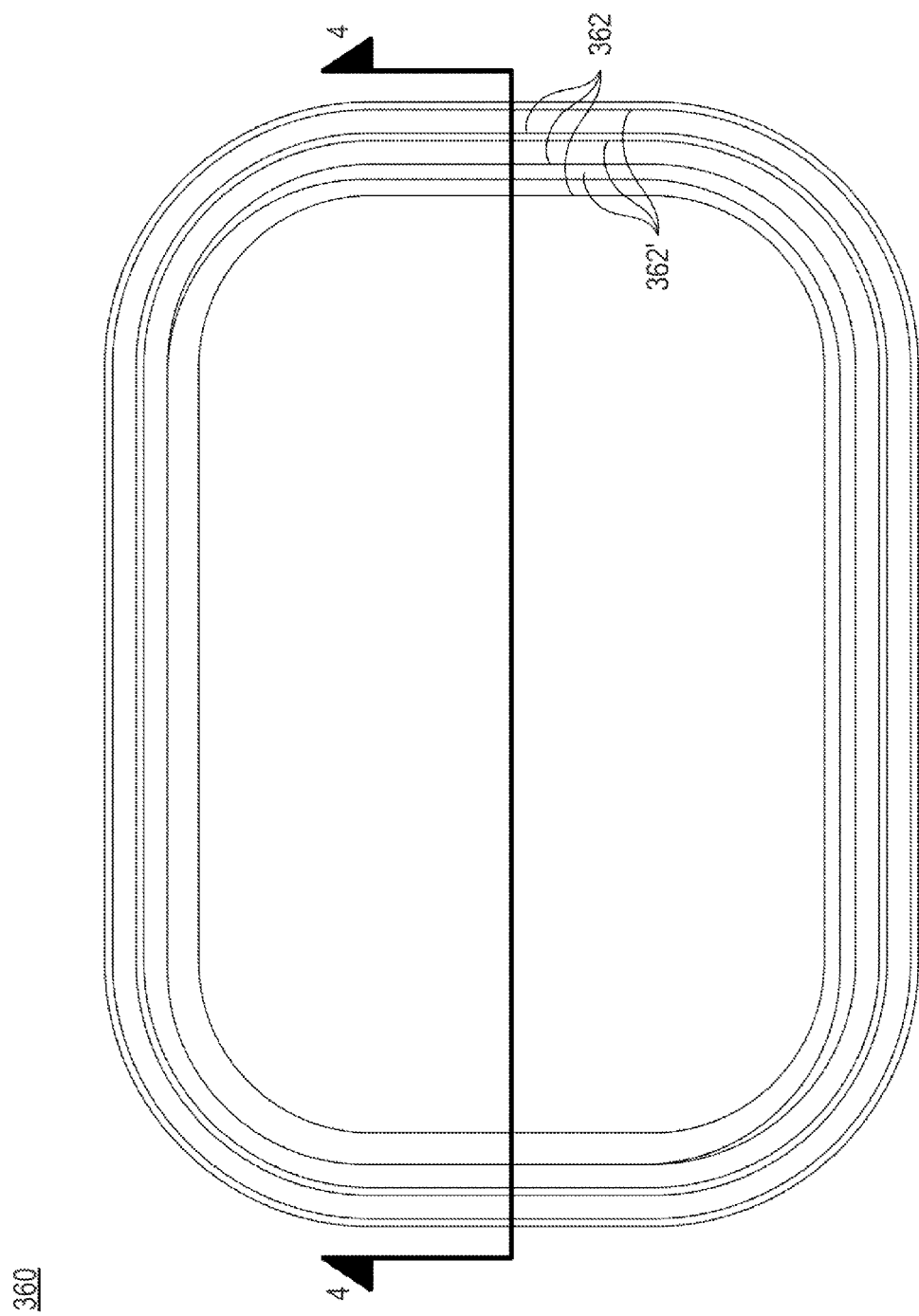
FIG. 20 is a top plan view of the membrane of FIG. 19.

FIG. 20 is a top plan view of the membrane 360, in which the rectangular perimeters at various elevations thereof can be clearly seen, the rectangular perimeters being concentrically arranged and, when fully collapsed, nested within each other and arranged generally within a common plane.

Figure 21:
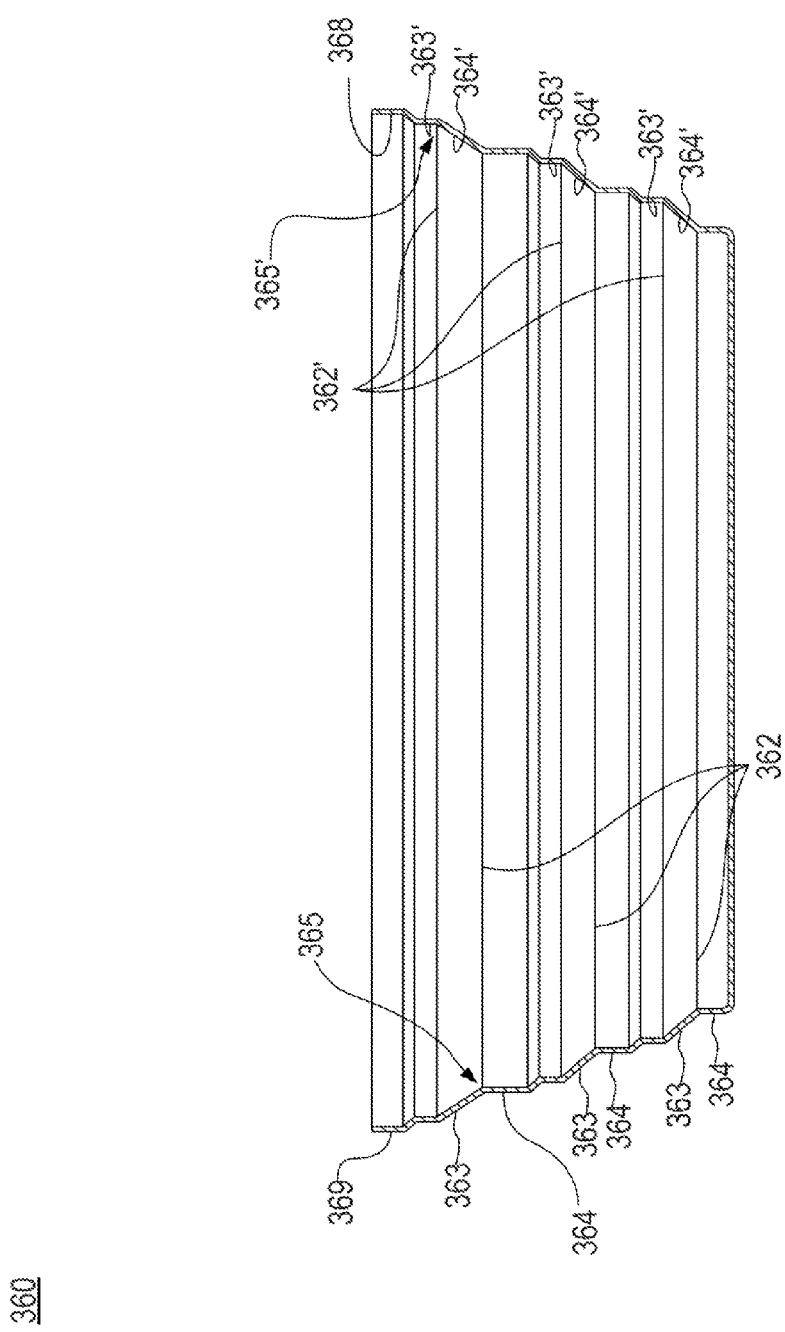
FIG. 21 is a cross-sectional view of the membrane of FIG. 20 taken along line 4-4.

The membrane 360 includes a first series of a plurality of hinge lines 362 and a second series of a plurality of hinge lines 362', as can be seen in FIGS. 10 and 20. FIG. 21 is a cross-sectional view of the membrane 360 along line 4-4 of FIG. 20 and also shows the hinge lines 362,362'. The hinge lines 362,362' are thinner, and thus more flexible and more deformable, than other portions of the membrane 360.

Each hinge line 362 is defined between an upper hinge face 363 and a lower hinge face 64. The membrane 360 is configured to be bent at each hinge line 362 such that the associated upper hinge face 363 is bent downwards generally towards the associated lower hinge face 364. By bending a membrane 360 thusly, the membrane 60 can be transitioned to a collapsed yet stable state having a reduced height.

The membrane 360 has both an outer surface 368 and an inner surface 360. The hinge faces 363, 364 associated with the hinge lines 362 are part of the outer surface 368. Each of the second hinge lines 362' similarly has hinge faces 363', 364' associated therewith that are part of the inner surface 369. In this way, although each consecutive hinge line 362, 362' is defined in both the inner and outer surfaces 368,369, the surface 368,369 which comprises the associated hinge faces 363, 364 and hinge faces 363', 364'60 alternates.

It will be understood that when membrane 360 is folded at a hinge line 362 associated with hinge faces 363, 364 of outer surface 368 (such as at 365 in FIG. 4), the membrane 360 is also folded at a complementary hinge line 362' associated with hinge faces 363', 364' of the inner surface (such as at 365' in FIG. 4).

It also will be understood that membrane 360 has a fully collapsed configuration, wherein it is bent or folded at each hinge line 362,362'; a fully expanded configuration, wherein it is not bent or folded at any hinge line 362,362'; and a plurality of partially collapsed configurations, wherein it is collapsed at one or more pair of hinge lines 362,362' but not at all of the pair of hinge lines 362,362'. Preferably, when the membrane 360 is in the fully collapsed configuration. It can be characterized as having a plurality of concentric portions all disposed generally in the same plane. Additionally, the membrane 360 is preferably configured to be stable not only in the fully collapsed and fully expanded configurations, but in one or more partially collapsed configurations as well.

In addition to having hinge lines 362,362', a membrane can also include one or more stiffening portions. An example of a membrane having such stiffening portions is disclosed in U.S. Patent Application Publication No. 2006/0096929, which publication is hereby incorporated herein by reference. In this publication the stiffening portions are characterized as "stiffening rings", but it will be appreciated that these stiffening rings could be implemented as "stiffening portions" in one or more preferred embodiments in accordance with the present invention. Further, the membranes themselves as detailed therein could be utilized or implemented, either with or without changes or modifications, in one or more preferred embodiments in accordance with the present invention.

Similarly, the membranes detailed in U.S. Patent Application Publication No. 2007/0251874, which publication is also hereby incorporated herein by reference, could be utilized or implemented, either with or without changes or modifications, in one or more preferred embodiments in accordance with the present invention.

Preferably, a membrane is formed of silicone rubber, such as, for example, silicone rubber having a softness of about 25 on the Shore A scale.

Figure 22:
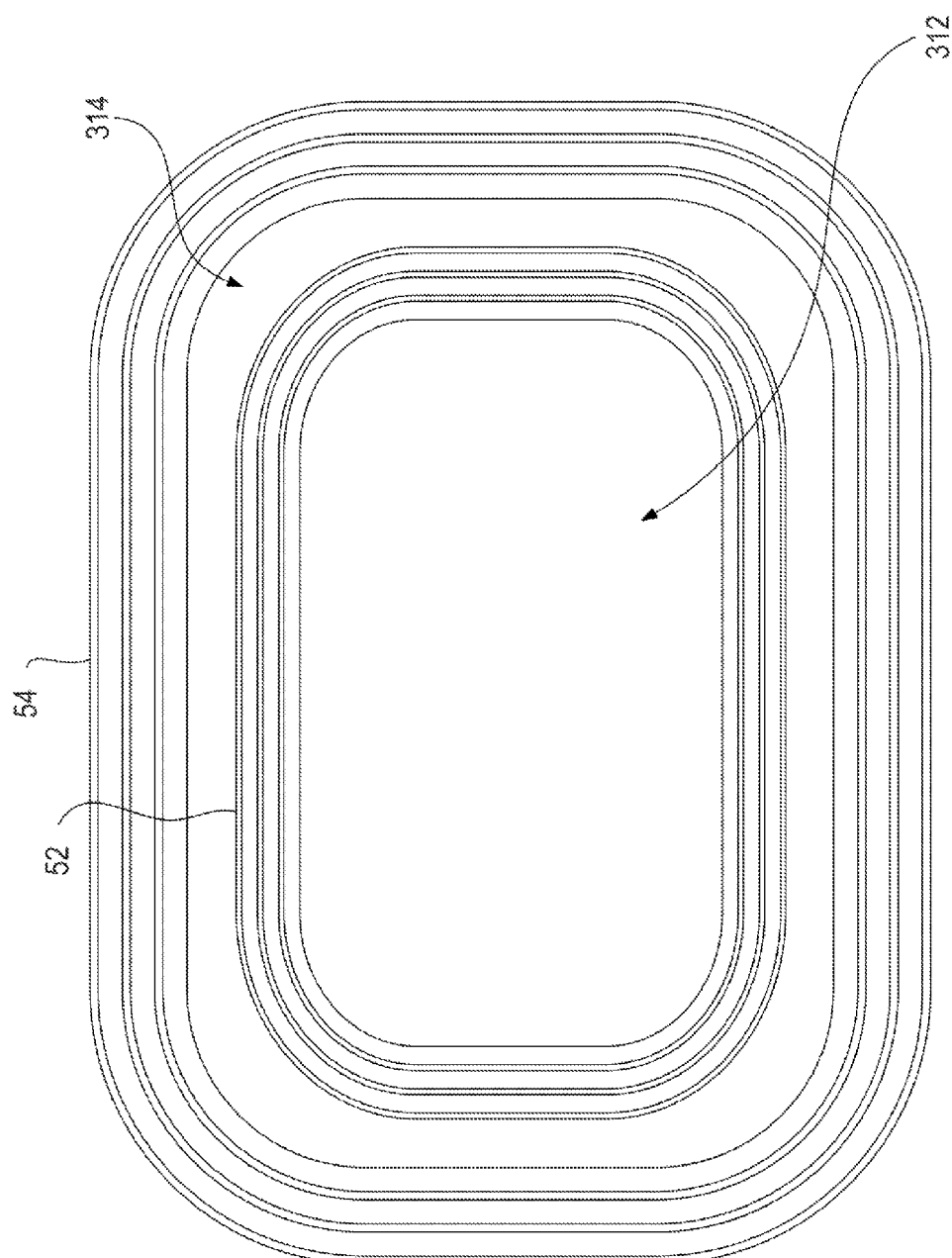
FIG. 22 is a top plan view of the cooler wall of the cooler of FIG. 18.

Returning to the cooler 210 of FIG. 18, the bottom portion of the membrane of the inner collapsible wall 52 and the bottom portion of the membrane of the outer collapsible wall 54 are each attached to the top surface 26 of the base 20. As can be seen in FIG. 22, which is a top plan view of the inner collapsible wall 52 and outer collapsible wall 54 of the cooler 210 of FIG. 18, wherein other components of the cooler 210 including the upper rim 30 have been omitted for clarity, an interior space 312 is defined by the inner collapsible wall 52 and an intermediate space 314 is defined between the inner collapsible wall 52 and the outer collapsible wall 54. Each of these spaces 312, 314 is bounded at a bottom by the top surface 26 of the base 20, which base 20 may or may not additionally define the bottom surface of such respective space 312, 314. Preferably, the interior space 312 of the cooler 210, in which food and beverages may be stored, has a volume of between approximately ten (10) quarts and seventy-five (75) quarts.

The top portion 366 of the respective membrane of the inner collapsible wall 52 and the outer collapsible wall 54 (of which membrane 360 is representative) is attached to the upper rim 30. The upper rim 30 includes a rigid inner rim wall 32 and a rigid outer rim wall 34, as illustrated in FIG. 18. Each of the rim walls 32,34 has a generally rectangular perimeter with rounded corners and is preferably tapered such that a top portion of each rim wall 32,34 has a greater perimeter than a bottom portion of each rim wall 32,34. In variations, however, one or more of the rim walls may not be tapered and, instead, may include generally orthogonal side and lateral surfaces. The inner rim wall 32 is attached at its bottom portion to the inner collapsible wall 52, and the outer rim wall 34 is attached at its bottom portion to the outer collapsible wall 54.

The upper rim 30 includes a plurality of connectors 33 that secure the inner rim wall 32 and the outer rim wall 34 to one another in a spaced apart relationship (i.e., the inner rim wall 32 and the outer rim wall 34 are preferably spaced apart), as can be seen in FIG. 18. The connectors 33 resemble spokes extending between the rim walls 32,34. Because the connectors 33 are spaced apart from one another, peripheral openings 39 are defined between the rim walls 32,34 and the connectors 33. The peripheral openings 39 each provides access to the intermediate space 314. An inner opening 38 defined by the inner rim wall 32 provides access to the interior storage space 312 of the cooler 210.

Figure 23B:
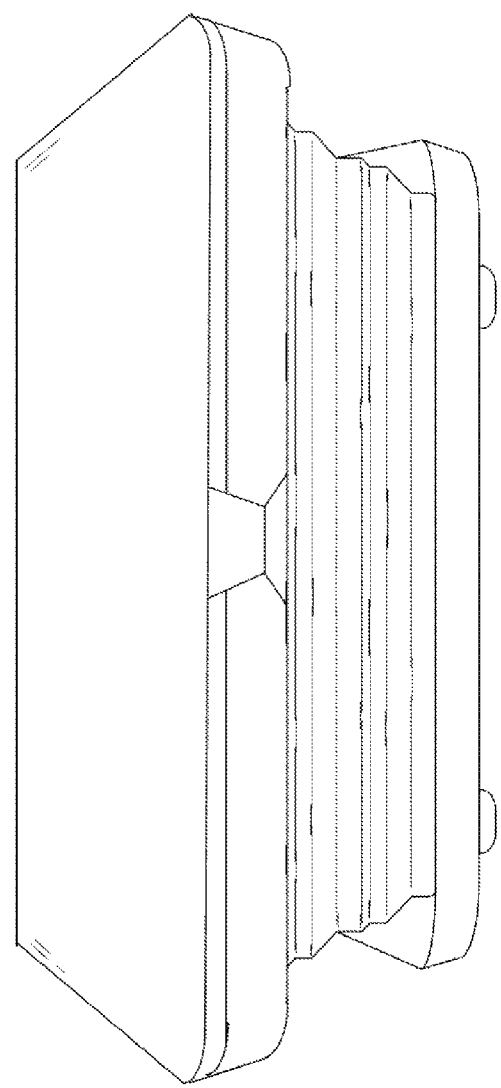
FIG. 23B is a perspective view of the cooler of FIG. 23A in a partially collapsed configuration.

A lid 40 is attached to a first side of the upper rim 30, and more specifically to the outer rim wall 34, by hinges 80. The lid 40 can be lowered about the hinges 80 into a closed position in which it fully covers both the inner opening 38 and the peripheral openings 39, thereby sealing both the interior space 312 and the intermediate space 314, as illustrated in FIG. 23A. The lid 40 preferably includes a raised peripheral portion 48 sized and positioned to abut the inner and outer rims 32,34 in covering relation to the peripheral openings 39 when the lid 40 is in the closed position.

The lid 40 includes a male fastening insert 78 configured to mate with a female fastening slot 79, located on a second side opposite the first side, such that the lid 40 is retained in a closed position.

Figure 23C:
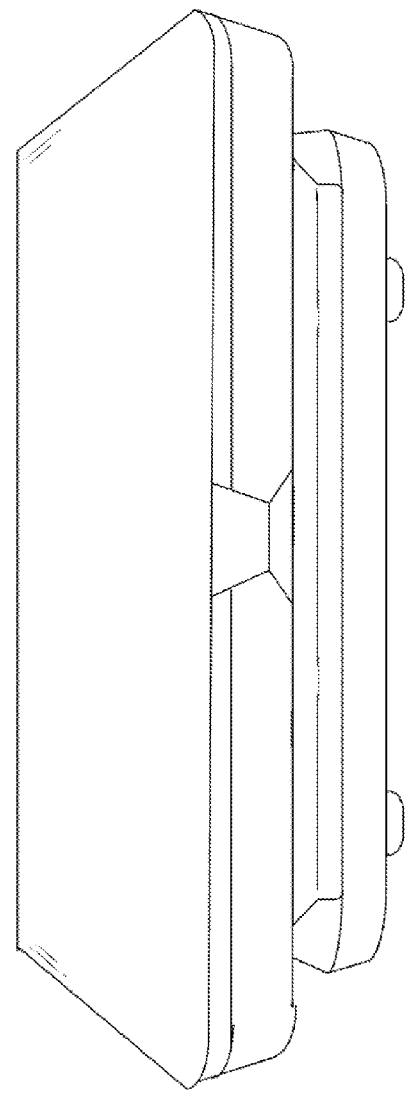
FIG. 23C is a perspective view of the cooler of FIG. 23A in another partially collapsed configuration.
Figure 23D:
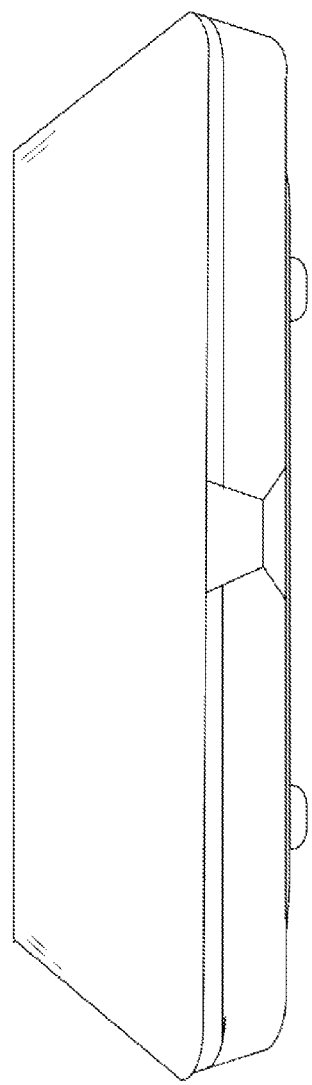
FIG. 23D is a perspective view of the cooler of FIG. 23A in a fully collapsed configuration.

It will be understood that because the collapsible walls 52,54 each comprise a membrane, such as, for example, membrane 360 described hereinabove, each of the walls 52,54 can be transitioned between a fully expanded configuration, a fully collapsed configuration, and one or more partially collapsed, intermediate configurations. Further, because both of the collapsible walls 52,54 are attached to the upper rim 30, the collapsible walls 52,54 generally collapse and expand together. Thus, by transitioning the collapsible walls 52,54 from one configuration to another, the cooler 210 itself is transitioned between a fully expanded configuration, which can be seen in each FIGS. 18 and 23A; a plurality of partially collapsed configurations, two of which can be seen respectively in FIGS. 23B,23C; and a fully collapsed configuration, which can be seen in FIG. 23D. The collapsible walls 52,54 are configured such that the cooler 210 will be stable in all three expanded configurations (FIGS. 23A,23B,23C), and will also be stable in the completely collapsed configuration (FIG. 23D).

It will be understood from the above description that the cooler 210 has a plurality of configurations that may be utilized. Various examples utilizing these configurations will now be described, although it will be appreciated that many other uses that are not described do exist and also lie within the scope of the present invention.

A user wishing to keep items cooled or chilled utilizes the cooler 210 in either the fully expanded configuration, or one of the partially collapsed configurations. It will be understood that the interior space 312 will be larger, and thus the volume of items that can be stored will be greater, when the cooler is in the fully expanded configuration.

To store items in the cooler 210, a user first disengages the male fastening insert 78 from the female fastening slot 79. The user then lifts the lid 40, thereby exposing the inner opening 38 and the peripheral openings 39. The user inserts ice through the peripheral openings 39 into the intermediate space 314 of the cooler wall 50, and places the items to be chilled or otherwise kept cool within the interior storage space 312 of the cooler 210. The ice in the intermediate space 314, which is separated by the collapsible inner wall 52, surrounds the interior space 312 and chills the interior space 312. The lid 40 can be lowered and the male fastening insert 78 engaged with the female fastening slot 79, thus retaining the lid in the closed position.

The handle 180 can be grasped and the cooler 210 rolled from its current location to another location, where the cooler 210 can be opened to provide access to the chilled items. The handle 180 also is pivotably connected to the base by a hinge 31 (shown in dashed lines in FIGS. 18 and 23A), and the handle 180 rotates relative to the base 20 (as shown by the arrow in FIG. 23A), whereby the handle 180 itself may be retracted and rotated to under the base 20 when the cooler 210 is not being pulled.

A variation of the cooler 210 is illustrated in FIG. 24, wherein cooler 210' is identical in structure to cooler 210 and further includes bracket members 43. The bracket members 43 are preferably located at the corners of the cooler 210' and extend between and interconnect the base 20 and the upper rim 30. Each bracket member 43 may be removably attached to each of the base 20 and rim 30, or alternatively, may be removably attached to one of the base 20 and rim 30 and pivotably attached to the other of the base 20 and rim 30, whereby the bracket members 43 may be retracted within a corresponding recess within the base 20 or rim 30 when not used. The bracket members 43 further may telescope between various locked extents so as to support the cooler 210' in more than one of its stable configurations for use. Alternatively, different sets of bracket members may be removably attached to the base 20 and rim 30 for support of the cooler 210' in its various expanded configurations for use.

The bracket members 43 serve to convey tensional forces between the base 20 and the upper rim 30 if and when the cooler is lifted by the upper rim 30. The bracket members 43 are preferably included in the cooler 210 if the cooler is not otherwise constructed so as to be able to withstand the tensional forces in one or both of the collapsible walls 52,54 when the fully loaded cooler 210 is in the fully expanded configuration and is lifted from the upper rim 30, as opposed to lifted from the base 20.

Further plurality of additional preferred embodiments are now described hereinbelow.

A Fifth Preferred Embodiment

Figure 25:
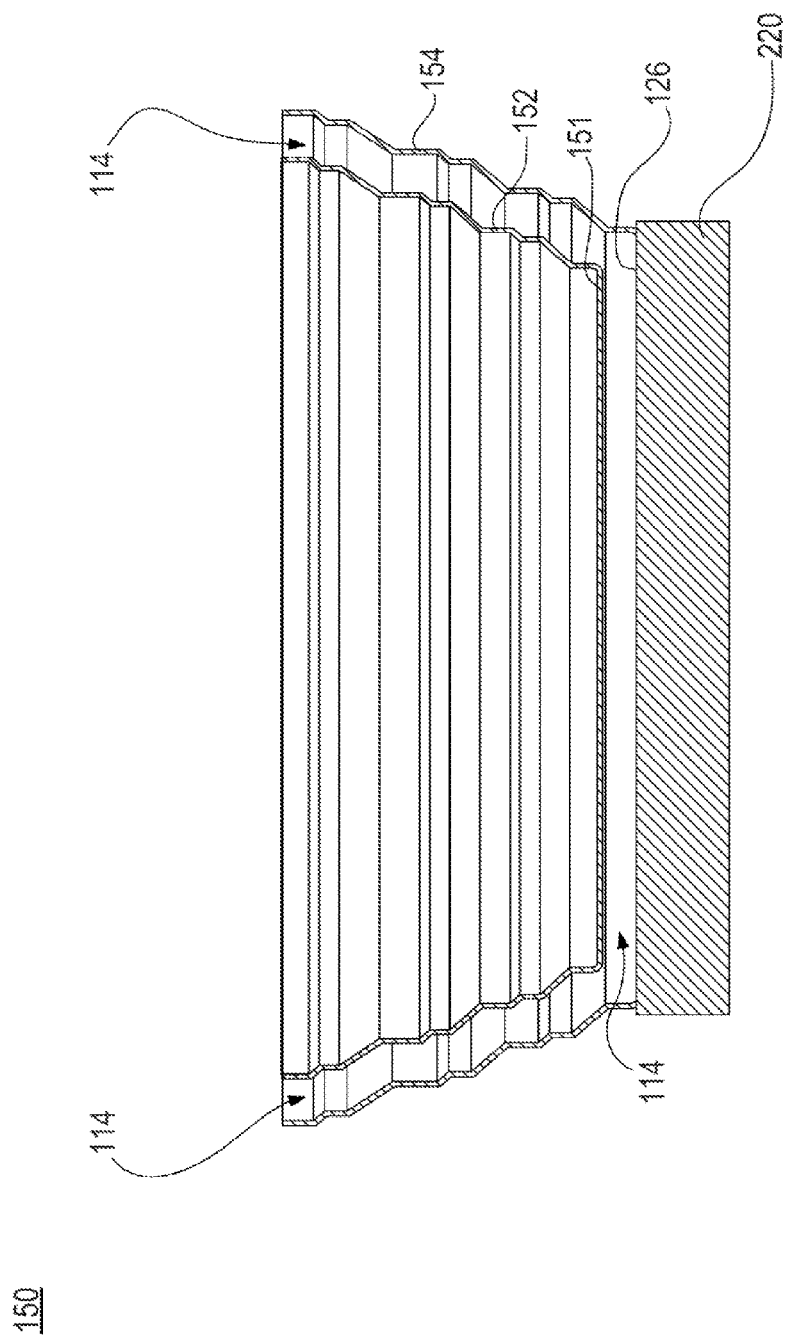
FIG. 25 is cross-sectional view of a cooler wall and base in accordance with a second preferred embodiment of the invention.

A cooler base 220 and cooler wall of a cooler 150 in accordance with a second preferred embodiment is now described with reference to FIG. 25. The cooler is generally identical in structure to the cooler 210 described hereinabove with respect to FIGS. 18-24, except with respect to any changes illustrated and those changes now described regarding the cooler base 220 and cooler wall 150.

In particular, rather than having collapsible inner and outer walls 52,54 both attached to a top surface 26 of a base 20, the cooler wall 150 has only a collapsible outer wall 154 that is attached to a top surface 126 of a base 220. Rather than being so attached, a collapsible inner wall 152 instead extends upward from a bottom wall 151, which is integrally formed with the collapsible inner wall 152. FIG. 25 is a cross-sectional view illustrating the cooler wall 150 and base 220. In FIG. 25, the base 220 has been simplified, and other components have been omitted, to improve clarity.

It will be understood that, the intermediate space 114 includes not only the space defined between the collapsible inner and outer walls 152,154 but additionally includes the space defined between the bottom wall 153 and a top surface 126 of a base 220. Consequently, ice placed within the intermediate space 114 will cool the interior storage space not only from the sides thereof, but also from the bottom area of the intermediate space 114.

It will further be understood that, because the collapsible walls 152,154 are not coupled or otherwise joined to one another at their respective bottom portions, the respective expanding and collapsing of the walls 152,154 are not necessarily dependent upon one another. More specifically, the cooler 150 is capable of transitioning to a configuration wherein the collapsible inner wall 152 is collapsed to an extent that is equal to or greater than the collapsed extent of the outer wall 154 (i.e., the inner wall 152 must be collapsed as much as the outer wall 154, but may be collapsed to a greater extent than the outer wall 154 since the two collapsible walls are not directly jointed together). As such, the inner collapsible wall 152 may be transitioned between different collapsed states independent of the outer collapsible wall 154 thus increasing or decreasing a volume of space defined between the bottom wall 151 and the top surface 126 of the base 220.

A Sixth Preferred Embodiment

A cooler 211 in accordance with a sixth preferred embodiment is now described with reference to FIG. 26. The cooler 211 is generally identical in structure to the cooler 210 described hereinabove with respect to FIGS. 18-24, except with respect to any changes illustrated and those changes now described.

Figure 26:
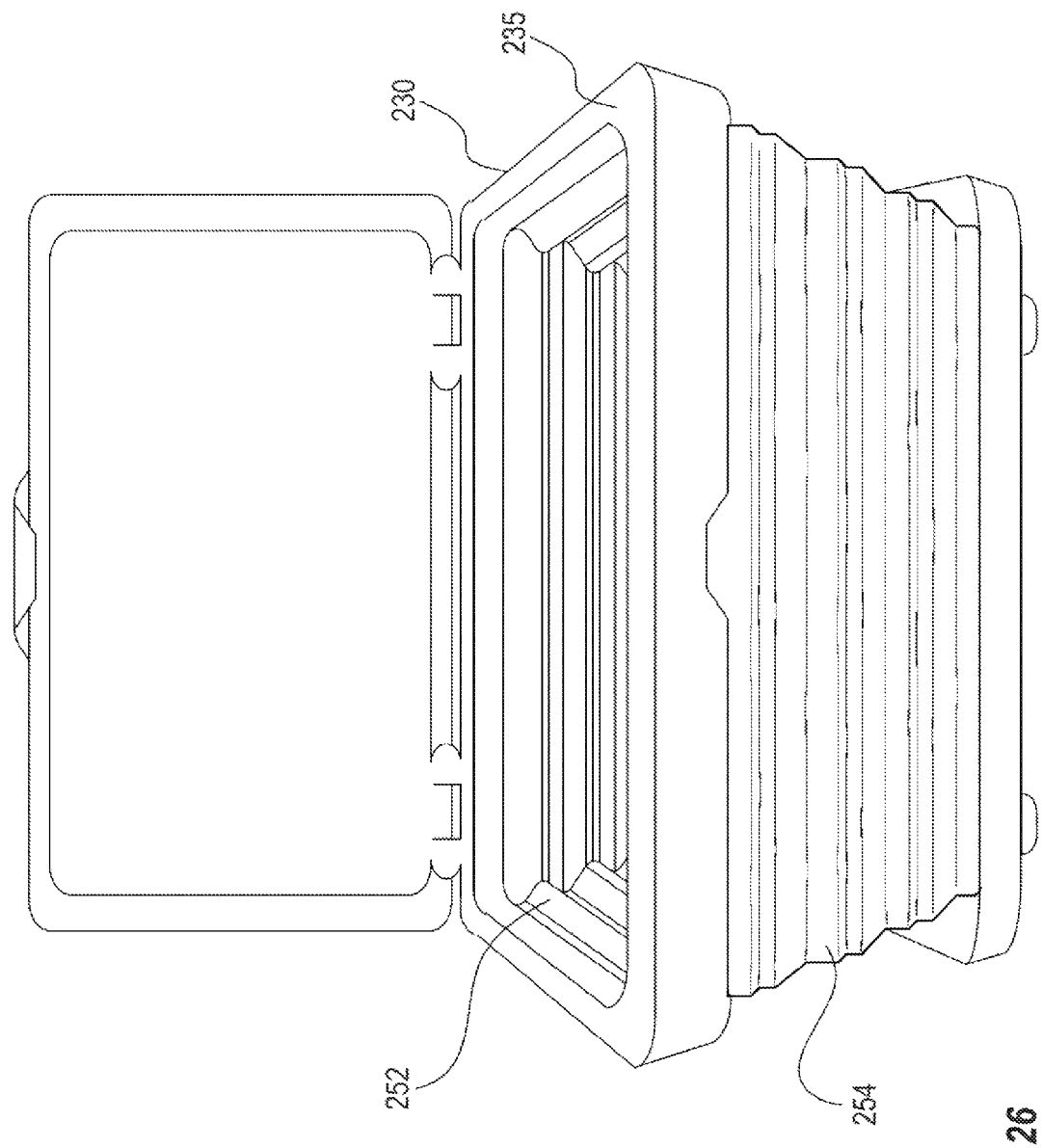
FIG. 26 is a perspective view of a cooler in accordance with a third preferred embodiment of the invention.

In particular, rather than having peripheral openings 39 defined between inner and outer rim walls 32,34 of rim 30, the cooler 211 includes an upper rim 230 having a closed top surface 235 without any peripheral opening 39 defined therein, as can be seen in FIG. 26. It will be understood that in the cooler 211, no access is provided to the intermediate space defined between the collapsible inner and outer walls 252, 254.

A Seventh Preferred Embodiment

A cooler 310 in accordance with a seventh preferred embodiment is now described with reference to FIG. 10. The cooler 310 is generally identical in structure to the cooler 10 described hereinabove with respect to FIGS. 18-24, except with respect to any changes illustrated and those changes now described.

Figure 27:
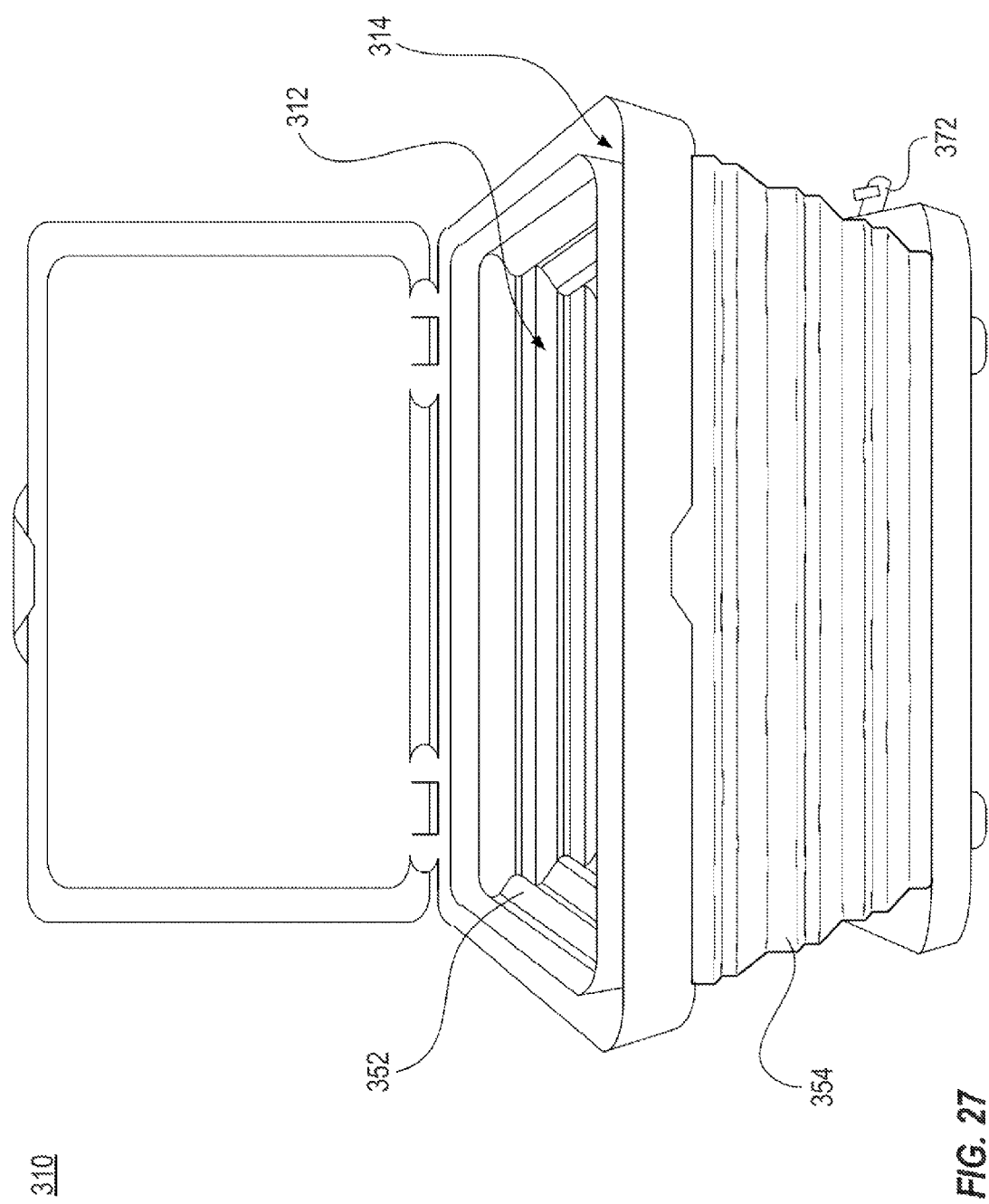
FIG. 27 is a perspective view of a cooler in accordance with a fourth preferred embodiment of the invention.

In particular, the cooler 310 includes one or more drain conduits 372, as illustrated in FIG. 27. In this respect, a drain conduit 372 comprises a passageway (preferably cylindrical) providing fluid communication between an exterior of the cooler 310 and the intermediate space 314 that is defined between the inner and outer walls 352,354, whereby fluid (such as melted ice) may be drained from the intermediate space 314. In a variation, the drain conduit 372 provides fluid communication between the exterior of the cooler 310 and the interior space 312, whereby fluid may be dispensed or drained from the interior space 312.

Furthermore, in another variation of this embodiment of the invention, a cooler includes both a first drain conduit in fluid communication with the intermediate space, and a second drain conduit in fluid communication with the interior space. Each drain conduit may be located on the exterior of the cooler either along a side or along a bottom of the cooler, and preferably includes a plug, valve, or spigot for selectively opening and closing the drain conduit and thereby control flow of liquid through the drain conduit.

In at least one preferred variation of this embodiment of the invention, a cooler is a water cooler adapted to receive and retain water or other liquid therein for dispensing via a spigot comprising a drain conduit. Preferably, the water cooler has a generally circular perimeter and is configured to hold between approximately five (5) gallons and approximately ten (10) gallons of fluid.

An Eighth Preferred Embodiment

A cooler 410 in accordance with an eighth preferred embodiment is now described with reference to FIGS. 28A-28B. The cooler 410 is generally identical in structure to the cooler 10 described hereinabove with respect to FIGS. 18-24, except with respect to any changes illustrated and those changes now described.

In particular, the cooler 410 includes at least one gripping handle 436 comprising portions of an upper rim 430 which extend outward on opposite lateral sides of the upper rim 430, beyond a lid 440, when the lid 440 is in a closed position. Each gripping handle 436 is defined by a generally rectangular or trapezoidal aperture 431 in the upper rim 430, as can be seen in FIG. 28A, which is a top view of the cooler 410. In use, a gripping handle 436 is grasped by a user and utilized to lift a respective end of the cooler 410 on which the gripping handle 436 is attached.

Figure 28A:
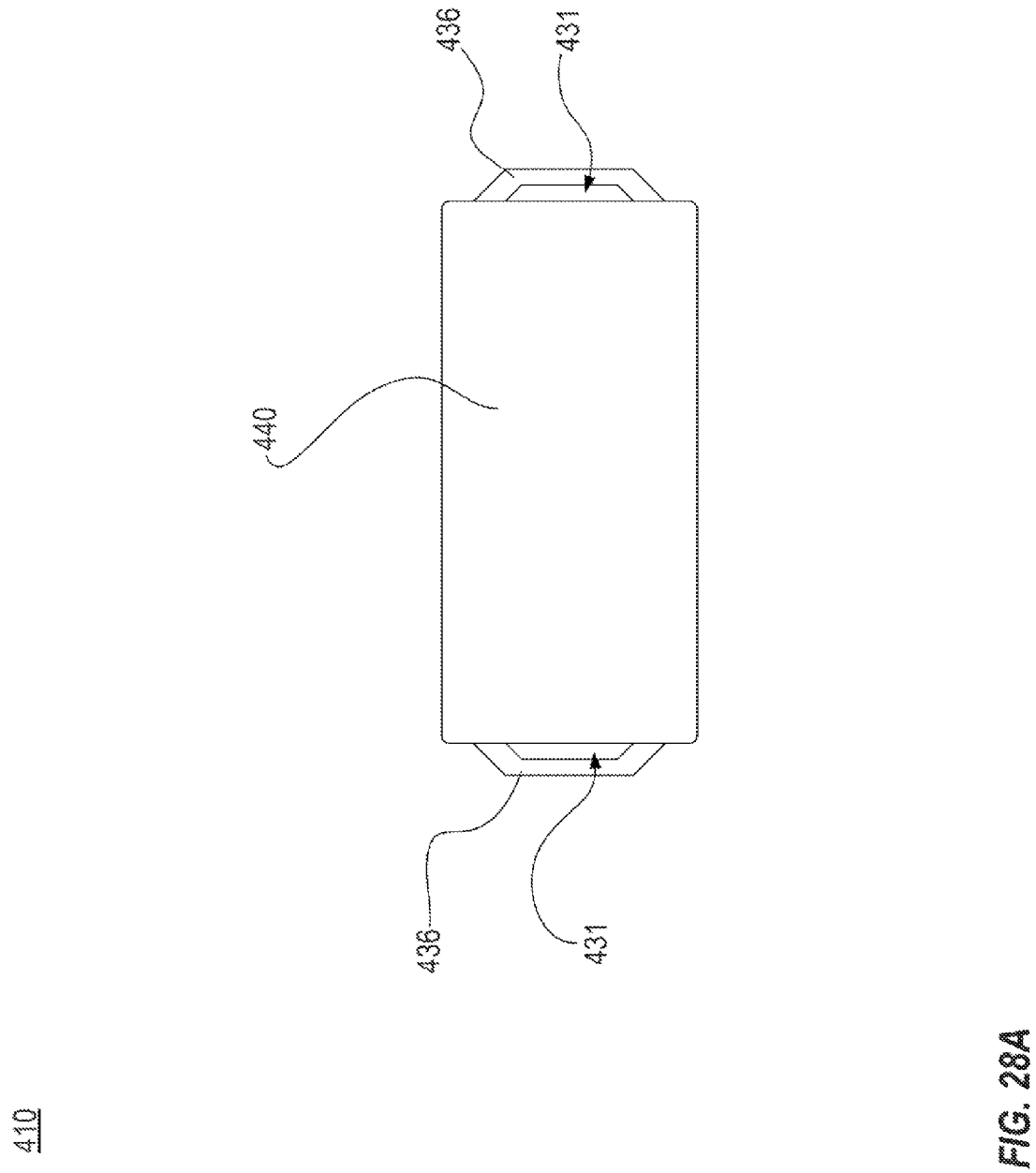
FIG. 28A is a top plan view of a cooler in accordance with a fifth preferred embodiment of the invention.
Figure 28B:
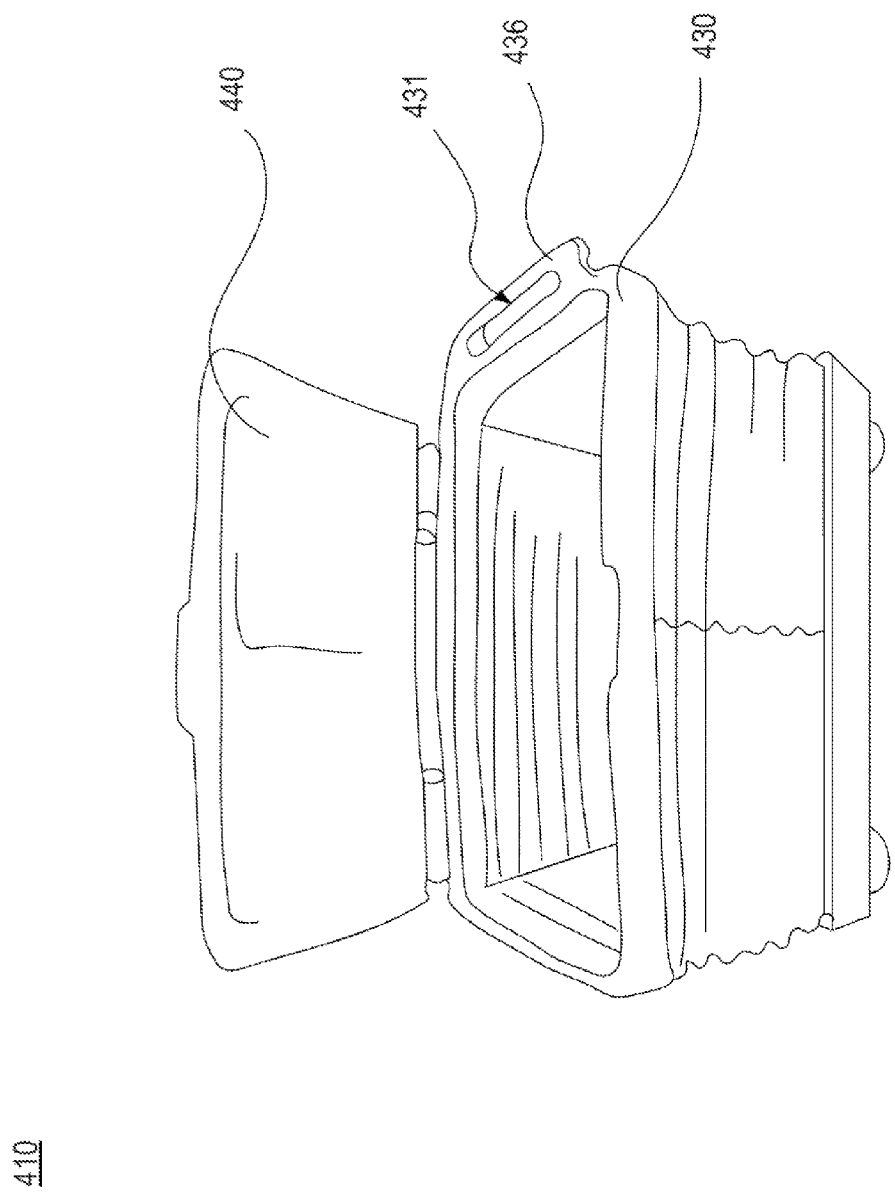
FIG. 28B is a top plan view of another cooler in accordance with the fifth preferred embodiment of the invention.

The cooler 410 is shown having a single gripping handle 438 in FIG. 11B and having two gripping handles 436 in FIG. 28A. In still yet another embodiment of the invention (not shown per se), a gripping handle 436 is located on a side of the cooler 210 of FIGS. 18-24 that is opposite to the side on which the handle 180 is located. Of course, in other embodiments of the invention, a cooler may have no handle 436 or handle 180. In still yet other embodiments of the invention (not shown per se), one or more gripping handles 436 may be located in a similar manner on the base 20 rather than on the upper rim 30.

A Ninth Preferred Embodiment

Two coolers 510a,510b in accordance with a ninth preferred embodiment are now described with reference to FIGS. 29A-29B. Each of the coolers 510a,510b is generally similar (but not identical) in structure to the cooler 210 described hereinabove with respect to FIGS. 18-24, except with respect to any changes illustrated and those changes now described.

Figure 29A:
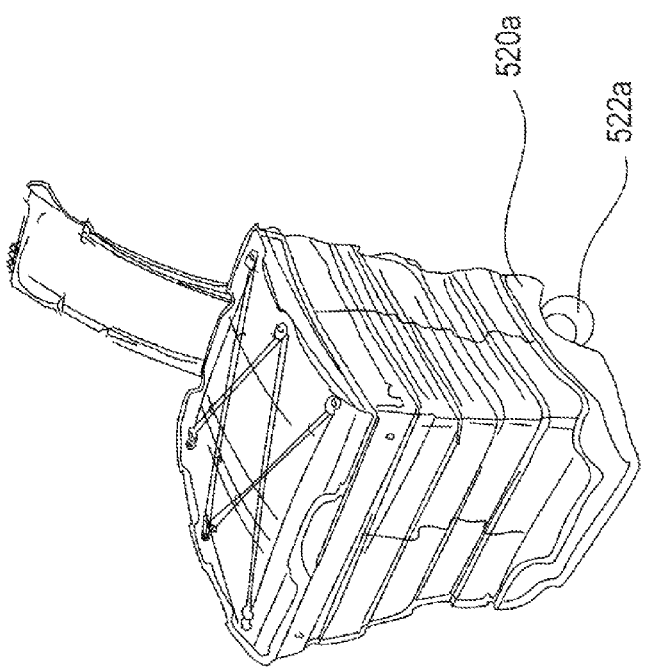
FIG. 29A is a perspective plan view of a cooler in accordance with a sixth preferred embodiment of the invention.
Figure 31:
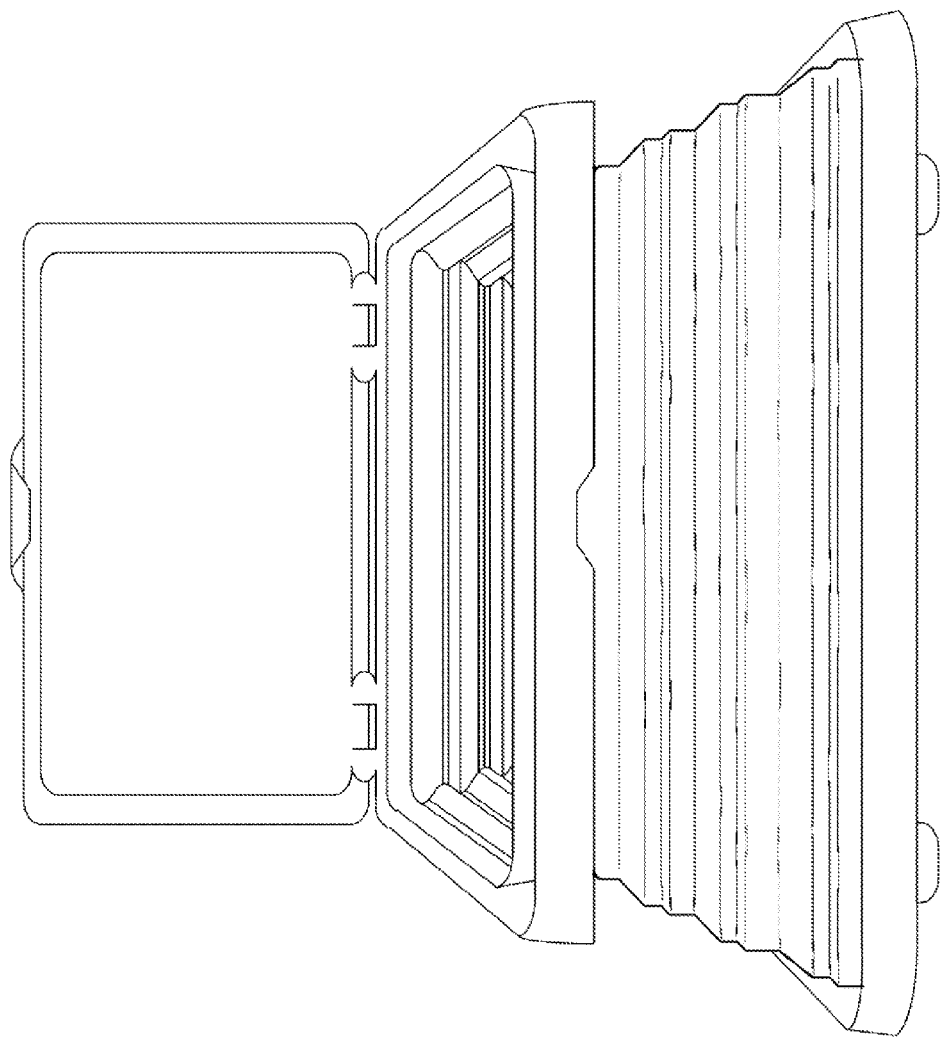
FIG. 31 is a perspective view of a cooler in accordance with an eighth preferred embodiment of the invention.
Figure 31A:
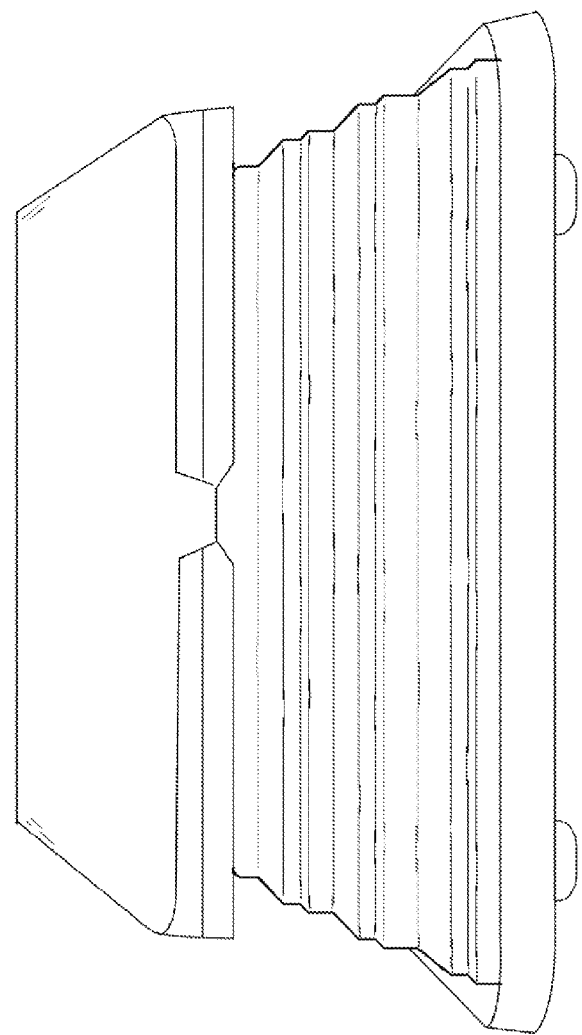
FIG. 31A is a perspective view of the cooler of FIG. 31 in a fully expanded configuration with the lid closed.
Figure 31C:
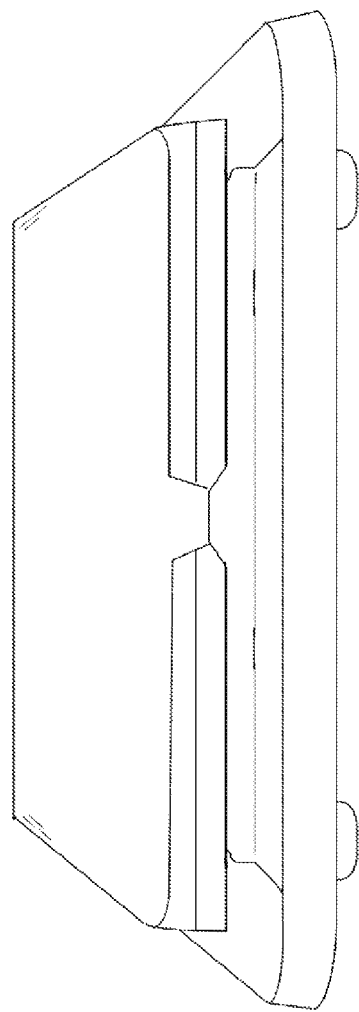
FIG. 31C is a perspective view of the cooler of FIG. 31A in another partially collapsed configuration.
Figure 31D:
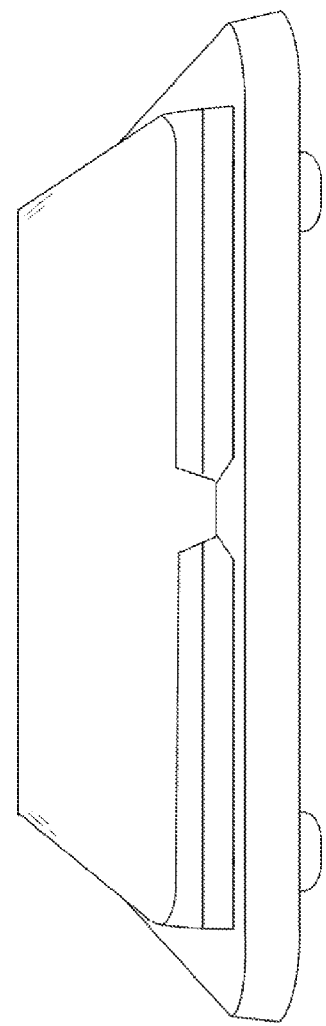
FIG. 31D is a perspective view of the cooler of FIG. 31A in a fully collapsed configuration.

In particular, rather than including two pairs of coaxial wheels 62, a base 520a,520b of the respective coolers 510a, 510b includes only a single pair of coaxial wheels 522a,522b, as can be seen in FIGS. 29A and 29B. Preferably, the wheels 522a,522b are larger than in embodiments utilizing two pairs of coaxial wheels, and more specifically are preferably large enough to easily roll across terrain such as sand on a beach, or grass in a park, as can be seen in FIG. 29B. The wheels 522b preferably are about ten inches in diameter with a tread width of about three inches.

A Tenth Preferred Embodiment

A cooler 610 in accordance with a tenth preferred embodiment is now described with reference to FIG. 30. The cooler 610 is generally similar in structure to the cooler 10 described hereinabove with respect to FIGS. 18-24, except with respect to any changes illustrated and those changes now described. In particular, the cooler 610 includes one or more cup holders 649 defined in a lid 640 of the cooler 610, as illustrated in FIG. 30.

An Eleventh Preferred Embodiment

A cooler 710 in accordance with an eleventh preferred embodiment is now described with reference to FIGS. 31 and 31A-31D. The cooler 710 is generally similar (but not identical) in structure to the cooler 10 described hereinabove with respect to FIGS. 18-24, except with respect to any changes illustrated and those changes now described.

In particular, the cooler 210 generally tapers from its top to its bottom, in that the membrane of each collapsible wall 52,54 is tapered such that, its top portion has a greater perimeter than its bottom portion; the base 20 is tapered such that its top surface 28 has a greater perimeter than its bottom 22; and the upper rim 30 is tapered such that a top portion of each rim wall 32,34 has a greater perimeter than a bottom portion of each rim wall 32,34. It will thus be appreciated that the upper rim 30 has a substantially greater perimeter than the base 20.

In contrast, the cooler 710 tapers from its bottom to its top. For example, in FIG. 31A, the cooler 710 is illustrated in a fully expanded configuration; in FIG. 31B, the cooler 710 is illustrated in a partially collapsed (or partially expanded) configuration; in FIG. 31C, the cooler 710 is illustrated in another partially collapsed configuration; and in FIG. 31D, the cooler 710 is illustrated in a fully collapsed condition. As will be appreciated from these figures, a membrane of each of the collapsible walls of the cooler 710 is tapered such that its bottom portion has a greater perimeter than its top portion; a base is tapered such that its bottom has a greater perimeter than its top surface; and an upper rim is tapered such that a bottom portion of each rim wall has a greater perimeter than a top portion of each rim wall. It will also be appreciated that in the cooler 710, the base 720 has a substantially greater perimeter than the upper rim.

A Twelfth Preferred Embodiment

A cooler 810 in accordance with a twelfth preferred embodiment is now described with reference to FIGS. 32 and 32A-32D. The cooler 810 is generally similar (but not identical) in structure to the cooler 210 described hereinabove with respect to FIGS. 18-24, except, with respect to any changes illustrated and those changes now described.

Figure 32C:
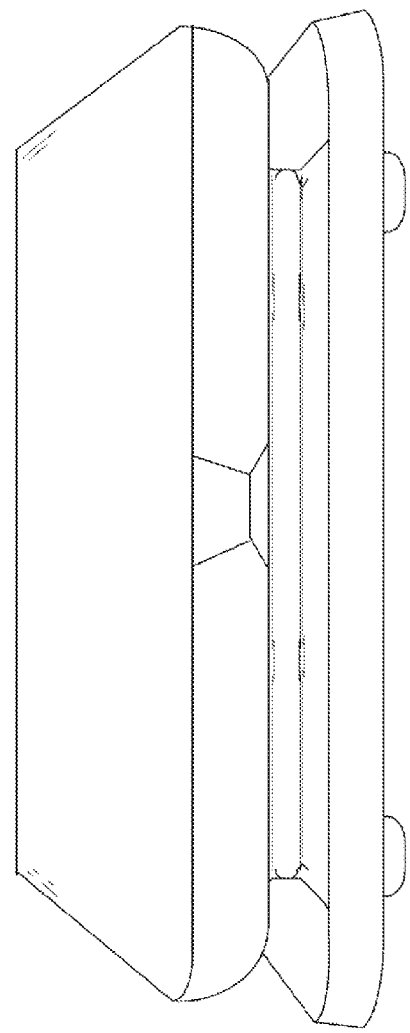
FIG. 32C is a perspective view of the cooler of FIG. 31A in another partially collapsed configuration.

In particular, rather than tapering simply from its top to its bottom or from its bottom to its top, the cooler 810 instead tapers from both its top and its bottom towards a middle of the cooler 810, as can be seen in FIG. 32A, in which the cooler 810 is illustrated in a fully expanded configuration; in FIG. 32B, in which the cooler 810 is illustrated in a partially collapsed configuration; in FIG. 32C, in which the cooler 810 is illustrated in another partially collapsed configuration; and in FIG. 32D, in which the cooler 810 is illustrated in a fully collapsed condition. In the cooler 810, a base 820 is tapered such that its bottom 824 has a greater perimeter than its top surface 826; an upper rim 830 is tapered such that a top portion of each rim wall 832,834 has a greater perimeter than a bottom portion of each rim wall 832,834; and, a membrane of each collapsible wall 852,854 is tapered such that its bottom portion 872 and its top portion 874 each have a greater perimeter than a middle portion 876 thereof. It will be appreciated that in the cooler 810, the base 820 has a perimeter generally equal to that of the upper rim 830, and that the base 820 and the upper rim 830 abut one another when the cooler 810 is in the fully collapsed configuration (FIG. 32D).

A Thirteenth Preferred Embodiment

Figure 33:
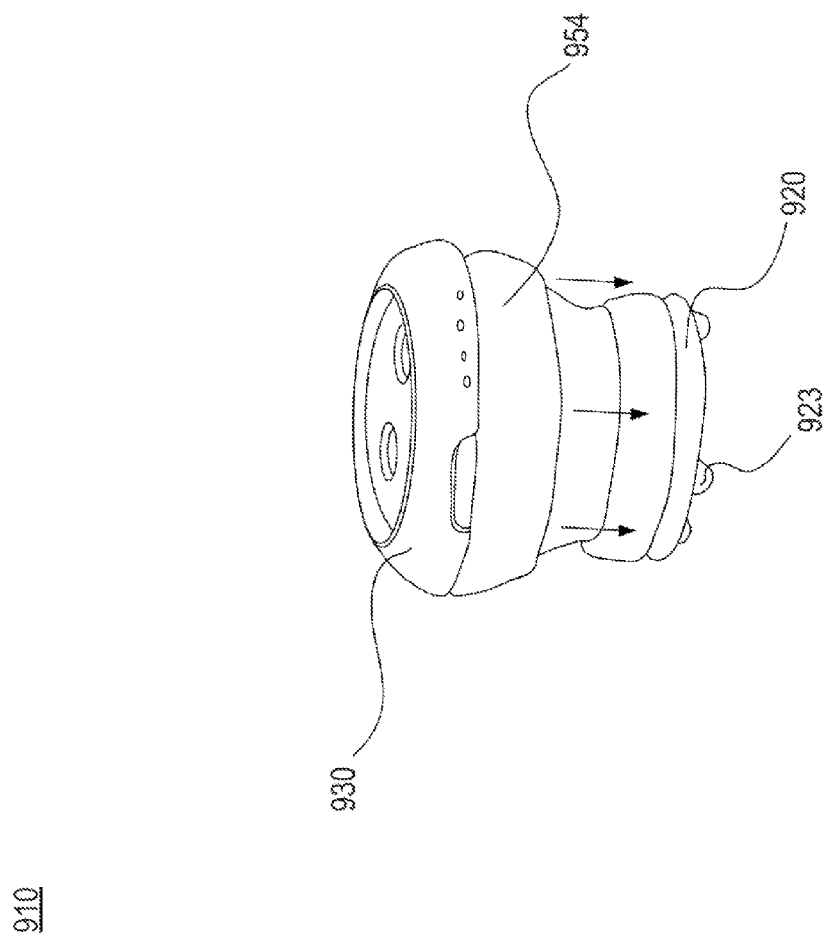
FIG. 33 is a perspective view of a cooler in accordance with a tenth preferred embodiment of the invention.

A cooler 910 in accordance with an thirteenth preferred embodiment is now described with reference to FIG. 33. The cooler 910 is generally similar (but not identical) in structure to the cooler 210 described hereinabove with respect to FIGS. 18-24, except with respect to any changes illustrated and those changes now described.

In particular, rather than having a generally rectangular perimeter with rounded corners, the cooler 910 has a base 920, an upper rim 930, inner collapsible wall (not shown), and outer collapsible wall 954. The cooler 910 is shown in an expanded configuration, with the arrows indicating the direction of collapsibility. The inner and outer collapsible walls each have a generally elliptical perimeter and, in particular, a generally circular perimeter, as illustrated in FIG. 33. Additionally, the base 920 of cooler 910 includes four rotating wheels 923 attached thereto such that each wheel is independently rotatable in any direction, similar to those commonly disposed on the bottom of a dolly, such as, for example, the dolly disclosed in U.S. Pat. No. 3,608,921, which patent is hereby incorporated herein by reference. In a variation, the base 920 includes only three such rotating wheels 923, which preferably are disposed in a triangular arrangement rather than a rectangular arrangement.

The cooler 910 further may include one or more drain conduits in fluid communication with the intermediate space between the inner and outer walls and/or in fluid communication with the interior storage space of the cooler 910.

In another variation of the cooler 910, the wall of the cooler includes only a single membrane, and does not include both inner and outer walls, and further includes a drain conduit that is located proximate a bottom of the cooler and that is disposed in fluid communication with the interior space of the cooler. Such a cooler could be utilized, for example, in dispensing Gatorade® or other beverage to athletes at a sports event, wherein the beverage is actually mixed within the interior space of the cooler.

A Fourteenth Preferred Embodiment

A cooler 1110 in accordance with a fourteenth preferred embodiment is now described with reference to FIGS. 34A-34B. The cooler 1110 is generally similar in structure to the cooler 10 described hereinabove with respect to FIGS. 18-24, except with respect to any changes illustrated and those changes now described.

In particular, rather than having a handle 180 attached to a base 20, the cooler 1110 has a handle 1128 attached to an upper rim thereof at opposite sides of the upper rim 1130, as illustrated in FIG. 17A. Preferably, the handle 1128 is attached to the upper rim and is configured for pivoting movement relative thereto, and may be attached for pivoting about an axis via a hinge mechanism 1132. In such an arrangement, the handle 1128 may be configured to swivel over a top of the cooler 1110 from one side to another. The handle 1128 preferably includes a grip portion 1129. Additionally, the handle 1128 is preferably configured to lock at one or both sides of the cooler 1110. It will be understood that if so locked, the handle 1128 will be disposed in substantially the same plane as the inner collapsible wall (not shown) and the outer collapsible wall 1154 of the cooler 1110, when the cooler 1110 is in a fully collapsed configuration, as illustrated in FIG. 34B. The cooler 1110 is shown in an expanded configuration in FIG. 34A, with the arrows indicating the directions of collapsibility and expansion; and the cooler 1110 is shown in a fully collapsed configuration in FIG. 34B.

Alternatively, the handle is fixedly attached to the upper rim 1130 such that the handle is not movable relative to the upper rim 1130 of the cooler 1110.

A Fifteenth Preferred Embodiment

A cooler 1210 in accordance with a fifteenth preferred embodiment is now described with reference to FIGS. 35A-38B. The cooler 1210 is generally similar in structure to the cooler 10 described hereinabove with respect to FIGS. 18-24, except with respect to any changes illustrated and those changes now described.

In particular, the cooler 1210 is configured such that its upper rim 1230 engages with and locks into its base 1220 when the cooler 1210 is in a collapsed configuration. Preferably, the upper rim 1230 includes a snap fastener 1237 adapted to mate with a snap fastener 1225 of the base 1220, as can be seen in FIG. 35A. FIG. 35B illustrates the cooler 1210 secured in a fully collapsed configuration by the snap fasteners 1225,1237.

A Sixteenth Preferred Embodiment

A cooler 1310 in accordance with a sixteenth preferred embodiment is now described with reference to FIGS. 36A-36B. The cooler 1310 is generally similar in structure to the cooler 210 described hereinabove with respect to FIGS. 18-24, except with respect to any changes illustrated and those changes now described.

In particular, the cooler 1310 is configured such that its outer collapsible wall 1354 is generally unexposed and thereby protected when the cooler 1310 is in a fully collapsed configuration, as shown in FIG. 36B. More specifically, a portion of the base 1320 and a portion of the upper rim 1330 each extend at least partly over the outer collapsible wall 1354, which is received with a respective space or recess thereof. These portions of the base 1320 and upper rim 1330 are shaped and dimensioned to mate with one another when the cooler is transitioned to a collapsed configuration. In contrast to the fully collapsed configuration of FIG. 36B, the cooler 1310 is depicted in an expanded configuration in FIG. 36A.

A Seventeenth Preferred Embodiment

A cooler 1410 in accordance with a seventeenth preferred embodiment is now described with reference to FIGS. 37A-37B. The cooler 1410 is generally similar in structure to the cooler 210 described hereinabove with respect to FIGS. 18-24, except with respect to any changes illustrated and those changes now described.

In particular, the cooler 1410, rather than having a generally rectangular perimeter, has a perimeter with a generally arcuate portion and a generally linear portion, as illustrated in FIG. 37A. In this respect the upper rim 1430 of the cooler generally resembles the outer periphery of a toilet seat. Additionally, rather than having a lid that is permanently attached to or otherwise fastened to an upper rim 1430, such as at hinges, the cooler 1410 includes a lid 1440 removably secured to an upper rim such that it can be completely removed and detached from the upper rim. This can be accomplished in various ways that are well known to the Ordinary Artisan. The collapsible cooler wall 1450 of the cooler 1410 in FIG. 37A is further shown in FIG. 37B.

An Eighteenth Preferred Embodiment

Figure 38:
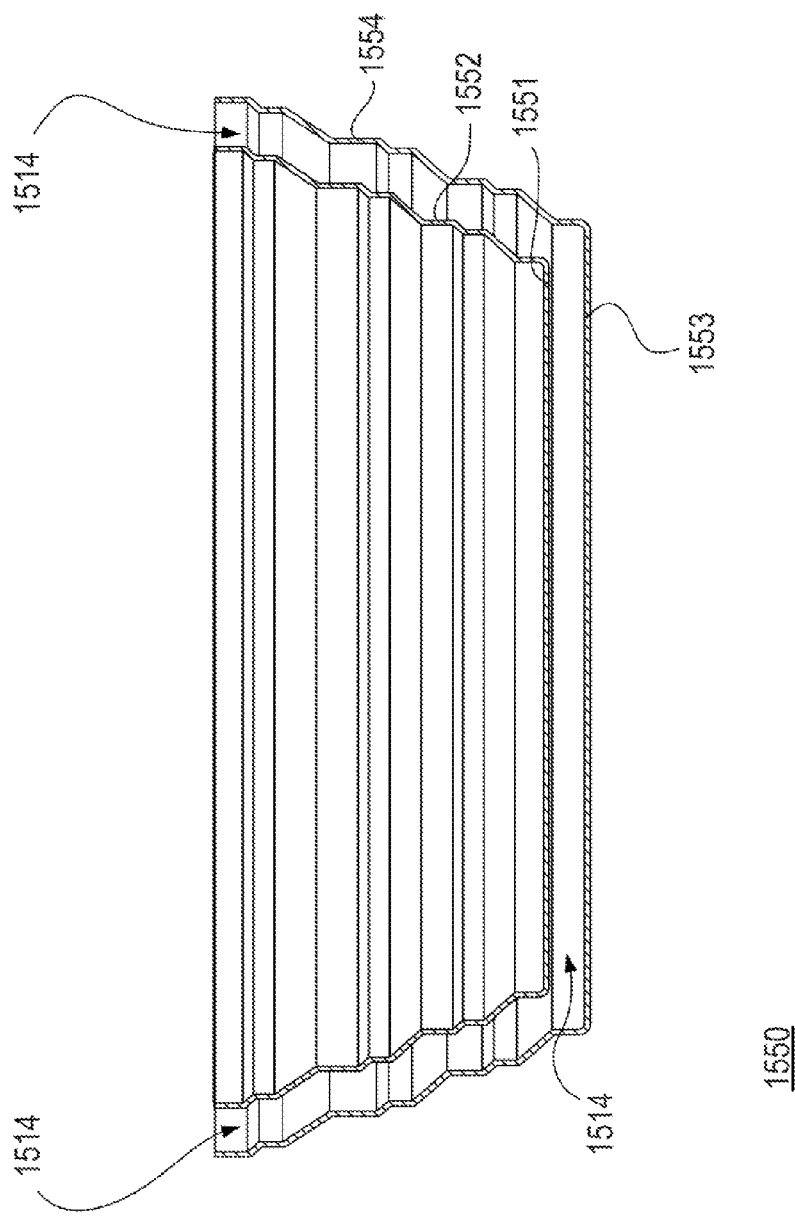
FIG. 38 is a cross-sectional view of a wall of a cooler in accordance with a fifteenth preferred embodiment of the invention.

A cooler in accordance with a eighteenth preferred embodiment is now described with reference to FIG. 38, wherein a cooler wall 1550 is shown. The cooler is generally identical in structure to the cooler 210 described hereinabove with respect to FIGS. 18-24, except with respect to any changes illustrated and those changes now described regarding the cooler wall 1550.

In particular, rather than having collapsible inner and outer walls 52,54 both attached to a top surface 26 of a base 20, the cooler wall 1550 has a collapsible inner wall 1552 extending upward from an inner bottom wall 1551, which is integrally formed with the collapsible inner wall 1552; and a collapsible outer wall 1554 extending upward from an outer bottom wall 1553, which is integrally formed with the collapsible outer wall 1554. Both walls 1552,1554 are attached to the upper rim of the cooler in accordance with the eighteenth preferred embodiment It will be understood that in the cooler wall 1550, the intermediate space 1514 defined between the inner and outer walls 1552,1554 includes not only the space defined between the collapsible inner and outer walls 1552,1554 but additionally includes the space defined between the inner bottom wall 1551 and the outer bottom wall 1553.

It will further be appreciated that, because the collapsible walls 1552,1554 are not coupled to one another in any fashion at bottom portions of their respective membranes, the collapsible walls 1552,1554 can be independently collapsed or expanded. More specifically, the cooler including the cooler wall 1550 is capable of transitioning to a configuration wherein the collapsible inner wall 1552 is collapsed to the same or to a greater extent than the collapsible outer wall 1554 (e.g., to a first expanded state with the outer wall in a second expanded state), thus increasing the volume of space defined between the inner bottom wall 1551 and the outer bottom wall 1553.

A Nineteenth Preferred Embodiment

Figure 39:
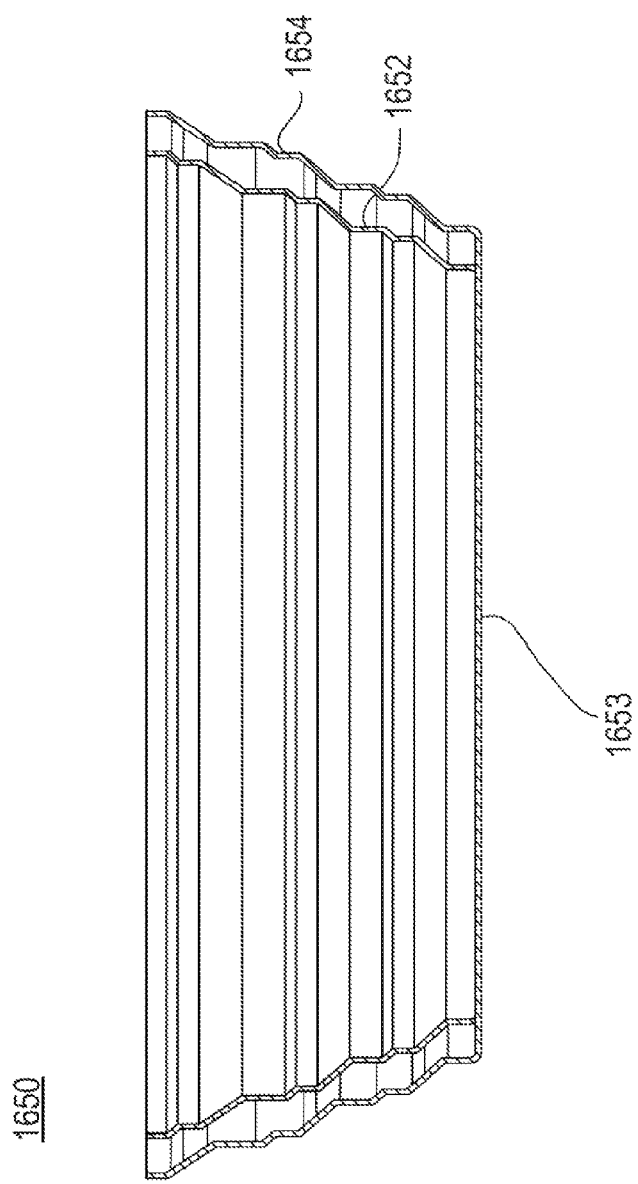
FIG. 39 is a cross-sectional view of a wall of a cooler in accordance with a sixteenth preferred embodiment of the invention.

A cooler in accordance with a nineteenth preferred embodiment is now described with reference to FIG. 39, wherein a cooler wall 1650 is shown. In particular, the cooler wall 1650 is similar to the cooler wall 1550, but, rather than having inner and outer bottom walls 1551,1553 like the cooler wall 1550, the cooler wall 1650 has a single bottom wall 1653 from which collapsible inner and outer walls 1652,1654 extend upwards.

A Twentieth Preferred Embodiment

Figure 40:
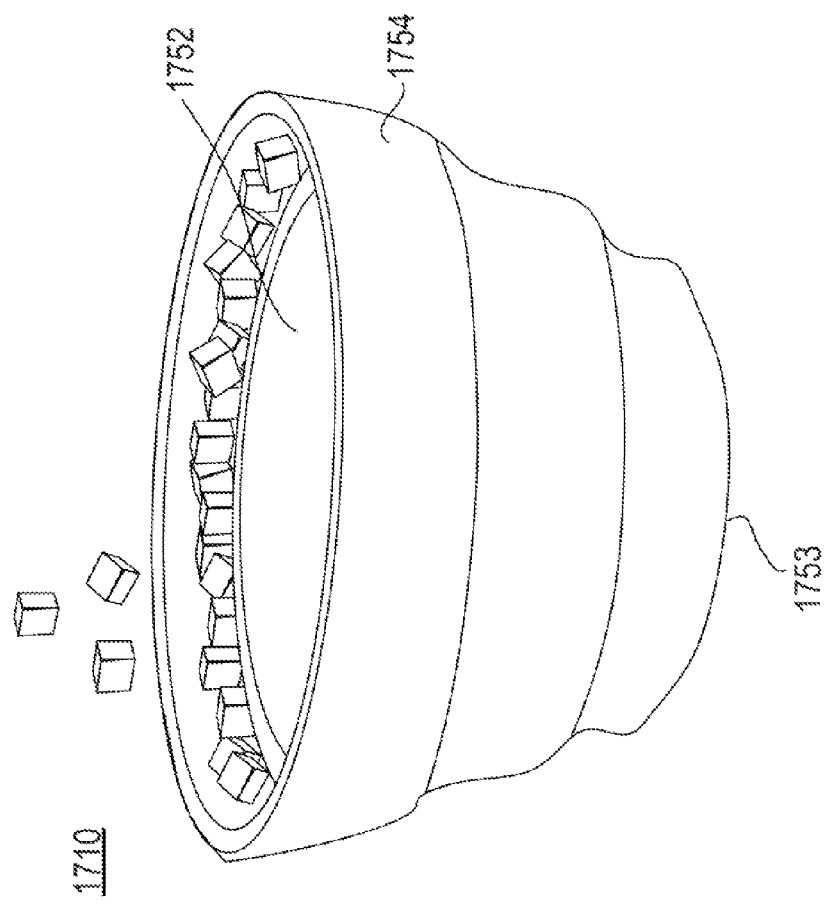
FIG. 40 is a perspective view of a cooler in accordance with a seventeenth preferred embodiment of the invention.

In a twentieth preferred embodiment, a cooler 1710 illustrated in FIG. 40 generally is comprised of the cooler wall 1650; as will be appreciated, the cooler 1710 thus does not include an upper rim or base. The cooler 1710 includes an inner collapsible wall 1752 and outer collapsible wall 1754 with a single bottom wall 1753. Ice is shown disposed within the intermediate space between the inner collapsible wall 1752 and outer collapsible wall 1754, with a top of the outer collapsible wall 1754 extending above a top of the inner collapsible wall 1752. Additionally, in a variation of cooler 1710, connectors or spokes are provide that extend between and join together the inner and outer collapsible walls of the cooler. Preferably, the connectors are rigid or semirigid and can be integrally formed (such as in a co-molding manufacturing process) with the inner collapsible wall and/or the outer collapsible.

A Twenty-First Preferred Embodiment

In a twenty-first preferred embodiment, rather than including collapsible inner and outer walls, a cooler includes only a single collapsible wall. Such a cooler preferably includes a base and an upper rim, but in alternative embodiments lacks one or both of these features.

A Twenty-Second Preferred Embodiment

Figure 41:
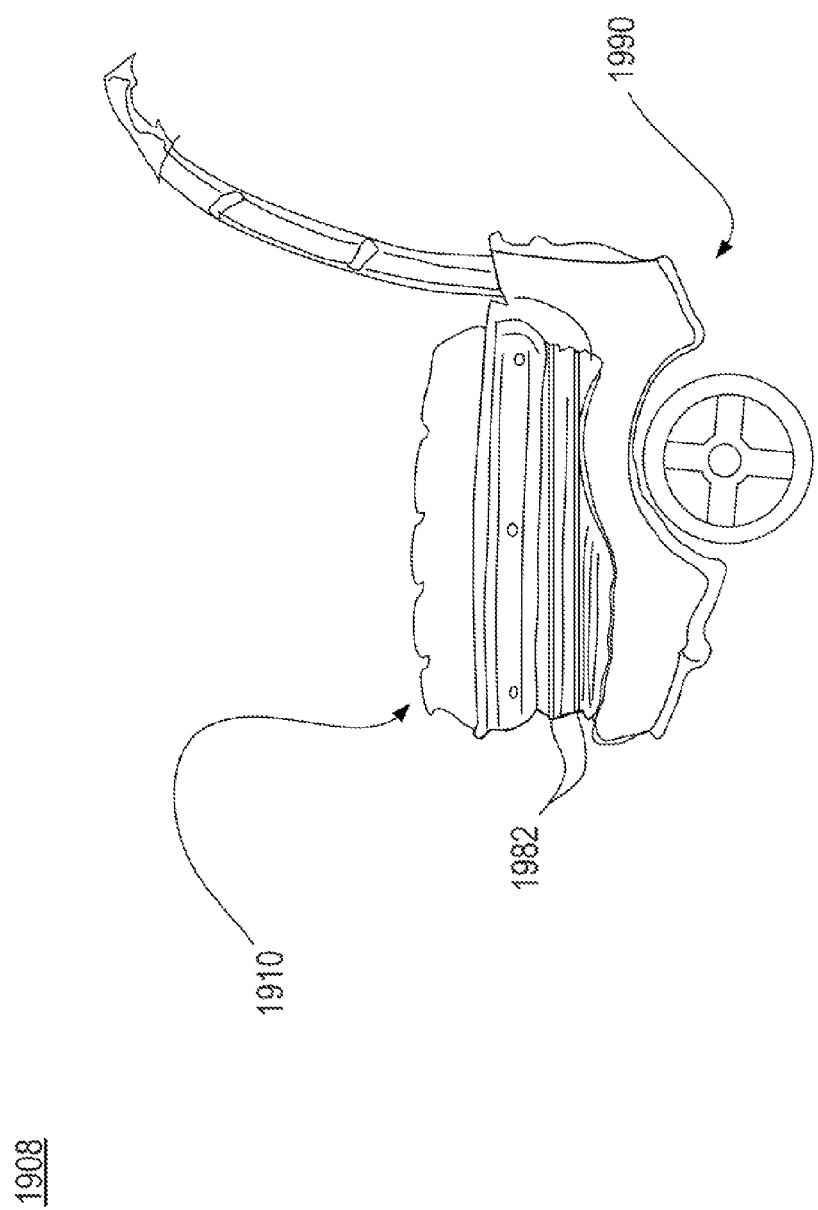
FIG. 41 is a perspective view of a cooler in accordance with a nineteenth preferred embodiment of the invention.

A cooler 1908 in accordance with a twenty-second preferred embodiment is now described with reference to FIG. 41. The cooler 1908 is generally identical in structure to the cooler 210 described hereinabove with respect to FIGS. 18-24, except with respect to any changes illustrated and those changes now described. In particular, rather than having collapsible inner and outer walls 52,54 each comprising a single membrane as disclosed, for example, with regard to the cooler 210 described above, the cooler 1908 includes collapsible inner wall (not shown) and outer wall 1954, each of which comprises a plurality of membranes. Preferably, each respective group of membranes are joined together by reinforcing, rigid portions 1982 forming one of the collapsible walls of the cooler 1908. Each membrane of an intermediate section is preferably attached to the immediately adjoining portions 1982.

A Twenty-Third Preferred Embodiment

FIG. 42 is a front elevational view of a cooler 2000 in accordance with a Twenty-Third preferred embodiment of the invention, wherein the cooler 2000 is shown in an expanded configuration. FIG. 43 is a side elevational view of the cooler 2000, wherein the cooler 2000 is shown in a collapsed configuration, and FIG. 44 is a top plan view of the cooler 2000. The cooler 2000 is generally similar (but not identical) in structure to the cooler 1110 described hereinabove with respect to FIGS. 34A-34B, except with respect to any changes illustrated and those changes now described. In particular, rather than having a handle 1128 attached to an upper rim 1130 at opposite sides thereof, as illustrated in FIG. 34A, the handle 2028 of cooler 2000 is attached to the base 2020 and is configured for pivoting movement relative thereto, and may be attached for pivoting about a pivot axis via a hinge mechanism 2022. In such an arrangement, the handle 2028 may be configured to swivel over a top of the cooler 2000 from one side to another. The handle 2028 preferably includes a grip portion 2029. When collapsed, as shown in FIG. 43, the handle 2028 is disposed in substantially the same plane as the inner collapsible wall (not shown) and the outer collapsible wall 2054 of the cooler 2000.

A Twenty-Fourth Preferred Embodiment

FIG. 45 is a front elevational view of a cooler 2100 in accordance with a twenty-fourth preferred embodiment of the invention, wherein the cooler 2100 is in an expanded configuration. Like cooler 810, the inner and outer walls of the cooler 2100 each tapers from both the rim 2130 of the cooler 2100 and the base 2120 of the cooler 2100 towards a middle of the cooler 2100. Furthermore, like cooler 1908, each of the inner and outer walls of the cooler 2100 includes a plurality of membranes, in this respect, each of the inner and outer walls of the cooler 2100 includes upper and lower membranes separated by intermediate rigid portion 2199. In particular, the upper membrane is attached to and extends between the upper rim 2130 and the intermediate rigid portion 2199, and the lower member is attached to and extends between the base 2120 and the intermediate rigid portion 2199. Accordingly, the upper member is expandable and collapsible independent of the expansion or contraction of the lower member, and vice-versa. Moreover, handle 2128 is attached to the intermediate rigid portion 2199 and is configured for pivoting movement relative thereto, and may be attached for pivoting about an axis via a hinge mechanism 2122. The handle 2128 preferably is configured to swivel over a top of the cooler 2100 from one side to another, as indicated in FIG. 45.

Twenty-Fifth Preferred Embodiment

FIG. 46 is a perspective view of a cooler 2200 in accordance with a twenty-fifth preferred embodiment of the invention, wherein the cooler 2200 is in an expanded configuration. The cooler 2200 preferably includes a drinking spout 2297. In one implementation, the collapsible walls are about eight (8) inches in length when fully expanded and the cooler 2200 is used as a personal cooler for containing a beverage. As illustrated, the cooler 2200 includes a pivoting handle and a base with feet.

Transportable Cooler Apparatus

In variations of some of the foregoing embodiments in which the cooler includes a wheeled platform (such as wheeled platform 1990 of cooler 1908), the portion of the cooler defining the interior storage space (including the lid and collapsible wall) may include a base and may be removably coupled to the wheeled platform and can be coupled and uncoupled therefrom. Such wheeled platform is preferably durable and rigid and is formed in one or more molding processes. Moreover, as used herein, "molding" may include injection molding, rotational molding, and/or blow molding. Furthermore, the wheeled platform may be integrally formed as a single piece or may be separately formed as multiple pieces and, thereafter, connected or joined together.

The cooler portion may be coupled to the wheeled platform by coupling components. When the cooler is coupled to the wheeled platform, the coupling components preferably are disposed in interlocking engagement with one another, whereby the cooler is securely coupled to the wheeled platform for safe transportation on the wheeled platform, i.e., the cooler is protected from failing off of the wheeled platform during transport over rough terrain such as grass or a sand dune. The coupling components may comprise snap components and/or hook and loop fastening components.

Portable coolers that may be removably coupled to a wheeled platform are further described in, for example, Vanderberg U.S. Pat. No. 7,387,305, which is incorporated herein by reference.

Other Embodiments of the Invention

Additional features that may be incorporated into coolers of the present invention and that fall within the scope of the present invention are disclosed in the incorporated Vanderberg references. Such incorporated feature may be utilized together in combination with the aspects and/or one or more features disclosed herein.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:
1. A cooler, comprising:
   (a) a base defining a bottom portion of the cooler;
   (b) an upper rim defining an upper portion of the cooler; and
   (c) a collapsible cooler wall extending between and attached to said base and said upper rim and surrounding an interior storage space of the cooler, the cooler wall comprising a flexible elastomeric membrane that includes a plurality of hinge lines at which the membrane is configured to bend such that the membrane is transitional between a collapsed configuration and an expanded configuration;
   (d) a removable wheel assembly which includes
      (i) two coaxial wheels, and
      (ii) an axle,
      (iii) wherein the two coaxial wheels are removably securable to the axle;
   (e) a wheel fastening system configured to secure the removable wheel assembly to the base, the wheel fastening system including

(i) a mount,
(ii) a clip hingedly connected to the mount, and
(iii) a locking clasp configured to lock the clip into a closed position to secure the wheel assembly; and (f) a lid including
(i) two wheel storage recesses, each being sized and dimensioned to receive and retain one of the coaxial wheels of the wheel assembly, and
(ii) an axle storage recess sized and dimensioned to receive and retain the axle of the wheel assembly;

(g) wherein the cooler is transitional between an expanded configuration for use of the cooler, and a collapsed configuration during nonuse of the cooler, by bending of the membrane of the cooler wall along the hinge lines, each of the configurations being a stable configuration of the cooler; and (h) wherein the membrane comprises an outer surface located on the exterior of the cooler and an inner surface located in the interior storage space of the cooler.

2. The cooler of claim 1, wherein the cooler wall is made from silicone.

3. The cooler of claim 1, wherein the cooler wall consists of a single wall that is made from silicone and that is collapsible.

4. An expandable and collapsible cooler, comprising:
(a) a base defining a bottom portion of the cooler;
(b) an upper rim defining an upper portion of the cooler; and
(c) a collapsible cooler wall extending between and attached to said base and said upper rim and surrounding an interior storage space of the cooler, the cooler wall comprising a flexible elastomeric membrane that includes a plurality of hinge lines at which the membrane is configured to bend such that the membrane is transitional between a collapsed configuration and an expanded configuration;
(d) a removable wheel assembly which includes
(i) two coaxial wheels, and
(ii) an axle,
(iii) wherein the two coaxial wheels are removably securable to the axle;
(e) a wheel fastening system configured to secure the removable wheel assembly to the base, the wheel fastening system including
(i) a mount,
(ii) a clip hingedly connected to the mount, and
(iii) a locking clasp configured to lock the clip into a closed position to secure the wheel assembly; and
(f) a lid including
(i) two wheel storage recesses, each being sized and dimensioned to receive and retain one of the coaxial wheels of the wheel assembly, and
(ii) an axle storage recess sized and dimensioned to receive and retain the axle of the wheel assembly;
(g) wherein the cooler is transitional between an expanded configuration for use of the cooler, and a collapsed configuration during nonuse of the cooler, by bending of the membrane of the cooler wall along the hinge lines, each of the configurations being a stable configuration of the cooler; and
(h) wherein the membrane comprises an outer surface located on the exterior of the cooler and an inner surface located in the interior storage space of the cooler.

5. The cooler of claim 4, wherein the membrane comprises peripheral portions that nest within each other when the membrane is in the collapsed configuration.

6. The cooler of claim 5, wherein the nested peripheral portions are generally arranged in a common plane.

7. The cooler of claim 4, wherein the membrane defines the interior storage space of the cooler.

8. The cooler of claim 4, wherein the membrane tapers outwardly in extending from the upper rim to the base, and wherein a periphery of the membrane proximate the upper rim is greater than a periphery of the membrane proximate the base.

9. The cooler of claim 4, wherein the membrane tapers inwardly in extending from the upper rim to the base, and wherein a periphery of the membrane proximate the upper rim is less than a periphery of the membrane proximate the base.

10. The cooler of claim 4, wherein the membrane tapers inwardly in extending from the upper rim, the membrane tapers inwardly in extending from the base, and a middle section of the membrane includes a periphery that is less than either of a periphery of the membrane proximate the upper rim and a periphery of the membrane proximate the base.

11. The cooler of claim 4, wherein the cooler wall is made from silicone.

12. The cooler of claim 4, wherein the cooler wall consists of a single wall that is made from silicone and that is collapsible.

* * * * *